US012599544B2

(12) United States Patent
Demetriades et al.

(10) Patent No.: US 12,599,544 B2
(45) Date of Patent: Apr. 14, 2026

(54) INTRAORAL GASTROINTESTINAL ACCESS DEVICE AND RELATED METHODS

(71) Applicant: Alsteni Medical, Inc., Sierra Madre, CA (US)

(72) Inventors: Elizabeth Ogden Demetriades, Sierra Madre, CA (US); Todd Oda, Torrance, CA (US); Nicholas George Demetriades, Los Angeles, CA (US)

(73) Assignee: Alsteni Medical, Inc., Sierra Madre, CA (US)

( * ) Notice: Subject to any disclaimer, the term of this patent is extended or adjusted under 35 U.S.C. 154(b) by 0 days.

(21) Appl. No.: 19/199,999

(22) Filed: May 6, 2025

(65) Prior Publication Data

US 2025/0345246 A1 Nov. 13, 2025

Related U.S. Application Data

(60) Provisional application No. 63/743,174, filed on Jan. 8, 2025, provisional application No. 63/644,775, filed on May 9, 2024.

(51) Int. Cl.
*A61J 15/00* (2006.01)

(52) U.S. Cl.
CPC ....... *A61J 15/0034* (2013.01); *A61J 15/0003* (2013.01)

(58) Field of Classification Search
CPC .......................... A61J 15/0034; A61J 15/0003
USPC .......................................................... 604/174
See application file for complete search history.

(56) References Cited

U.S. PATENT DOCUMENTS

| | | | |
|---|---|---|---|
| 4,114,625 | A | 9/1978 | Onat |
| 4,134,405 | A | 1/1979 | Smit |
| 4,166,452 | A | 9/1979 | Generales, Jr. |
| 4,256,108 | A | 3/1981 | Theeuwes |
| 4,265,874 | A | 5/1981 | Bonsen et al. |
| 4,900,306 | A | 2/1990 | Quinn et al. |
| 5,026,559 | A | 6/1991 | Eichel et al. |
| 5,037,387 | A | 8/1991 | Quinn et al. |

(Continued)

FOREIGN PATENT DOCUMENTS

| | | | |
|---|---|---|---|
| CA | 2377502 | A1 | 1/2001 |
| CA | 2558773 | C | 8/2011 |

(Continued)

OTHER PUBLICATIONS

American Diabetes Association (2013), "Economic costs of diabetes in the U.S. in 2012", Diabetes Care, 36(4): 1033-1046.

(Continued)

*Primary Examiner* — Phillip A Gray
(74) *Attorney, Agent, or Firm* — Knobbe, Martens, Olson & Bear, LLP

(57) ABSTRACT

Various intraoral gastrointestinal access devices, systems, and methods are disclosed herein to deliver substance directly to a target gastrointestinal tract site of a user while bypassing other portions of the gastrointestinal tract. The intraoral gastrointestinal access devices can be anchored within a mouth of a user and are generally concealed when not in use. The intraoral gastrointestinal access devices can include a port that is docked in the mouth when not in use and positioned outside the mouth to receive substance from a delivery device with a reservoir of the substance.

20 Claims, 35 Drawing Sheets

(56) References Cited

U.S. PATENT DOCUMENTS

| | | | |
|---|---|---|---|
| 5,322,697 | A | 6/1994 | Meyer |
| 5,360,614 | A | 11/1994 | Fox et al. |
| 5,470,839 | A | 11/1995 | Laughlin et al. |
| 5,536,156 | A | 7/1996 | Fox et al. |
| 5,545,410 | A | 8/1996 | Fox et al. |
| 5,576,306 | A | 11/1996 | Dressman et al. |
| 5,611,787 | A | 3/1997 | Demeter et al. |
| 5,753,253 | A | 5/1998 | Meyer |
| 5,776,887 | A | 7/1998 | Wibert et al. |
| 5,811,388 | A | 9/1998 | Friend et al. |
| 5,977,175 | A | 11/1999 | Lin |
| 5,998,363 | A | 12/1999 | Forse et al. |
| 6,103,269 | A | 8/2000 | Wunderlich et al. |
| 6,143,786 | A | 11/2000 | Gohman et al. |
| 6,248,375 | B1 | 6/2001 | Gilles et al. |
| 6,248,390 | B1 | 6/2001 | Stillman |
| 6,267,988 | B1 | 7/2001 | Meyer |
| 6,420,350 | B1 | 7/2002 | Fleischner |
| 6,558,690 | B2 | 5/2003 | Portman |
| 6,558,708 | B1 | 5/2003 | Lin |
| 6,569,463 | B2 | 5/2003 | Patel et al. |
| 6,624,210 | B1 | 9/2003 | Petereit et al. |
| 6,716,815 | B2 | 4/2004 | Portman |
| 6,770,620 | B2 | 8/2004 | Henriksen |
| 6,774,111 | B1 | 8/2004 | Wolf et al. |
| 6,809,115 | B2 | 10/2004 | Katz et al. |
| 6,846,891 | B2 | 1/2005 | Petereit et al. |
| 7,025,791 | B2 | 4/2006 | Levine et al. |
| 7,037,344 | B2 | 5/2006 | Kagan et al. |
| 7,048,906 | B2 | 5/2006 | Lin et al. |
| 7,081,239 | B2 | 7/2006 | Lin |
| 7,122,058 | B2 | 10/2006 | Levine et al. |
| 7,157,100 | B2 | 1/2007 | Doshi et al. |
| 7,169,416 | B2 | 1/2007 | Koss et al. |
| 7,347,875 | B2 | 3/2008 | Levine et al. |
| 7,641,924 | B2 | 1/2010 | Mizumoto et al. |
| 7,670,627 | B2 | 3/2010 | Shefer et al. |
| 7,718,194 | B2 | 5/2010 | Chenevier et al. |
| 7,766,861 | B2 | 8/2010 | Levine et al. |
| 7,785,291 | B2 | 8/2010 | Marco et al. |
| 7,794,447 | B2 | 9/2010 | Dann et al. |
| 7,815,947 | B2 | 10/2010 | Mizumoto et al. |
| 7,935,073 | B2 | 5/2011 | Levine et al. |
| 8,226,602 | B2 | 7/2012 | Quijano et al. |
| 8,486,153 | B2 | 7/2013 | Levine et al. |
| 8,586,103 | B2 | 11/2013 | Li et al. |
| 8,821,429 | B2 | 9/2014 | Vargas |
| 8,828,953 | B2 | 9/2014 | Baron et al. |
| 8,863,746 | B2 | 10/2014 | Totz |
| 8,865,649 | B2 | 10/2014 | Hageman |
| 8,882,698 | B2 | 11/2014 | Levine et al. |
| 9,060,844 | B2 | 6/2015 | Kagan et al. |
| 9,066,536 | B2 | 6/2015 | Astrup et al. |
| 9,283,151 | B2 | 3/2016 | Porreca, Jr. |
| 9,528,645 | B2 * | 12/2016 | Dankbaar ............ F16L 37/091 |
| 9,713,578 | B2 | 7/2017 | Gabriel |
| 10,004,889 | B2 | 6/2018 | Silver |
| 10,085,922 | B2 | 10/2018 | Hershey et al. |
| 10,549,083 | B2 | 2/2020 | Davis |
| 10,857,068 | B2 | 12/2020 | Davis et al. |
| 10,918,848 | B1 | 2/2021 | Russo |
| 11,154,699 | B2 | 10/2021 | Knight |
| 2001/0036495 | A1 | 11/2001 | Ganan-Calvo |
| 2003/0130346 | A1 | 7/2003 | Kuzela et al. |
| 2003/0192552 | A1 | 10/2003 | Mongeon |
| 2003/0220413 | A1 | 11/2003 | Petereit et al. |
| 2004/0018190 | A1 | 1/2004 | Ando et al. |
| 2004/0132819 | A1 | 7/2004 | Auestad et al. |
| 2004/0197380 | A1 | 10/2004 | Wolf et al. |
| 2004/0234631 | A1 | 11/2004 | Hoie |
| 2005/0014345 | A1 | 1/2005 | Miyamoto et al. |
| 2005/0038415 | A1 | 2/2005 | Rohr et al. |
| 2005/0143459 | A1 | 6/2005 | Kuzela et al. |
| 2005/0154064 | A1 | 7/2005 | Piomelli et al. |
| 2005/0175763 | A1 | 8/2005 | Purpura et al. |
| 2006/0046969 | A1 | 3/2006 | Maggio |
| 2006/0141103 | A1 | 6/2006 | Heritage et al. |
| 2006/0178560 | A1 | 8/2006 | Saadat et al. |
| 2006/0204576 | A1 | 9/2006 | Petereit et al. |
| 2007/0198074 | A1 | 8/2007 | Dann et al. |
| 2007/0225555 | A1 | 9/2007 | Stefanchik |
| 2008/0020041 | A1 | 1/2008 | Ayres |
| 2008/0140020 | A1 | 6/2008 | Shirley |
| 2008/0183153 | A1 | 7/2008 | Enns |
| 2009/0011019 | A1 | 1/2009 | Jahagirdar et al. |
| 2009/0093767 | A1 | 4/2009 | Kelleher |
| 2009/0093839 | A1 | 4/2009 | Kelleher |
| 2009/0181109 | A1 | 7/2009 | Barker |
| 2009/0252767 | A1 | 10/2009 | Durig et al. |
| 2010/0016425 | A1 | 1/2010 | Vath |
| 2010/0056948 | A1 | 3/2010 | Hornby et al. |
| 2010/0203134 | A1 | 8/2010 | Chenevier et al. |
| 2010/0267643 | A1 | 10/2010 | Baron et al. |
| 2011/0065660 | A1 | 3/2011 | Baron et al. |
| 2011/0076326 | A1 | 3/2011 | Caillard et al. |
| 2011/0081400 | A1 | 4/2011 | Langford et al. |
| 2011/0117192 | A1 | 5/2011 | Navon et al. |
| 2011/0178005 | A1 | 7/2011 | Yamka et al. |
| 2011/0217380 | A1 | 9/2011 | Geraedts et al. |
| 2011/0268666 | A1 | 11/2011 | Friedman et al. |
| 2011/0268795 | A1 | 11/2011 | Fayad |
| 2012/0052151 | A1 | 3/2012 | Sannino et al. |
| 2012/0064143 | A1 | 3/2012 | Sharp et al. |
| 2012/0094942 | A1 | 4/2012 | Baron et al. |
| 2013/0035559 | A1 | 2/2013 | Hornby et al. |
| 2013/0150823 | A1 | 6/2013 | Montgomery et al. |
| 2013/0273154 | A1 | 10/2013 | Fayad et al. |
| 2013/0337055 | A1 | 12/2013 | Schentag et al. |
| 2014/0127299 | A1 | 5/2014 | Dordunoo |
| 2014/0127307 | A1 | 5/2014 | Venkatesh et al. |
| 2014/0127351 | A1 | 5/2014 | DiSilvestro |
| 2014/0141082 | A1 | 5/2014 | Gao |
| 2014/0193498 | A1 | 7/2014 | Baron et al. |
| 2014/0194805 | A1 | 7/2014 | Levine et al. |
| 2014/0294951 | A1 | 10/2014 | Fayad et al. |
| 2014/0377353 | A1 | 12/2014 | Brito |
| 2015/0038453 | A1 | 2/2015 | Hageman |
| 2015/0038583 | A9 | 2/2015 | Kabaradjian |
| 2015/0118298 | A1 | 4/2015 | Zhang et al. |
| 2015/0150894 | A1 | 6/2015 | Baron et al. |
| 2015/0173405 | A1 | 6/2015 | Van Der Beek et al. |
| 2015/0230510 | A1 | 8/2015 | Navia et al. |
| 2015/0306128 | A1 | 10/2015 | Armstrong |
| 2015/0320817 | A1 | 11/2015 | Astrup et al. |
| 2016/0361235 | A1 | 12/2016 | Swisher |
| 2017/0014310 | A1 | 1/2017 | Hyun et al. |
| 2018/0168216 | A1 | 6/2018 | Demetriades et al. |
| 2019/0350815 | A1 | 11/2019 | Swisher et al. |
| 2023/0149266 | A1 | 5/2023 | Kim et al. |

FOREIGN PATENT DOCUMENTS

| | | | |
|---|---|---|---|
| CA | 2897448 | A1 | 7/2014 |
| CA | 2899220 | A1 | 8/2014 |
| CA | 2747700 | C | 7/2019 |
| CN | 1555729 | A | 12/2004 |
| CN | 101125132 | A | 2/2008 |
| CN | 101223987 | A | 7/2008 |
| CN | 102935106 | A | 2/2013 |
| CN | 103211148 | A | 7/2013 |
| CN | 103284275 | A | 9/2013 |
| CN | 103300374 | A | 9/2013 |
| CN | 103385469 | A | 11/2013 |
| CN | 103416801 | A | 12/2013 |
| CN | 103478792 | A | 1/2014 |
| CN | 103584083 | A | 2/2014 |
| CN | 103652862 | A | 3/2014 |
| CN | 103719756 | A | 4/2014 |
| CN | 103750338 | A | 4/2014 |
| CN | 103766870 | A | 5/2014 |
| CN | 104107188 | A | 10/2014 |
| CN | 103478792 | B | 12/2014 |
| CN | 104187670 | A | 12/2014 |
| CN | 104286849 | A | 1/2015 |

(56) References Cited

FOREIGN PATENT DOCUMENTS

| | | | |
|---|---|---|---|
| CN | 104305206 | A | 1/2015 |
| CN | 104623097 | A | 5/2015 |
| CN | 104856059 | A | 8/2015 |
| CN | 107822899 | A | 3/2018 |
| CN | 110559547 | A | 12/2019 |
| CN | 216603119 | U | 5/2022 |
| EP | 0724 842 | A2 | 8/1996 |
| EP | 0898900 | A2 | 3/1999 |
| EP | 1129711 | A2 | 9/2001 |
| EP | 1371368 | A1 | 12/2003 |
| EP | 1143988 | B1 | 2/2004 |
| EP | 1513541 | B1 | 1/2009 |
| EP | 2085089 | A1 | 8/2009 |
| EP | 2269685 | B1 | 7/2014 |
| JP | 6101705 | B2 | 3/2017 |
| JP | 6991205 | B2 | 1/2022 |
| WO | WO 2011/059672 | A2 | 5/2011 |
| WO | WO 2012/055577 | A1 | 5/2012 |
| WO | WO 2014/134225 | A2 | 9/2014 |
| WO | WO 2014/197632 | A2 | 12/2014 |
| WO | WO 2014/204382 | A1 | 12/2014 |
| WO | WO 2015/063038 | A1 | 5/2015 |
| WO | WO 2015/085010 | A1 | 6/2015 |
| WO | WO 2015/086467 | A1 | 6/2015 |
| WO | WO 2015/120471 | A1 | 8/2015 |
| WO | WO 2015/140798 | A2 | 9/2015 |
| WO | WO 2016/205701 | A1 | 12/2016 |
| WO | WO 2016/205754 | A1 | 12/2016 |

OTHER PUBLICATIONS

Aron-Wisnewsky J et al. (2012), "The importance of the gut microbiota after bariatric surgery", Nat Rev Gastroenterol Hepatol., 9(10): 590-598.
Ashrafian H et al. (2011), "Diabetes resolution and hyperinsulinaemia after metabolic Roux-en-Y gastric bypass", obesity reviews, 12(5): e257-e272.
Beckman L M et al. (2011), "Changes in gastrointestinal hormones and leptin after Roux-en-Y gastric bypass surgery", JEPN J Parenter Enteral Nutr., 35(2):169-180.
Bradley D et al. (2012), "Effects of bariatric surgery on glucose homeostasis and type 2 diabetes", Gastroenterology, 143(4):897-912.
Buchwald H et al. (2004), "Bariatric surgery: a systematic review and meta-analysis", JAMA, 292(14): 1724-1737.
Colditz G A et al. (1995), "Weight gain as a risk factor for clinical diabetes mellitus in women", Ann Intern Med., 122(7):481-486.
COMPAT Educational Page, "A guide for selecting the appropriate nasogastric tube", 6 pages.
De Jonge C et al. (2011), "Endobarrier (TM) Gastrointestinal Liner Treatment Rapidly Improves Diabetes Parameters Paralleled by Increased Postprandial GLP-1 and PYY Levels in Obese Type 2 Diabetic Patients", Poster 83 Poster Sessions and Abstract Book 2nd World Congress on Interventional Therapies for Type 2 Diabetes Poster Presentation in Conference Proceedings, New York Mar. 2011.
Deane A M et al. (2009), "Evaluation of a bedside technique for postpyloric placement of feeding catheters", Crit Care Resusc., 11(3):180-183.
Dirksen C et al. (2010), "Postprandial diabetic glucose tolerance is normalized by gastric bypass feeding as opposed to gastric feeding and is associated with exaggerated GLP-1 secretion: a case report", Diabetes Care, 33(2): 375-377.
ENFit™ Connector Transition Guide: Your Guide to the ENFit Enteral Feeding Connector Transition, Boston Scientific, 2 pages.
ENFit® Nasogastric (NG)/Nasointestinal (ND, NJ) Feeding Tube: Care and Use Instructions, Avanos, 2023, 28 pages.
Enteral Feeding System Accessories: All You Need for Reliable Tube Feeding, MEDLINE, 8 pages.
Galera S C et al. (2010), "The safety of oral use of L-glutamine in middle-aged and elderly individuals", Nutrition, 26(4):375-381.
Gaylinn B D et al. (2010), "Luminal influences to orchestrate gastroenterological hormone secretion: the fat, long-chain Fatty Acid, cholecystokinin, glucagon-like Peptide 1 axis", J Clin Endocrinol Metab., 95(2):503-504.
Geraedts M C et al. (2011), "Intraduodenal administration of intact pea protein effectively reduces food intake in both lean and obese male subjects", PLoS One. 2011, 6(9):e24878.
Greenfield J R et al. (2009), "Oral glutamine increases circulating glucagon-like peptide 1, glucagon, and insulin concentrations in lean, obese, and type 2 diabetic subjects", Am J Clin Nutr., 89(1):106-113.
Hall K D et al. (2011), "Quantification of the effect of energy imbalance on bodyweight", Lancet, 378(9793): 826-837.
Hansen E N et al. (2011), "Role of the foregut in the early improvement in glucose tolerance and insulin sensitivity following Roux-en-Y gastric bypass surgery", Am J Physiol Gastrointest Liver Physiol., 300(5): G795-802.
Holzinger U et al. (2011), "Jejunal tube placement in critically ill patients: A prospective, randomized trial comparing the endoscopic technique with the electromagnetically visualized method", Crit Care Med., 39(1):73-77.
International Search Report and Written Opinion dated Oct. 28, 2016, from application No. PCT/US2016/038244.
International Search Report and Written Opinion dated Sep. 7, 2016, from application No. PCT/US2016/038159.
Jacobsen S H et al. (2012), "Changes in gastrointestinal hormone responses, insulin sensitivity, and beta-cell function within 2 weeks after gastric bypass in non-diabetic subjects", Obes Surg., 22(7):1084-1096.
Kaushik, N et al. (2005) "Enteral Feeding Without Pancreatic Stimulation," Pancreas 31(4):353-359.
Kielgast U et al. (2011), "Antidiabetic Actions of Endogenous and Exogenous GLP-1 in Type 1 Diabetic Patients With and Without Residual Beta-Cell Function", Diabetes, vol. 60, pp. 1599-1607.
Maahs DM et al. (2010), "Epidemiology of type 1 diabetes", Endocrinol Metab Clin North Am. 2010, 39(3):481-497.
Martins et al. (2009), "Glucose Tolerance in the Proximal Versus the Distal Small Bowel in Wistar Rats", Obes Surg., 19:202-206.
Medela, Enteral Feeding Solutions: A holistic approach to enteral feeding, 12 pages.
Mendez C E et al. (2010), "Outcomes of Roux-en-Y gastric bypass surgery for severely obese patients with type 1 diabetes: a case series report", Diabetes Metab Syndr Obes., 3:281-283.
Mingrone G et al. (2012), "Bariatric Surgery versus Conventional Medical Therapy for Type 2 Diabetes", N Engl J Med 2012, 366(17):1577-1585.
NutraGlide®, NG/NJ Nasal Feeding Tubes, "Changing the Standard of Care for Nasal Feeding", AMT, http://web.archive.org/web/20230315041552/https://www.appliedmedical.net/enteral/nutraglide/, retrieved on Mar. 15, 2023.
Nutricia Flocare® Bengmark Tubes, "Flocare Bengmark naso-intestinal tube is required for direct feeding into the intestine for a short period of time", https://www.nutriciaflocare.com/Flocare2020/Bengmark_tube.php, retrieved on Sep. 22, 2025.
Nutrisafe2® Product Catalogue, Enteral Nutrition, VYGON, 12 pages.
Olivan B et al. (2009), "Effect of weight loss by diet or gastric bypass surgery on peptide YY3-36 levels", Ann Surg., 249(6):948-953.
Paniagua J A et al. (2007), "A MUFA-rich diet improves posprandial glucose, lipid and GLP-1 responses in insulin-resistant subjects", J Am Coll Nutr., 26(5):434-444.
Pournaras D J et al. (2009), "Obesity, gut hormones, and bariatric surgery", World J Surg., 33(10):1983-1988.
Rubino F et al. (2010), "Metabolic Surgery to Treat Type 2 Diabetes: Clinical Outcomes and Mechanisms of Action", Annu Rev Med 2010, 61:393-411.
Samocha-Bonet D et al. (2011), "Glutamine reduces postprandial glycemia and augments the glucagon-like peptide-1 response in type 2 diabetes patients", J Nutr., 141(7):1233-1238.

(56) References Cited

OTHER PUBLICATIONS

Schouten R et al. (2010), "A multicenter, randomized efficacy study of the EndoBarrier Gastrointestinal Liner for presurgical weight loss prior to bariatric surgery", Ann Surg., 251(2):236-243.
Suarez-Pinzon WL et al. (2011), "Combination therapy with a dipeptidyl peptidase-4 inhibitor and a proton pump inhibitor induces Beta-cell neogenesis from adult human pancreatic duct cells implanted in immunodeficient mice", Cell Transplant, 20(9): 1343-1349.
Sumithran P et al. (2011), "Long-Term Persistence of Hormonal Adaptations to Weight Loss", N Engl J Med 2011, 365(17): 1597-1604.
Tube Feeding Resource Guide, Coram®* CVS Specialty® Infusion Services, 80 pages.
Understanding The Difference: MINI Classic Ballon Button vs. MiniONE® Ballon Button, AMT, 1 page.
Ward E et al. (2003), "Oral glutamine in paediatric oncology patients: a dose finding study", Eur J Clin Nutr., 57(1):31-36.
Welch, I.M et al. (1988) "Comparisons of the effects on satiety and eating behavior of infusion of lipid into the different regions of the small intestine," Gut 29:306-311.
Willett W C et al. (1999), "Guidelines for healthy weight", N Engl J Med., 341(6):427-434.
ISO Copyright Office, "Small-bore connectors for liquids and gases in healthcare applications—Part 1: General Requirements," International Standard ISO 80369-1, Nov. 2018.
Search Report and Written Opinion in corresponding International Patent Application No. PCT/US2025/027904, mailed Aug. 19, 2025, in 17 pages.
40077 Rev-NR, Male ENFIT Connector, Purple, Sep. 22, 2017, 1 page.
AVANOS Digestive Health Catalog, "Enteral Feeding is a Vital Lifeline", 53 pages.
Ackerman et al., Technologic Approaches to Determining Proper Placement of Enteral Feeding Tubes, AACN Advanced Critical Care, vol. 17, No. 3.
Beglinger et al., "Role of Fat Hydrolysis in Regulating Glucagon-Like Peptide-1 Secretion," J. Clin. Endocrinol Metab., 95(2), Feb. 2010.
Bosi, Emanuele, "Time for Testing Incretin Therapies in Early Type 1 Diabetes?", J. Clin. Endocrinol Metab., 95(6), Jun. 2010.
CardinalHealth ™ Kangaroo, Kangaroo™ Nutritional Delivery Products: The Complete Enteral Feeding Solution, 28 pages.
Catheters & Specialty Medical Tubing, Heathcare Solutions, Selection Guide, 8 pages.
Chaikomin et al., "Effects of mid-jejunal compared to duodenal glucose infusion on peptide hormone release and appetite in healthy men," Regulatory Peptides, 150 (2008) 38-42.
ClinicalTrials.gov, "Levodopa-Carbidopa Intestinal Gel Open-Label Study in Advanced Parkinson's Disease", Retrieved from http://clinicaltrials.gov/ct2/sho/NCT00335153 in Aug. 2016.
Czupryniak et al., "Long-Term Results of Gastric Bypass Surgery in Morbidly Obese Type 1 Diabetes Patients," Obes. Surg. (2010) 20.
Falken et al., "Changes in glucose homeostasis after Roux-en-Y gastric bypass surgery for obesity at day three, two months, and one year after surgery: role of gut peptides", J Clin Endocrinol Metab., vol. 96, No. 7, Jul. 2011, pp. 2227-2235.
Flegal et al., "Prevalence of Obesity and Trends in the Distribution of Body Mass Index Among US Adults, 1999-2010", JAMA, vol. 307, No. 5, 2012, pp. 491-497.
Foster-Schubert et al. "Acyl and Total Ghrelin are Suppressed Strongly by Ingested Proteins, Weakly by Lipids, and Biphasically by Carbohydrates", J Clin Endocrinol Metab., vol. 93, No. 5, May 2008, pp. 1971-1979.
Gabriel Feeding Tube with Balloon, GFTB 412, Nov. 2019, 2 pages.
Gray et al., "Bedside Electromagnetic-Guided Feeding Tube Placement: An Improvement Over Traditional Placement Technique?", Nutrition in Clinical Practice, 22, Aug. 2007.
Hansen et al., "2-Oleoyl Glycerol is a GPR119 Agonist and Signals GLP-1 Release in Humans", J Clin Endocrinol Metab., vol. 96, No. 9, Sep. 2011, pp. E1409-1417.
Koopmann et al., "A Team-Based Protocol and Electromagnetic Technology Eliminate Feeding Tube Placement Complications," Annals of Surgery, vol. 253, No. 2, Feb. 2011.
Laferrere et al., "Effect of Weight Loss by Gastric Bypass Surgery Versus Hypocaloric Diet on Glucose and Incretin Levels in Patients with Type 2 Diabetes", J Clin Endocrinol Metab, vol. 93, No. 7, Jul. 2008, pp. 2479-2485.
Layer et al., "lleal Release of Glucagon-Like Peptide-1 (GLP-1) Association with Inhibition of Gastric Acid Secretion in Humans," Digestive Diseases and Sciences, vol. 40, No. 5, May 1995.
MacKay et al., "Corpak with Cortrak", Poster, Presented at Saint Joseph Health System; Jan. 2009; Lexington, KY.
Martinelli et al., "Evaluation of the Preparation and Compounding Process for Parenteral Nutrition Therapy: A Comparison of Automated Compounding to Premix in the Hospital Pharmacy," Nutrition in Clinical Practice, vol. 24, No. 1, Feb./Mar. 2009.
Mic-Key Continuous Feed Extension Set, AVANOS, Jun. 9, 2020, 2 pages.
Mic-Key G Feeding Tube, Your Guide to Proper Care, HALYARD, 20 pages.
MiniOne Button, Low Profile Ballon Gastrostomy Tube, AMT, 2 pages.
Nakatani et al., "Serum bile acid along with plasma incretins and serum high-molecular weight adiponectin levels are increased after bariatric surgery," Metabolism Clinical and Experimental 58 (2009).
NIH Conference, "Gastrointestinal Surgery for Severe Obesity," Consensus Development Conference Panel, Annals of Internal Medicine, vol. 115, No. 12, Dec. 15, 1991.
Phang et al., Feeding Tube Placement with the Aid of a New Electromagnetic Transmitter, Clinical Nutrition Week, Mar.-Apr. 2006.
Pournaras et al., "Remission of Type 2 Diabetes After Gastric Bypass and Banding," Annals of Surgery, vol. 252, No. 6, Dec. 2010.
Schauer et al., "Bariatric Surgery versus Intensive Medical Therapy in Obese Patients with Diabetes", New England Journal of Medicine, vol. 366, No. 17, 2012, pp. 1567-1576.
Stefater et al., "All Bariatric Surgeries Are Not Created Equal: Insights from Mechanistic Comparisons," Endocrine Reviews, Aug. 2012, 33(4).
Stockdale et al., "Nasoenteric Feeding Tube Insertion Utilizing an Electromagnetic Tube Placement System," Nutrition Practice Poster Abstracts, vol. 22, No. 1, Feb. 2007.
Taylor et al.,"Treating Delayed Gastric Emptying in Critical Illness: Metoclopramide, Erythromycin, and Bedside (Cortrak) Nasointestinal Tube Placement," Journal of Parentteral and Enteral Nutrition, vol. 34, No. 3, May 2010.
Tiger 2™ Self-Advancing Nasal Jejunal Feeding Tube, COOK Medical, 2008, 6 pages.
Trotter et al., "Electromagnetic guided feeding tube insertion: Enhancing patient safety," Poster presentation at 40th Society of Critical Care Medicine Conference, San Diego, California, Jan. 15-19, 2011.
Vantyghem et al., "Diabetes cell therapy: a decade later," Minerva Endocrinol, vol. 36, No. 1, Mar. 2011.
Wayback Machine, "A New Approach to Weigh Loss", http://www.aspirebariatrics.com/about-the-aspireassist/, accessed on Jul. 19, 2016, 7 pages.
Wayback Machine, ValenTx, Our Technology, http://www.valentx-com-technology-php, accessed on Jul. 16, 2016, 1 page.
Wayback Machine, "Muscle Milk 100 Calories", Muscle Milk Products, http://www.musclemilk.com/products/muscle-milk/muscle-milk-light-100-calorie-ready-to-drink/, accessed on Mar. 8, 2016, 3 pages.
Wayback Machine, "Tiger 2™ Self-Advancing Nasal Jejunal Feeding Tube", https://www.cookmedical.com/products/cc_nift_webds/, accessed on Oct. 4, 2015, 1 page.
Wayback Machine, DUOPA, https://www.duopa.com, accessed on Aug. 5, 2016, 2 pages.
Wayback Machine, "Cortrak® Enteral Access System",http://www.corpakmedsystems.com/cortrak-product-page/cortrak, accessed on Jul. 23, 2016, 3 pages.

(56) References Cited

OTHER PUBLICATIONS

Wayback Machine, "Alain Baron on weigh management and satiety", http://www.foodbev.com/news/alain-baron-on-weight-management-and-sat, accessed on Dec. 7, 2012, 2 pages.
Wayback Machine, "Learn About EndoBarrier® Therapy", http://www.gidynamics.com/endobarrier-overview.php, accessed on Aug. 31, 2016, 1 page.
Wayback Machine, "A Sleeve for Your Small Intestine: Interview with GI Dynamics Founder, Andy Levine", http://www.medgadget.com/2013/04/a-sleeve-for-your-small-intestine-interview-with-gi-dynamics-founder-andy-levine.html, accessed on Apr. 10, 2013, 3 pages.
Weiner et al., "Impact of Bariatric Surgery on Health Care Costs of Obese Persons: A 6-Year Follow-up of Surgical and Comparison Cohorts Using Health Plan Data", JAMA Surg, vol. 148, No. 6, Jun. 2013, pp. 555-562.

* cited by examiner

INTRAORAL GASTROINTESTINAL ACCESS DEVICE AND RELATED METHODS

CROSS REFERENCE

This application claims the priority benefit of U.S. Provisional Application No. 63/743,174, filed Jan. 8, 2025, and U.S. Provisional Application No. 63/644,775, filed May 9, 2024, which are hereby incorporated by reference in their entireties. All applications for which a foreign or domestic priority is identified in the Application Data Sheet as filed with the present application are hereby incorporated by reference under 37 CFR 1.57.

FIELD

This disclosure relates to gastrointestinal access devices, such as intraorally secured gastrointestinal access devices for delivering nutrition or medication directly to a patient's digestive system.

BACKGROUND

Feeding tubes are used to deliver substances directly to a gastrointestinal tract site, such as the stomach or intestine, of a patient. Nasogastric feeding tubes are typically taped to a patient's face and passed through the patient's nostril, down the esophagus, and to the gastrointestinal tract site or routed through the patient's nostril with a nasal bridle, down the esophagus, and to the gastrointestinal tract site. Percutaneous feeding tubes are secured to a patient's abdominal skin and passed through the abdominal wall and into the gastrointestinal tract site.

SUMMARY

Feeding tubes can advantageously deliver substances directly to a specific gastrointestinal tract site of a patient and bypass others. However, current feeding tubes are secured on an exterior of the patient's body, such as the face or abdomen, which can be uncomfortable, prone to dislodgement, and/or visually unaesthetic. Improved configurations may enhance the usability of feeding tubes, improving regular nutrition and/or patient compliance with prescribed medication regimen for a greater number of patients.

The intraoral gastrointestinal access devices and related methods disclosed herein can address one or more of the foregoing issues and others. The intraoral gastrointestinal access devices are secured within a mouth of the user, rather than only on an exterior of the patient's body. Accordingly, the intraoral gastrointestinal access devices are substantially concealed when not flowing a substance into the intraoral gastrointestinal access device for delivery to a target gastrointestinal tract site. The intraoral gastrointestinal access devices are not routed through the nostril or surgically through the abdominal wall, which improves patient comfort and ease. Securing the intraoral gastrointestinal access device within the mouth can also protect against dislodgement.

The intraoral gastrointestinal access devices and related methods disclosed herein can be used to assist a variety of patients. For example, the intraoral gastrointestinal access devices can assist cancer patients that have inadequate oral intake, nausea, and/or vomiting when attempting to orally consume substance. The intraoral gastrointestinal access devices can assist patients with esophageal and/or swallowing problems (e.g., dysphagia) and/or gastrointestinal disorders such as Crohn's Disease, disease associated malnutrition, and/or chronic inflammation. The intraoral gastrointestinal access devices can assist obese patients with weight loss. For example, similar to the appetite suppressing mechanism of bariatric surgery, the intraoral gastrointestinal access devices can bypass the stomach and deliver substance directly to the small intestine. The foregoing examples of patients that can benefit from the disclosed intraoral gastrointestinal access devices are not exhaustive or limiting.

The intraoral gastrointestinal access devices described herein can deliver any substance (e.g., consumable substance, flowable substance) to a gastrointestinal site. For example, the substance can include any one or more of food, nutrients, medicaments, nutraceuticals, dietary supplements, hormones, therapies, non-nutrient gastrointestinal stimulants, and/or others. In some variants, the intraoral gastrointestinal access devices described herein can be used to deliver an observation device, such as a camera capsule, to a gastrointestinal site. In some variants, the intraoral gastrointestinal access devices described herein can be used to deliver an electrode to a gastrointestinal site to apply electrical energy. In some variants, the intraoral gastrointestinal access devices described herein can include a balloon. The balloon can be coupled to a conduit and/or track that is disposed at a gastrointestinal site inside the user. The balloon can apply pressure for therapeutic effect, aid in retaining the conduit and/or track at a target gastrointestinal site, and/or aid in placing and/or monitoring a location of the conduit and/or track inside the user. For example, in some variants, the balloon can be filled with fluid, which can be used by an ultrasound system to identify and/or monitor a location of the balloon in the gastrointestinal tract.

BRIEF DESCRIPTION OF THE DRAWINGS

The abovementioned and other features of the embodiments disclosed herein are described below with reference to the drawings of the embodiments. The illustrated embodiments are intended to illustrate, but not to limit, the scope of protection. Various features of the different disclosed embodiments can be combined to form further embodiments, which are part of this disclosure.

DETAILED DESCRIPTION OF CERTAIN EMBODIMENTS

Although certain embodiments and examples are described below, this disclosure extends beyond the specifically disclosed embodiments and/or uses and obvious modifications and equivalents thereof. Thus, it is intended that the scope of this disclosure should not be limited by any particular embodiments described below.

A. Nasogastric Feeding Device—FIG. 1

Figure 1:
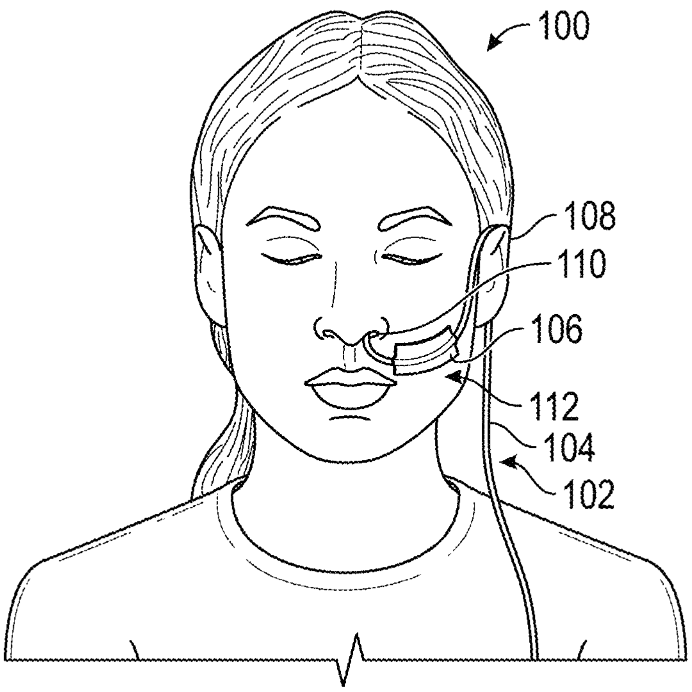
FIG. 1 illustrates an example nasogastric feeding device anchored on a patient's face.

FIG. 1 illustrates an example nasoenteral feeding device 102, which can also be referred to as a nasogastric feeding tube, nasal feeding device, and/or nasal feeding tube, in use by a patient 100. The nasogastric feeding device 102 can include a conduit 104 through which substance can be delivered to a gastrointestinal tract site. The conduit 104 can be routed around an ear 108, across a cheek 112, and through a nostril 110 of the patient 100. The conduit 104 can continue down the esophagus and terminate at the gastrointestinal tract site (e.g., stomach, small intestine, large intestine, etc.). The conduit 104 can be secured in place by tape 106 on the cheek 112 of the patient 100. As illustrated, the nasogastric feeding device 102 is highly visible, exposed over a long span and as a result is at risk of inadvertent dislodgement. The tape 106 likely needs to be frequently changed to be kept clean, and thus is a source of discomfort. Routing the conduit 104 through the nostril 110 of the patient 100 is another source of discomfort, making long-term use of the feeding device 102 disadvantageous.

B. Intraoral Gastrointestinal Access Device Overview—FIG. 2

Figure 2:
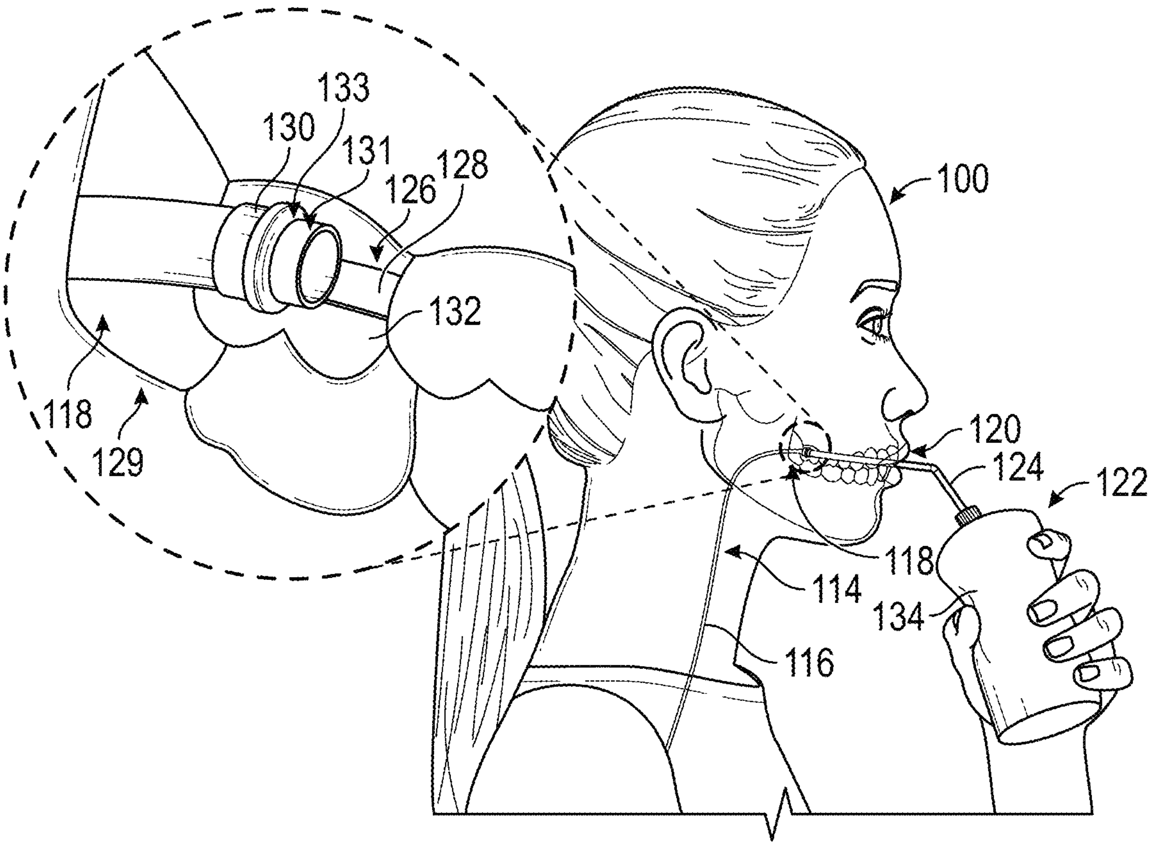
FIG. 2 illustrates an intraoral gastrointestinal access device anchored in a patient's mouth.

FIG. 2 illustrates an example intraoral gastrointestinal access device 114, which can also be referred to as an intraoral device, intraorally-anchored device, intraoral delivery device, intraoral feeding tube, intraorally-anchored feeding device, and/or intraorally-anchored feeding tube, in use by the patient 100. The patient is one user of the intraoral gastrointestinal access device 114. The intraoral gastrointestinal access device 114 can be secured inside a mouth 120 of the patient 100 as opposed to an exterior (e.g., cheek, skin, etc.) of the patient 100, which can conceal the intraoral gastrointestinal access device 114 when substance is not being delivered to the intraoral gastrointestinal access device 114. For example, the intraoral gastrointestinal access device 114, in some variants, is not visible when the mouth 120 of the patient 100 is closed. In some variants, even when the mouth 120 of the patient 100 is opened, the intraoral gastrointestinal access device 114 can be largely concealed from the view of others. Accordingly, the intraoral gastrointestinal access device 114 can be concealed, protected inside the mouth 120 of the patient 100 from inadvertent dislodgement, and/or not secured (e.g., by tape) to skin of the patient 100 or routed through the nostril of the patient 100.

The intraoral gastrointestinal access device 114 can include a conduit 116 (e.g., tube, track, hose) through which substance can be delivered to a gastrointestinal tract site of the patient 100. The conduit 116 can include a first portion 118 that is anchored inside of a mouth 120 of the patient 100 and a second portion disposed inside of the patient 100 at a site along the gastrointestinal tract to deliver substance flowing through the conduit 116. The conduit 116 can include an internal lumen extending therethrough that can fluidically connect the first portion 118 and the second portion. The first portion 118 can receive substance to be delivered to the gastrointestinal tract site by way of the second portion. The second portion can include an atraumatic end (e.g., rounded end). The second portion can include one or more openings to deliver substance. For example, the second portion can include one or more openings proximate the end and/or along a segment of the second portion prior to the end. In some variants, the second portion can be positioned at a target gastrointestinal tract site with the assistance of a guide wire (e.g., bedside electromagnetic guide wire). In some variants, the second portion can be anchored, which can include temporarily anchored, at the target gastrointestinal tract site with an anchoring mechanism. The second portion can include an adhesive (e.g., bioadhesive) to anchor the second portion on internal anatomy of the patient 100. In some variants, the adhesive can release the second portion through gradual loss of adhesive. The second portion can include a balloon, which can at least be expanded with fluid and/or air to contact internal anatomy of the patient, to impede movement (e.g., retrograde migration) of the second portion. In some variants, the balloon can be deflated to release the second portion. The second portion can include an expandable stent to anchor the second portion. In some variants, the expandable stent can be collapsed to release the second portion. The second portion can include barbs to anchor the second portion. The anchoring mechanism that anchors the second portion at the gastrointestinal tract site can be released (e.g., overcome traction with anatomy at gastrointestinal tract site) by pulling on the conduit to release the anchoring mechanism from the anatomy at the gastrointestinal tract site.

The intraoral gastrointestinal access device 114 can include a port 131 (e.g., connector, interface, valve, opening, luer, needleless access connector type valve, therapeutic loading site). The port 131 can be disposed (e.g., adhered, bonded) along the first portion 118, which can include at an end of the first portion 118. The port 131 can receive and direct substance into the first portion 118 of the conduit 116. In some variants, the port 131 can interface (e.g., couple, engage, interlock) with a delivery tube 124 (e.g., rigid tube) of a delivery device 122 to receive substance from the delivery device 122. The delivery device 122 can include a reservoir 134 (e.g., bottle, squeeze bottle, container, syringe, pouch, bag) that can hold substance to be delivered to the gastrointestinal tract site. Substance within the reservoir 134 can be urged (e.g., squeezed, gravity fed, and/or pumped) out of the reservoir 134, through the delivery tube 124, and into the first portion 118 of the intraoral gastrointestinal access device 114 by way of the port 131. As discussed further below, in some variants, the port 131 can include a cap that can impede access into the port 131 and/or first portion 118. In some variants, a segment of the port 131 can include a valve (e.g., one-way valve) that impedes access into the port 131 and/or first portion 118 unless the delivery device 122 is interfaced with the port 131 to provide substance.

The port 131 and/or first portion 118 can be coupled to an anchor 126 secured inside the mouth 120 of the patient 100. The anchor 126 can include an orthodontic band 128 (e.g., molar band) disposed around a tooth 132 (e.g., molar, premolar) of the patient 100 to secure the anchor 126 to the tooth 132. In some variants, the anchor 126 can include a bonding surface that is bonded (e.g., adhered) to the tooth 132 of the patient 100 to secure the anchor 126 to the tooth 132. In some variants, the anchor 126 is coupled (e.g., screwed) to a jawbone of the patient 100 to secure the anchor 126 in the mouth 120. In some variants, the anchor 126 includes an arcuate member that can be positioned in a vestibule 129 (e.g., between one or more cheeks and buccal sides of the teeth) of the mouth 120 to secure the anchor 126 in the mouth 120. The arcuate member can be disposed along the gingiva covering the maxillary alveolar process or mandibular alveolar process of the mouth 120 to secure the anchor 126 in the mouth 120. Adhesive (e.g., bioadhesive, mucosal bioadhesive, denture fixative, and/or others) can be used to secure the arcuate member within the mouth 120 (e.g., to the gingiva, teeth, and/or other anatomical feature), which can include helping to secure the arcuate member within the mouth 120 in addition to a primary anchor or as the primary securement mechanism. The arcuate member can be sized to prevent swallowing by the patient 100. In some variants, the anchor 126 can include a tray (e.g., teeth tray, polymer tray, clear tray) that sits on one or more teeth of the patient to secure the anchor 126 in the mouth 120. In some variants, the anchor 126 can include a retainer (e.g., Hawley-style retainer) with a labial archwire, claps, and/or a palatal or lingual base (e.g., polymer, such as acrylic, base) to secure the anchor 126 in the mouth 120. In some variants, the port 131, first portion 118, anchor 126, and/or another component of the intraoral gastrointestinal access device 114 can be secured within the mouth 120 with an adhesive, which can at least include those described herein. In some variants, the port 131, first portion 118, anchor 126, and/or another component of the intraoral gastrointestinal access device 114 can be secured to any mucosa of the mouth 120, which can at least include gingival mucosa, vestibular mucosa, keratinized mucosa, non-keratinized mucosa, lining mucosa, masticatory mucosa, and/or specialized mucosa. In some variants, the port 131, first portion 118, anchor 126, and/or another component of the intraoral gastrointestinal access device 114 can be secured to the palate. For example, the intraoral gastrointestinal access device 114 can include a thin layer of material that can be suctioned to the palate or other mucosa. The thin layer of material can be made of a polymer, such as silicone. Any of the intraoral gastrointestinal access devices described herein can include one or more of the foregoing features.

The anchor 126 can include a coupler 130 (e.g., mating feature, retention feature) that can couple the port 131 and/or first portion 118 to anchor 126. The coupler 130 can impede the port 131 and/or first portion 118 from moving distally in the mouth 120 and down an esophagus of the patient 100. The coupler 130 can impede the port 131 and/or first portion 118 from being removed from mouth 120 of the patient 100. In some variants, the coupler 130 can include an annular structure (e.g., band) that can be disposed around the port 131 and/or first portion 118 to secure the port 131 and/or first portion 118 to the anchor 126. The first portion 118 can be disposed through the coupler 130.

In some variants, the port 131 can include a retention feature 133 that can interface with the coupler 130 of the anchor 126. For example, the retention feature 133 can include a protrusion (e.g., annular protrusion, ridge, lip) that interfaces with the coupler 130 of the anchor 126 to prevent distal movement of the port 131 and/or first portion 118 relative to the coupler 130. The retention feature 133 can enlarge the periphery (e.g., outer diameter) of the port 131 such that the port 131 cannot pass through the coupler 130. The interface between the retention feature 133 and the coupler 130 can prevent distal movement of the port 131 and/or first portion 118 relative to the anchor 126. In some variants, the delivery device 122 can interface the port 131 with the port 131 coupled to the anchor 126 inside the mouth 120 to deliver substance, as shown in FIG. 2. The conduit 116 can have a length to position the second portion of the conduit 116 at a gastrointestinal tract site (e.g., stomach, upper intestine, lower intestine) when coupled with the port 131 coupled to the anchor 126.

In some variants, the interface between the retention feature 133 and the coupler 130 can prevent distal movement of the port 131 and/or first portion 118 relative to the anchor 126 but permit proximal movement of the port 131 and/or first portion 118 relative to the anchor 126 such that the port 131 and/or conduit 116 can be removed from the patient 100 by proximally retracting the port 131 to pull the conduit 116 through the coupler 130 and out of the patient 100. In some variants, the port 131 can remain inside the mouth 120 while interfacing with the delivery device 122 (e.g., delivery tube 124) to receive substance. In some variants, the patient 100 can proximally retract the port 131 outside the mouth 120 to interface with the delivery device 122. The conduit 116 can include one or more indicators (e.g., markings) to warn the patient 100 when to stop proximal retraction such that the second portion of the conduit 116 is properly positioned along the gastrointestinal tract.

In some variants, the port 131 can be uncoupled from the anchor 126 to facilitate removal of the port 131 and/or conduit 116 from the patient 100. For example, the port 131 and/or conduit 116 can be removed for replacement. In some instances, the patient 100 may only periodically have a need or desire to receive substance by way of intraoral gastrointestinal access device 114. For example, for obese patients 100, the patient 100 can receive some or all daily nutrient as a substance by way of the intraoral gastrointestinal access device 114 for a first duration (e.g., several days, a week, etc.) to lose weight, resume only orally consuming substance (e.g., solid food) for a second duration (e.g., one or more weeks or months), and then once again receive substance by way of the intraoral gastrointestinal access device 114 for a third duration (e.g., several days, a week, etc.) to lose additional weight. When the patient 100 has resumed only oral consumption of substance, the port 131 and conduit 116 can be removed but the anchor 126 left in place. The anchor 126 can have a low profile for comfort. When the patient 100 resumes receiving substance by way of the intraoral gastrointestinal access device 114, a conduit 116 can be routed through the coupler 130 and a port 131 coupled to the first portion 118 of the conduit 116 can be coupled to the anchor 126. This can advantageously enable the patient 100 to conveniently switch between orally consuming substance and receiving substance by way of the intraoral gastrointestinal access device 114. For example, in some variants, the patient 100 can remove and replace the port 131 and conduit 116. In some variants, a clinician can remove and replace the port 131 and conduit 116. In some variants, the anchor 126 can be removed when the patient 100 has resumed oral consumption of substance. In some variants, a clinician (e.g., orthodontist) can secure the anchor 126 in the mouth 120 of the patient 100 (e.g., place the band 128 around the tooth 132, bond the anchor 126 to tooth 132). In some variants, the patient 100 can secure the anchor 126 in the mouth 120.

C. Conduit Placement Within Gastrointestinal Tract—FIGS. 3A and 3B

The various intraoral gastrointestinal access devices described herein can directly deliver substance to any site of the gastrointestinal tract. As described herein, the intraoral gastrointestinal access devices can include a conduit with a second portion disposed inside the patient along the gastrointestinal tract. The second portion can deliver substance introduced into a first portion of the conduit to a gastrointestinal tract site while by passing other portions of the gastrointestinal tract.

Figure 3A:
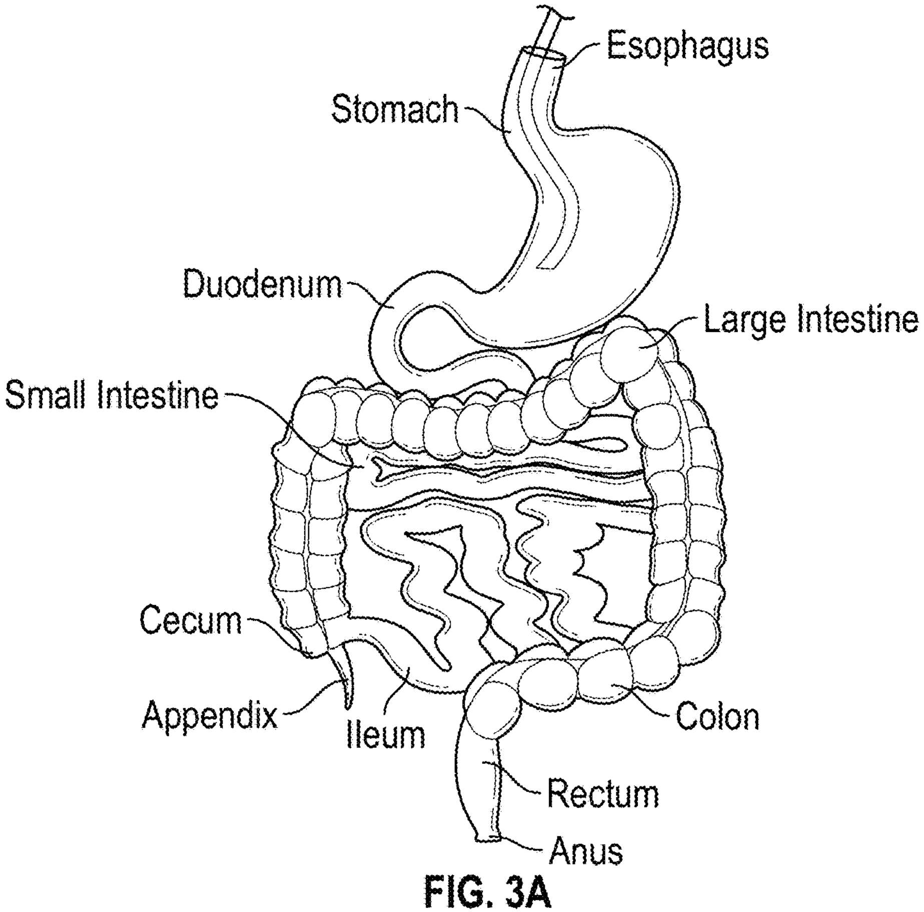
FIG. 3A illustrates a gastrointestinal tract.

FIG. 3A illustrates different portions of the gastrointestinal tract. The gastrointestinal tract can at least include the mouth, esophagus, stomach, duodenum, small intestine, cecum, appendix, large intestine, ileum, colon, rectum, and/or anus. The intraoral gastrointestinal access devices described herein can be used to directly deliver substance to the stomach, duodenum, small intestine, and/or large intestine or any other site of the gastrointestinal tract.

Figure 3B:
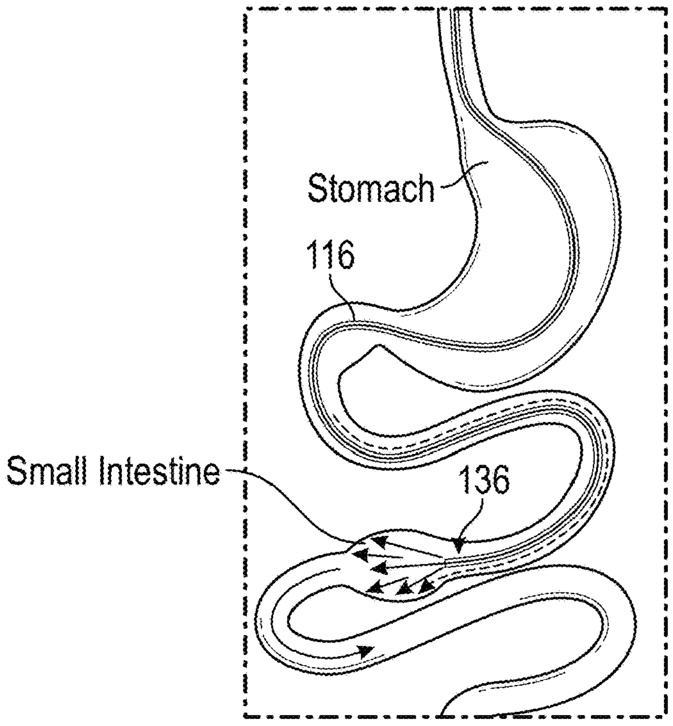
FIG. 3B illustrates an end of a conduit of an intraoral gastrointestinal access device positioned at a gastrointestinal site within the small intestine to bypass the mouth, esophagus, and stomach to deliver substance directly to the small intestine.

For example, as illustrated in FIG. 3B, the conduit 116 of the intraoral gastrointestinal access devices described herein can include a second portion 136. The conduit 116 can have a length to position the second portion 136 at a target gastrointestinal tract site.

In some variants, the conduit 116 can be cut to a length to position the second portion 136 at the target gastrointestinal tract site based on exterior anatomical measurements of the patient 100. In some variants, an imaging system can be used to determine a suitable length for the conduit 116 to correctly position the second portion 136. For example, in some variants, the imaging system can be used to measure internal anatomical features of the patient 100 to determine the appropriate length for the conduit 116. In some variants, the second portion 136 can include one or more markers that can be viewed outside the patient 100 with an imaging system. The conduit 116 can be introduced through the mouth of the patient 100 and distally advanced along the gastrointestinal tract until the second portion 136 reaches a target site, as viewed with the imaging system. With the second portion 136 positioned at the target site, the conduit 116 can be cut to length.

The second portion 136 can include one or more openings and/or docking stations on a string to directly deliver substance (e.g., flowable, solid) to the target gastrointestinal tract site while bypassing others. The second portion 136 can include one or more openings at a distal end of the conduit 116. In some variants, the second portion 136 can include one or more peripheral openings, which can be distributed along a length of the second portion 136.

The conduit 116 can bypass portions of the gastrointestinal tract, which can be advantageous for certain applications. For example, similar to the appetite suppressing mechanism of bariatric surgery, the intraoral gastrointestinal access devices can bypass the stomach and directly deliver substance to the small intestine by way of one or more openings at the second portion 136, as shown in FIG. 3B.

D. Intraoral Gastrointestinal Access Device—FIGS. 4A-12

Figure 4A:
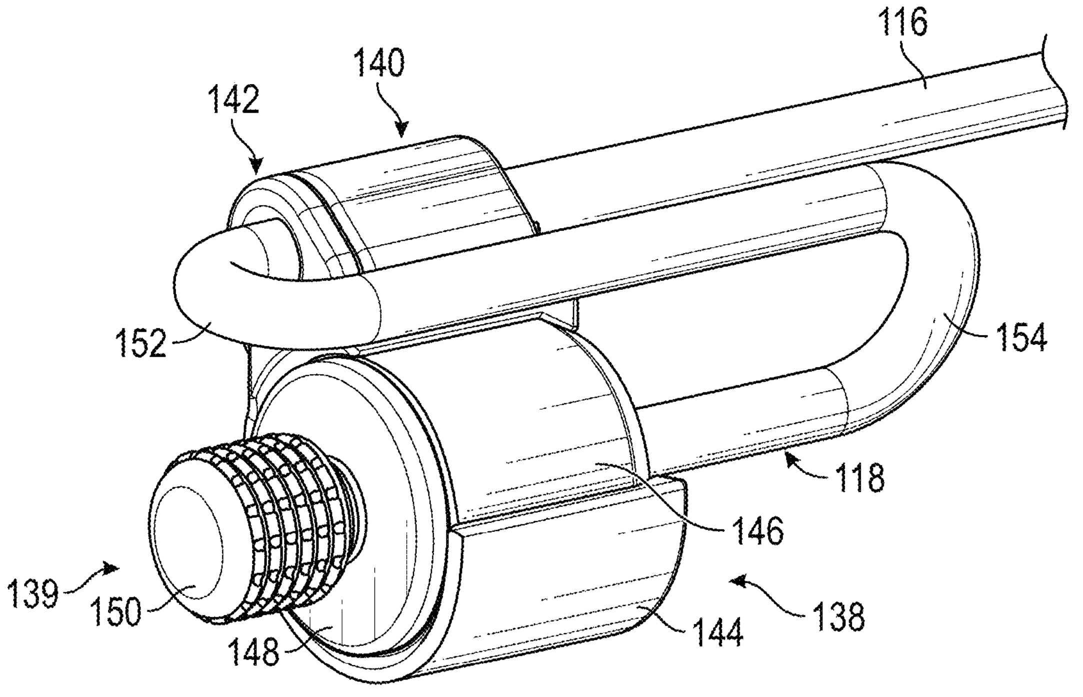
FIG. 4A illustrates an intraoral gastrointestinal access device in a stowed configuration with a port docked.

FIGS. 4A-12 illustrate various views of an intraoral gastrointestinal access device 138 and components thereof. As illustrated in FIG. 4A, the intraoral gastrointestinal access device 138 can include an anchor 140 and/or a gastrointestinal administration device 139, which can include a conduit 116, collar 142, port 146, and/or cap 148.

The anchor 140, which can also be referred to as a mount and/or bracket, can be secured to an anatomical feature (e.g., tooth of upper arch, tooth of lower arch, bone, maxillary and/or mandibular arch, gum or other mucosal surface, etc.) of a mouth 120 of the patient 100 using at least the techniques described herein. The conduit 116 can be routed distally through the anchor 140 and down the esophagus such that a first portion 118 of the conduit 116 is positioned in the mouth 120 of the patient 100 and a second portion is disposed withing the patient 100 at a target gastrointestinal tract site.

The collar 142 can be secured (e.g., adhered) to the first portion 118 of the conduit 116 such that the collar 142 does not move relative to the conduit 116. The collar 142 can be coupled to the anchor 140 to maintain the second portion of the conduit 116 at the target gastrointestinal tract site. The coupling between the collar 142 and the anchor 140 can prevent the conduit 116, collar 142, port 146, and/or cap 148 from being swallowed or aspirated by the patient 100.

The collar 142 can include a docking feature 144 (e.g., receiving feature, holder, pocket, cavity) that can hold (e.g., receive) the port 146. The port 146 can be secured (e.g., adhered) to the first portion 118 (e.g., to the end of the first portion 118) of the conduit 116 such that the port 146 does not move relative to the portion of the conduit 116 to which it is secured. The port 146 can receive and direct substance from a delivery device into the conduit 116. The port 146 can be received within the docking feature 144 such that an opening of the port 146 to interface with a feature (e.g., connector, port, valve) of the delivery device is proximally facing (e.g., facing toward an opening into the mouth 120 of the patient 100). The docking feature 144 can be sized and shaped such that the port 146 is received by the docking feature 144 with a push fit or in some cases a press fit that avoids unintentional dislodgement.

When the intraoral gastrointestinal access device 138 is not actively being used to deliver substance to a target gastrointestinal tract site, the intraoral gastrointestinal access device 138 can be placed in the stowed configuration illustrated in FIG. 4A with the port 146 held by the docking feature 144. The first portion 118 of the conduit 116 connecting the collar 142 and the port 146 can include one or more loops to control the arrangement of the first portion 118 in the stowed configuration, which can include maintaining the first portion 118 in a compact and organized arrangement. The first portion 118 of the conduit 116 connecting the collar 142 and the port 146 can be shape set such that the first portion 118 of the conduit 116 returns to the shape set configuration when moved therefrom. The first portion 118 can extend distally from the collar 142 to a first loop 152 (e.g., curve) that orients the first portion 118 to extend proximally (e.g., toward a back of the mouth 120) to a second loop 154 (e.g., curve) that orients the receiving region 188 to extend distally to the port 146.

In the shape set configuration, a portion of the first portion 118 (e.g., portion of the first portion 118 between the collar 142 and the port 146) of the conduit 116 can include an S-shape in a free state. The first portion 118 can include a portion (e.g., portion between the collar 142 and the port 146) labially positioned relative to the anchor 140. The first portion 118 can include a portion (e.g., portion between the collar 142 and the port 146) distal to the anchor 140. The first portion 118 can include a portion (e.g., portion between the collar 142 and the port 146) that is gingival (e.g., above) of another portion of the first portion 118 approaching the port 146. The first portion 118 can include two segments (e.g., straight sections) extending along a portion of a length of the conduit 116. The first portion 118 can cross a plane that is transverse (e.g., perpendicular) relative to the conduit 116 at least one, two, three, four, or more times.

When the intraoral gastrointestinal access device 138 is to be used, the port 146 can be disengaged (e.g., removed) from the docking feature 144 and positioned outside the mouth 120 of the patient 100 to receive substance from the delivery device while the collar 142 remains coupled to the anchor 140. The one or more loops (e.g., first loop 152 and/or second loop 154) can be straightened as the port 146 is positioned outside the mouth 120 to permit the port 146 to be positioned outside the mouth 120 while the collar 142 remains coupled to the anchor 140. In some variants, the one or more loops along the first portion 118 can form a coil. In some variants, one or more portions of the first portion 118 can include a coil (e.g., the portion of the first portion 118 between the loop 152 and loop 154 can include a coil).

The cap 148 can be coupled to the port 146 to impede access into the port 146 (e.g., cover the opening of the port

146 that interfaces with the delivery device). The cap 148 can include a grasping feature 150 (e.g., handle, knob, textured knob) that can be grasped and pulled by hand to uncouple the cap 148 from the port 146. In some variants, the grasping feature 150 can function as a grasping feature of the port 146 such that the grasping feature 150 can be held and manipulated by hand to disengage (e.g., remove) the port 146 from or engage the port 146 with (e.g., place within) the docking feature 144.

Figure 4B:
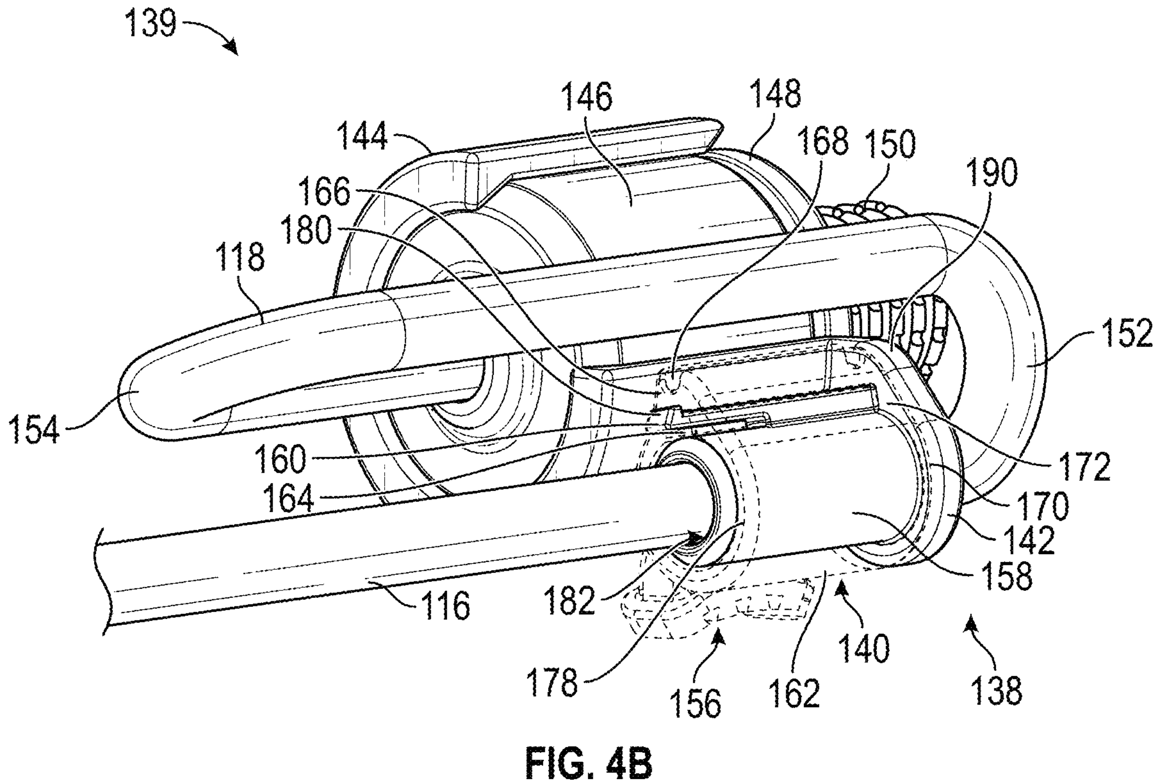
FIG. 4B illustrates the intraoral gastrointestinal access device with an anchor coupled to a collar.
Figure 7A:
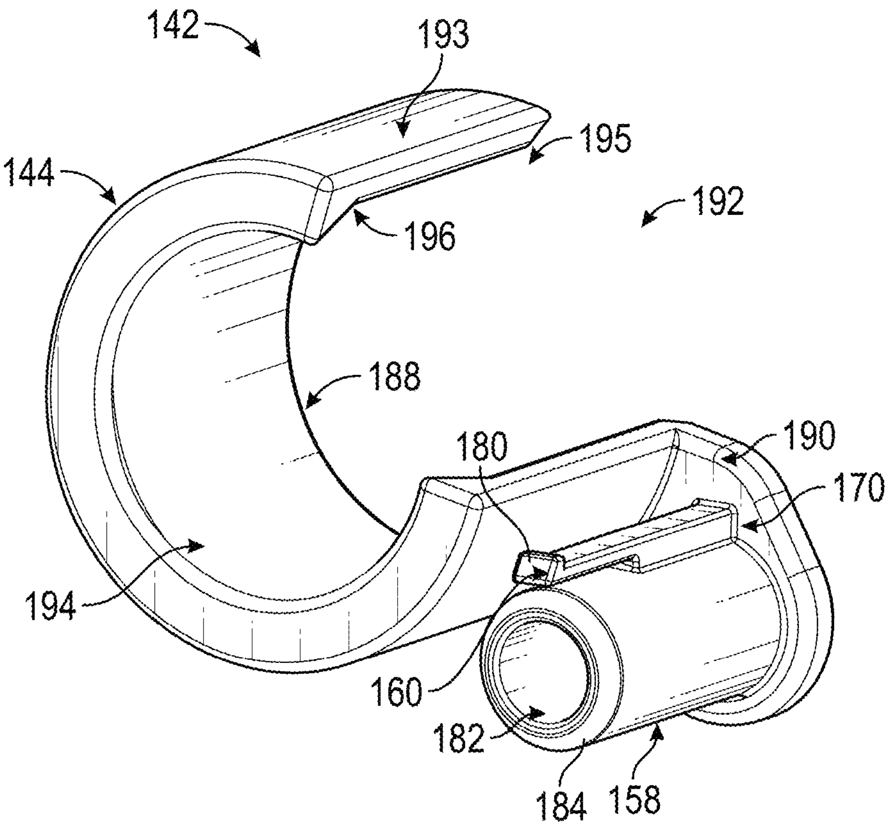
FIGS. 7A and 7B illustrate views of the collar with a docking feature of the intraoral gastrointestinal access device of FIGS. 4A-4C and 6.

As illustrated in FIGS. 4B, 7A, and 7A, the collar 142 can include a first mating feature 158 that can couple with a second mating feature 162 of the anchor 140 to couple the collar 142 and the anchor 140 together. The first mating feature 158 of the collar 142 can be disposed through a receiving region 178 (e.g., hole, lumen) of the second mating feature 162 of the anchor 140. See FIGS. 5A and 5B. The first mating feature 158 can include a cylindrical body (e.g., tube). The first mating feature 158 can protrude from a distal-facing surface 170 (e.g., wall) of the collar 142. The first mating feature 158 can include a hole 182 (e.g., lumen) through which the first portion 118 of the conduit 116 can be disposed and fixed (e.g., adhered). The distal-facing surface 170 can be connected to the docking feature 144 by way of a connector 190 (e.g., bridge).

The first mating feature 158 can include a biased feature 160 (e.g., spring feature, locking feature) that can facilitate coupling to the second mating feature 162. For example, the biased feature 160 can include a retaining feature 180 (e.g., hook, clasp, catch) at a free end and be fixed at the other (e.g., fixed to the cylindrical body). The second mating feature 162 can include a channel 164 (e.g., groove) that can receive the retaining feature 180. See FIG. 5B. The channel 164 can extend (e.g., jut out, protrude) from the receiving region 178. During coupling, the first mating feature 158 can be advanced distally into the receiving region 178 of the second mating feature 162 with the biased feature 160 of the first mating feature 158 disposed in the channel 164 of the second mating feature 162. The channel 164 of the second mating feature 162 can deflect the retaining feature 180 of the biased feature 160. The first mating feature 158 can be advanced distally through the receiving region 178 of the second mating feature 162 until the distal-facing surface 170 of the first mating feature 158 contacts a proximal-facing surface 172 (e.g., wall) of the second mating feature 162. With the distal-facing surface 170 of the first mating feature 158 contacting the proximal-facing surface 172 of the second mating feature 162, the retaining feature 180 of the biased feature 160 can protrude distally out of the channel 164 and spring to position the retaining feature 180 at a distal-facing surface 166 (e.g., wall) of the second mating feature 162 (e.g., the retaining feature 180 can contact the distal-facing surface 166 of the second mating feature 162). The second mating feature 162 of the anchor 140 can be secured between the retaining feature 180 of the biased feature 160 and the distal-facing surface 170 of the collar 142, which can prevent mesial-distal movement of the collar 142 with respect to the anchor 140. The portion of the biased feature 160 of the first mating feature 158 disposed within the channel 164 of the second mating feature 162 can prevent rotation of the collar 142 with respect to the anchor 140 (e.g., prevent rotation of the collar 142 about a mesial-distal axis).

Figure 5A:
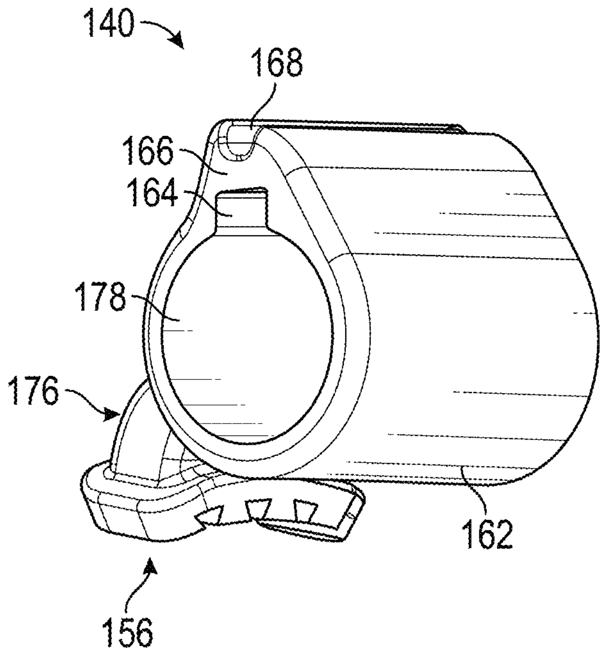
FIG. 5A illustrates a perspective view of the anchor of the intraoral gastrointestinal access device of FIGS. 4A-4C.
Figure 5B:
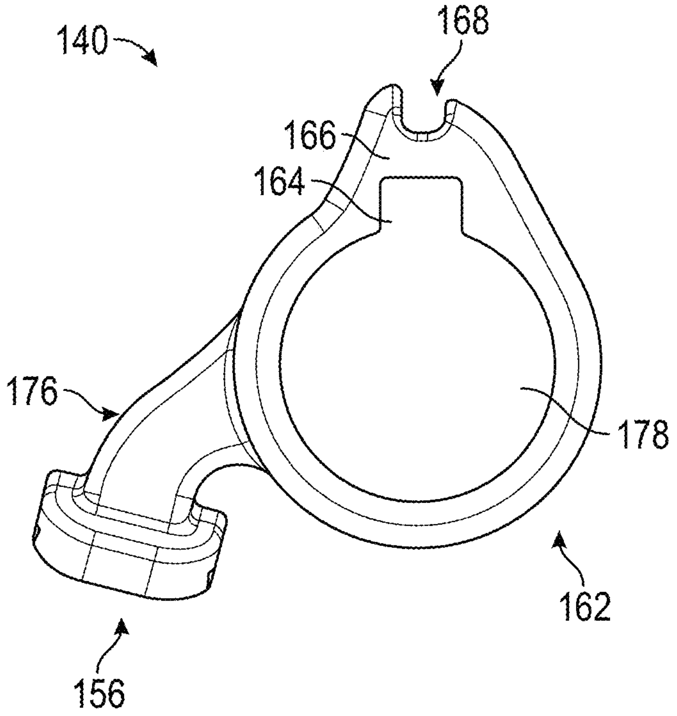
FIG. 5B illustrates a front view of the anchor of FIG. 5A.

FIG. 5B shows that the second mating feature 162 can include a groove 168 (e.g., channel). The groove 168 can be open in a labial direction. The groove 168 can be disposed on a labial side of the second mating feature 162. In some variants, the groove 168 can be open in another direction and/or disposed on another side of the second mating feature 162 (e.g., occlusal, gingival, lingual). The groove 168 can extend along a length of the second mating feature 162. The groove 168 can extend from the proximal-facing surface 172 to the distal-facing surface 166. The groove 168 can guide a tool (e.g., scaler) of a clinician to the retaining feature 180 of the biased feature 160. A person operating the tool can apply a force (e.g., force in a lingual direction) on the retaining feature 180 of the biased feature 160 to deflect the retaining feature 180 clear of the distal-facing surface 166 of the second mating feature 162 such that the collar 142 can be uncoupled from the anchor 140. For example, with the retaining feature 180 of the biased feature 160 deflected clear of the distal-facing surface 166 of the second mating feature 162, the first mating feature 158 of the collar 142 can be proximally retracted out of the receiving region 178 of the second mating feature 162. The collar 142 can be uncoupled from the anchor 140 when the conduit 116, collar 142, port 146, and/or cap 148 is being replaced or when the patient 100 will not be utilizing the intraoral gastrointestinal access device 138 for a duration of time to direct substance to a gastrointestinal tract site.

Figure 4C:
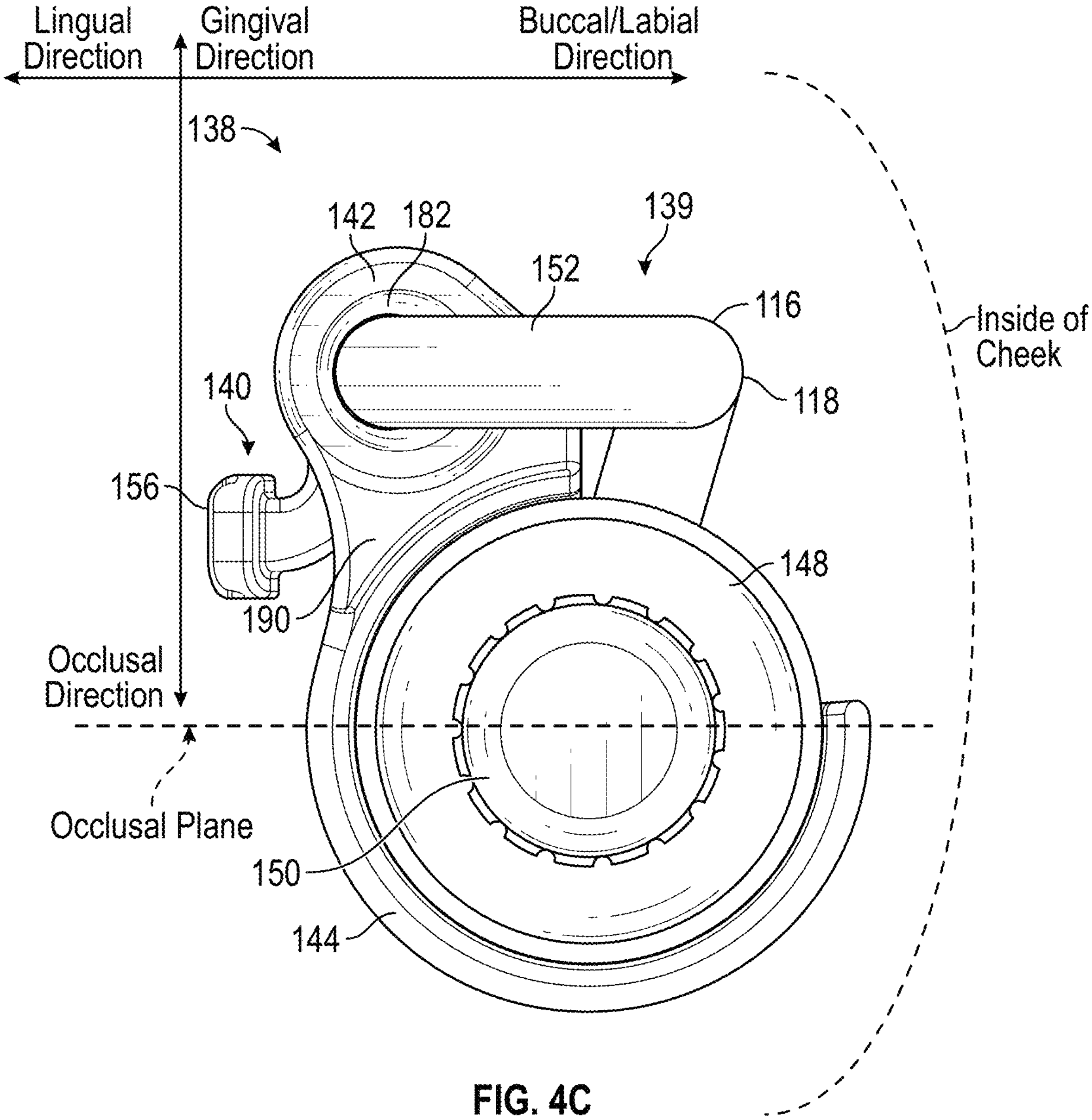
FIG. 4C illustrates a front view of the intraoral gastrointestinal access device showing access to a cap that is coupled with a docking feature.

As illustrated in FIG. 4C, the intraoral gastrointestinal access device 138 can be arranged to be compact in the occlusal-gingival and lingual-buccal directions. For example, where the anchor 140 is configured to be secured to a molar of an upper arch, the docked port 146 can be configured to be disposed at least partially under (e.g., occlusal of) the anchor 140 and/or first mating feature 158 of the collar 142. The shape set (or memorized) configuration of the first portion 118 of the conduit 116 can position the first portion 118 occlusal of the gingival-most portion of the collar 142, more lingual than the buccal-most portions of the port 146 and/or docking feature 144, and more gingival than the occlusal-most portions of the docking feature 144. With the attachment feature 156 coupled to a tooth (e.g., molar of upper arch) of the patient 100, the docked port 146, anchor 140, collar 142, cap 148, and/or first portion 118 of the conduit 116 disposed between the collar 142 and the port 146 can be positioned in the vestibule of the patient 100 (e.g., between the labial surfaces of molars and an inside of the cheek of the patient 100). The shape set of the first portion 118 of the conduit 116 can enable a folded-over portion thereof to be disposed between a first plane aligned with a labial-most edge of the docking feature 144 (e.g., a first vertical plane tangential thereto) and a second plane aligned with a lingual-most portion of the collar 142 (e.g., a second vertical plane tangential thereto). The shape set of the first portion 118 can position the first portion 118 between the collar 142 and the port 146 gingival of a occlusal edge of the port 146, cap 148, and/or docking feature 144. The shape set of the first portion 118 can position the first portion 118 between the collar 142 and the port 146 occlusal of a plane tangential to the gingival-most edge of the collar 142, lingual of a plane tangential to the buccal-most edge of the docking feature 144, and/or gingival of a plane tangential to the occlusal-most edge of the docking feature 144. With the port 146 docked, the port 146 (e.g., central longitudinal axis of the port 146) can be configured to be disposed generally at the occlusal plane of the patient 100. With the port 146 docked, the port 146 (e.g., central longitudinal axis of the port 146) can be configured to be disposed within 15, 14, 13, 12, 11, 10, 9, 8, 7, 6, 5, 4, 3, 2, or 1 millimeters or any distance between any of the foregoing distances of an occlusal plane of an average or a specific patient. The intraoral gastrointestinal access device 138 can be configured such that with the port 146 docked and with the anchor 140 secured to a molar of an upper arch, the port 146 can be positioned such that a central longitudinal axis of the port 146 is occlusal of the gingiva of the lower arch (e.g., at or proximate the occlusal plane). In some variants, the labial edge of the docking feature 144 can space the inside of the cheek of the patient away from features of the intraoral gastrointestinal access device 138, such as a portion of the first portion 118 of the conduit 116, anchor 140, port 146, and/or cap 148. The shape set of the first portion 118 can maintain the first portion 118 within the vestibule of the patient.

As illustrated in FIGS. 5A and 5B, the groove 168 can include two opposing walls to guide the tool as the tool slides within the groove 168 to the retaining feature 180 of the biased feature 160. The wall of the groove 168 that is configured to be closest to the docking feature 144 of the collar 142 can be taller (e.g., extend farther in the labial direction) than the other wall of the groove 168. In some variants, the wall of the groove 168 that is more gingivally positioned can be taller (e.g., extend farther in the labial direction) than the other wall of the groove 168, which can help prevent the tool from slipping out of the groove 168 and into the gum tissue of the patient and/or against other components of the intraoral gastrointestinal access device 138. The wall of the groove 168 that is configured to be closest to the docking feature 144 can be 5 percent taller than the other wall of the groove 168, 10 percent taller than the other wall of the groove 168, 15 percent taller than the other wall of the groove 168, 25 percent taller than the other wall of the groove 168, 30 percent or more taller than the other wall of the groove 168 or any percent between any of the foregoing or any range include two of the foregoing percentages as end-points.

Figure 5C:
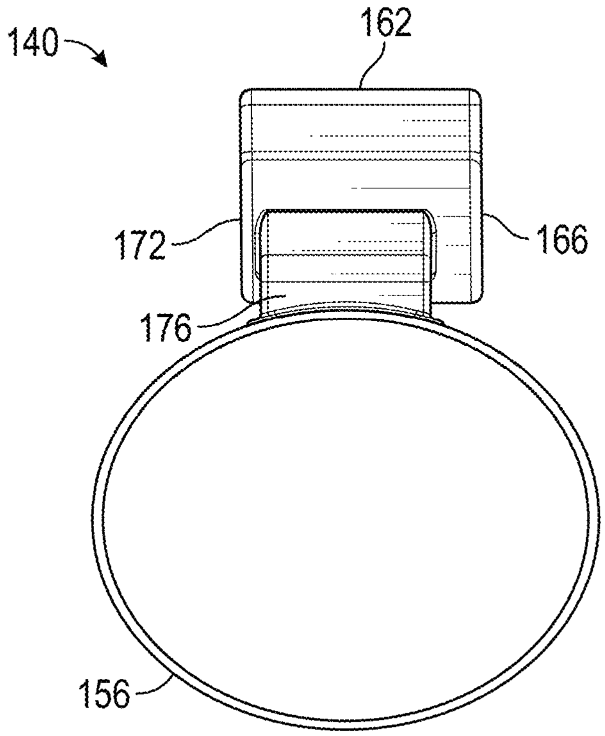
FIG. 5C illustrates a top view of the anchor of FIG. 5A coupled with a tooth band.

FIG. 5B shows that a connector 176, which can also be described as a bridge, of the anchor 140 that can extend between and connect the second mating feature 162 and the attachment feature 156 of the anchor 140. The connector 176 can be curved, which can position the second mating feature 162 closer to a surface of a tooth to which or adjacent to which the anchor 140 is coupled. As illustrated in FIGS. 5A and 5B, the attachment feature 156 can include a bonding surface (e.g., textured surface, surface with recesses) to facilitate directly bonding the anchor 140 to a tooth of the patient 100. In some variants, as illustrated in FIG. 5C, the attachment feature 156 can include or be coupled to a band (e.g., molar band) that can be disposed around a tooth of the patient 100 to secure the anchor 140 to the tooth. As described herein, the anchor 140, in some variants, may be anchored in other ways within the mouth of the patient 100 (e.g., fastened to the jawbone of the patient 100, teeth tray, retainer). In some variants, the attachment feature 156 can be coupled to a tooth (e.g., molar) of the upper arch of the patient 100. In other variants, the attachment feature 156 can be coupled to a tooth (e.g., molar) of the lower arch of the patient 100. In some variants the attachment feature 156 can be attached to more than one tooth or other intraoral feature, including more than one tooth on either side of the maxillary arch, with an intermediate arcuate component connecting two anchor sites and with elements forming an anchor system that is too large to swallow and/or aspirate if the anchor system detaches inadvertently.

Figure 6:
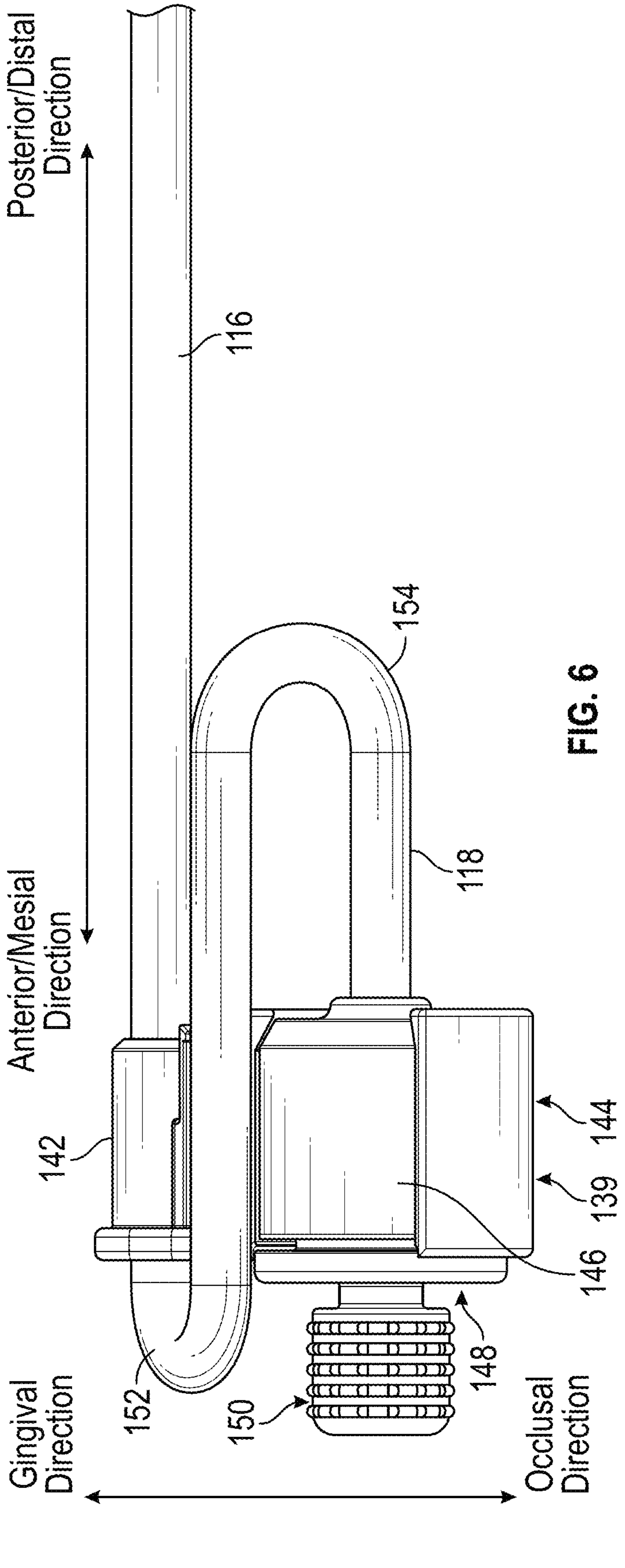
FIG. 6 illustrates a disposable or temporary portion of the intraoral gastrointestinal access device of FIGS. 4A-4C, including a conduit, a collar, a port, and a cap.

FIG. 6 illustrates a disposable or temporary portion of the intraoral gastrointestinal access device 138, which can be described as the gastrointestinal administration device 139. In this context, disposable or temporary is referring to the fact that these components may be installed and replaced at least once and potentially many times while the anchor 140 can be left in place for an entire course of treatment or for the entirety of a time where feeding is needed. The disposable or temporary portion (e.g., gastrointestinal administration device 139) can include the conduit 116, a connecting feature (such as the collar 142), and an access device (such as the port 146 which can be optionally sealed with the cap 148) assembled together. As described herein, to install the intraoral gastrointestinal access device 138 in the patient 100, the anchor 140 can first be secured within the mouth 120 of the patient 100 using one or more of the techniques described herein. Thereafter the disposable or temporary portion (including the conduit 116, collar 142, port 146, and/or cap 148) can be placed. The conduit 116 can be advanced distally through the receiving region 178 of the second mating feature 162 of the anchor 140 and down the esophagus of the patient 100 (as indicated by the arrow in FIG. 9A) until the collar 142 fixedly attached to the conduit 116 is coupled to the anchor 140 to prevent further distal advancement of the conduit 116 down the esophagus (as indicated by the engagement of the collar 142 with the second mating feature 162 in FIG. 9B). The collar 142 can be fixedly attached (e.g., adhered, bonded) to the first portion 118 of the conduit 116 at a position such that, with the collar 142 coupled to the anchor 140 (coupling can be achieved by the engaging the retaining feature 180 with the distal facing surface 166) the second portion of the conduit 116 can be thereby disposed at a target gastrointestinal tract site of the patient 100 and will not substantially move proximally or distally therefrom due to the engagement of these structures.

More particularly, as described herein, to couple the collar 142 and the anchor 140, the first mating feature 158 of the collar 142 can be distally advanced through the receiving region 178 of the second mating feature 162 of the anchor 140 with the biased feature 160 of the first mating feature 158 aligned with the channel 164 of the second mating feature 162 until the distal-facing surface 170 of the collar 142 contacts the proximal-facing surface 172 of the anchor 140. With the distal-facing surface 170 of the collar 142 contacting the proximal-facing surface 172 of the anchor 140, the retaining feature 180 of the biased feature 160 of the first mating feature 158 can protrude distally from the channel 164 to spring to the distal-facing surface 166 of the anchor 140, which can secure the second mating feature 162 of the anchor 140 between the retaining feature 180 and the distal-facing surface 170 of the collar 142 such that the collar 142 is coupled to the anchor 140. The docking feature 144 of the collar 142 can hold (e.g., hold with a press fit or push fit) the port 146. The port 146 can interface with (e.g., be held by) the docking feature 144 while the collar 142 is being coupled to the anchor 140 or after. The port 146, as described herein, can be fixedly attached to an end of the first portion 118 of the conduit 116. The cap 148 can be coupled to the port 146 before or after the port 146 is disposed within the docking feature 144.

The first portion 118 of the conduit 116 can include one or more loops (e.g., first loop 152 and/or second loop 154) that can maintain the first portion 118 between the collar 142 and the port 146 out of the occlusion of the teeth of the patient 100, in the vestibule 129 of the patient 100, within a mesial-distal region of the mouth 120 of the patient 100 (e.g., anterior of a distal-most molar and posterior of a premolar), within an occlusal-gingival region of the mouth 120 of the patient 100 (e.g., occlusal of the upper and/or lower gingiva of the patient 100), and/or within a lingual-labial region of the mouth 120 of the patient 100 (e.g., between the labial surfaces of the patient's teeth and the interior surface of the cheek of the patient 100). The one or more loops of the first portion 118 of the conduit 116 can be shape set such that the first portion 118 returns to the shape set configuration when not being under a deflecting load.

The collar 142, first portion 118 of the conduit 118 between the collar 142 and the port 146, port 146, and cap 148 can be compact in an anterior-posterior direction (e.g., mesial-distal direction). For example, the foregoing features can be anterior of certain anatomy (e.g., third molar, second molar, first molar) and/or posterior of certain anatomy (e.g., lateral incisor, cuspid, first premolar, second premolar). In some variants, the loop 152 can position the first portion 118 of the conduit 116 posterior of an anterior-most surface of the grasping feature 150. The loop 154 can position the first portion 18 of the conduit 116 anterior of the retromolar trigone of the patient 100.

As described herein, the gastrointestinal administration device 139 (e.g., conduit 116, collar 142, port 146, and/or cap 148) can be periodically replaced as needed while leaving the anchor 140 secured within the mouth 120 of the patient 100. The collar 142 can be uncoupled from the anchor 140 as described herein to facilitate removal of the conduit 116, collar 142, port 146, and/or cap 148. As described herein, the conduit 116, collar 142, port 146, and/or cap 148 can be removed from the patient 100 while leaving the anchor 140 secured within the mouth 120 of the patient 100 during extended durations in which the patient 100 is not utilizing the intraoral gastrointestinal access device 138 for delivering substance to a targeted gastrointestinal tract site of the patient 100.

Figure 7B:
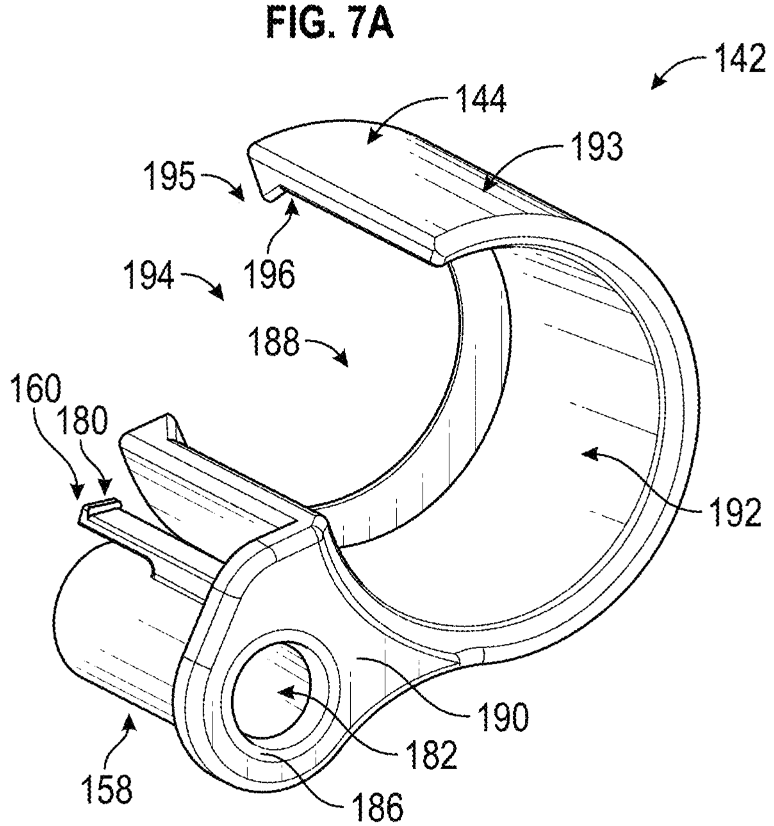

FIGS. 7A and 7B illustrate views of the collar 142. As illustrated, the docking feature 144 of the collar 142 can include a proximal-facing opening 192 to receive the port 146 into a receiving region 188 (e.g., receiving space, cavity) of the docking feature 144. The docking feature 144 of the collar 142 can include a distal-facing opening 194. The first portion 118 of the conduit 116 fixedly coupled to the port 146 can extend through the distal-facing opening 194 with the port 146 disposed in the receiving region 188 of the docking feature 144. The docking feature 144 can include an annular structure 193 (e.g., annular wall, pocket structure), which can define the proximal-facing opening 192, receiving region 188, and/or distal-facing opening 194. The annular structure 193 can include a gap 195 (e.g., annular gap). The gap 195 can enable the annular structure 193 to flex to receive the port 146, which can facilitate a press fit between the port 146 and the docking feature 144. The annular structure 193 can include an angled surface 196 at a distal end of the receiving region 188. The angled surface 196 can be disposed around the distal-facing opening 194. The angled surface 196 can extend along an interior of the annular structure 193. The angled surface 196 can contact a corresponding angled surface of the port 146 with the port 146 in the receiving region 188.

Figure 8:
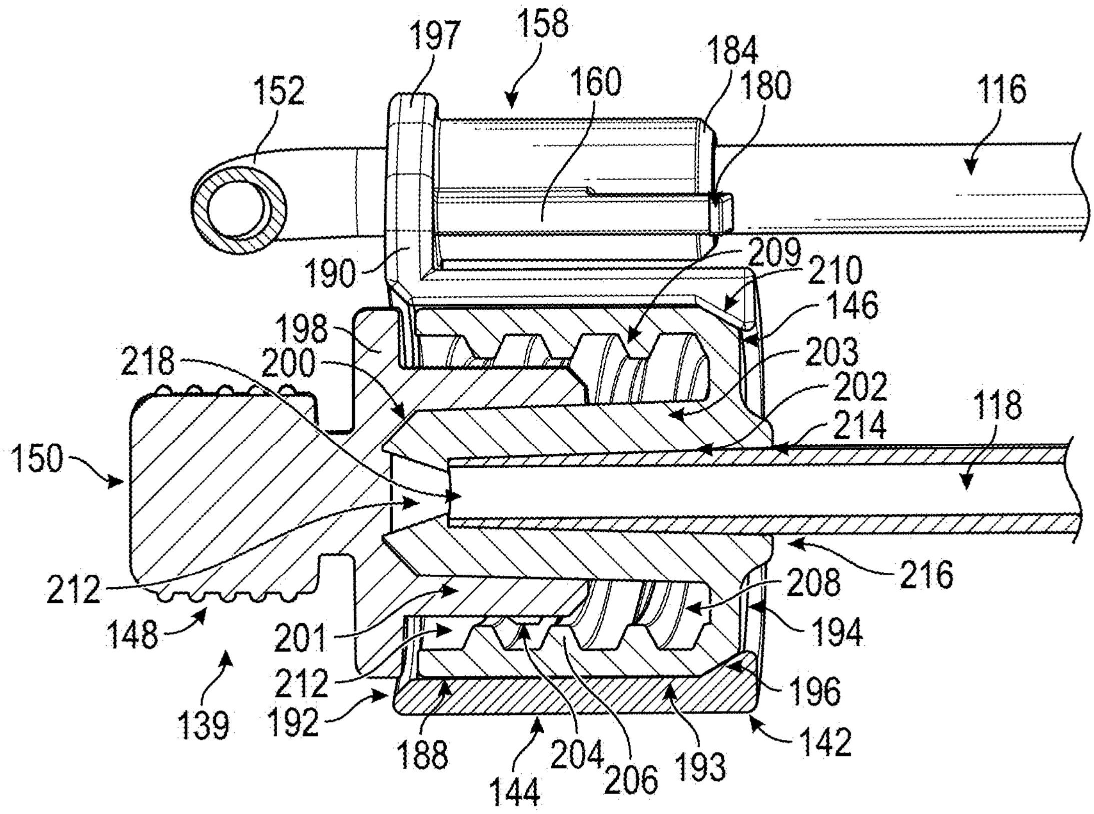
FIG. 8 illustrates a sectioned view of the intraoral gastrointestinal access device of FIGS. 4A-4C and 6 showing the docking feature of the collar, port, conduit, and cap of the intraoral gastrointestinal access device, the section plane oriented vertically and centered on the cap.

FIG. 8 illustrates a section view of the port 146 (e.g., connector, interface, valve, opening, luer) interfaced with (e.g., received by) the docking feature 144 with the cap 148 coupled to the port 146. As shown, the port 146 can be disposed in the docking feature 144. For example, the port 146 can be inserted through the proximal-facing opening 192 into the receiving region 188 of the docking feature 144. The port 146 can be disposed in the receiving region 188 such that the annular structure 193 of the docking feature 144 surrounds the port 146. The port 146 can include a peripheral wall 209 that can contact the annular structure 193 of the docking feature 144. The peripheral wall 209 of the port 146 can include an angled surface 210 that contacts the angled surface 196 of the docking feature 144. As described herein, the annular structure 193 can flex when the port 146 is inserted into the receiving region 188 of the docking feature 144, which can facilitate a press fit coupling between the port 146 and the docking feature 144.

The port 146 can include a cavity 208 (e.g., interior). The cavity 208 can be accessed by way of an opening 212. The port 146 can include one or more internal threads 206 (e.g., dual starting threads) projecting inward from an interior of the peripheral wall 209 of the port 146. The one or more internal threads 206 can enable the port 146 to be coupled with another device (e.g., substance delivery device) by way of a threaded connection to flow substance into the conduit 116 by way of the port 146. For example, the port 146 can be sized and configured to be ENFit compatible. The port 146 can be a male ENFit connector. The port 146 can include features of a male ENFit connector. In some variants, the port 146 can be sized and configured to be inoperable with luer lock devices or other ISO 80369-1 compliant small-bore connectors.

The port 146 can include a protrusion 203 (e.g., male protrusion, inner protrusion). The protrusion 203 can be disposed inside the port 146 (e.g., inside the cavity 208 of the port 146). The protrusion 203 can be disposed radially inward of the peripheral wall 209 and/or one or more internal threads 206. The protrusion 203 can include an inner portion disposed inside the port 146 and an outer portion disposed outside the port 146. The protrusion 203 can protrude out of the cavity 208 of the port 146 through the opening 212. The protrusion 203 can span a longitudinal length of the cavity 208. The protrusion 203 can span a length of the port 146. The protrusion 203 can be disposed on a center longitudinal axis of the port 146. The protrusion 203 can be tapered. For example, an outer periphery of the protrusion 203 can be tapered, which can include tapering to a smaller outer peripheral size (e.g., diameter) as the protrusion 203 approaches the opening 212. The portion of the protrusion 203 inside the cavity 208 can taper at a first rate and the portion of the protrusion 203 outside the cavity 208 can taper at a second rate, which can be faster than the first rate.

The port 146 can include a pocket 202 (e.g., receptacle, cavity, lumen). The pocket 202 can receive the end of the first portion 118 of the conduit 116. The pocket 202 can include an opening 214 through which the end of the first portion 118 of the conduit 116 can be received into the pocket 202. The end of the first portion 118 can be adhered within the pocket 202 (e.g., adhered to an inner peripheral wall of the pocket 202). The pocket 202 can be tapered (e.g., taper in cross-sectional size along a longitudinal length of the interior), which can help to retain the end of the first portion 118 of the conduit 116 in the pocket 202. The pocket 202 can be tapered from the opening 214 inward (e.g., the cross-sectional size of the pocket 202 can decrease inward from the opening 214). The end of the first portion 118 of the conduit 116 can be press fit in the pocket 202. The pocket 202 can be disposed on a center longitudinal axis of the port 146. The pocket 202 can extend more than half or two-thirds of a longitudinal length of the port 146 and/or cavity 208 of the port 146. The pocket 202 can extend 40%, 50%, 60%, 70%, 80%, 90%, or more than 90% or any percentage between any of the foregoing percentages or any range include two of the foregoing percentages as end-points of a longitudinal length of the port 146 and/or cavity 208 of the port 146. The pocket 202 can be disposed radially inward of the one or more internal threads 206 of the port 146. The pocket 202 can include a portion disposed radially inward of (e.g., in a same transverse plane or in a same position in the left-right direction of FIG. 8) the one or more internal threads 206 and another portion that is not radially inward of the one or more internal threads 206. The pocket 202 can include a portion disposed in the cavity 208 of the port 146 and another portion disposed outside of the cavity 208. The portion of the pocket 202 not radially inward of the one or more internal threads 206 and/or outside the cavity 208 can be less than 50%, 40%, 30%, 20%, 10%, or any percentage between any of the foregoing percentages of the total longitudinal length of the pocket 202. The port 146 can include an external protrusion 216 (e.g., protrusion, tube, annular protrusion, annular bulge, annular ridge), which can include a curved periphery. The portion of the pocket 202 not radially inward of the one or more internal threads 206 and/or outside the cavity 208 can be disposed in the external protrusion 216. The opening 214 can be disposed through the external protrusion 216 to provide access into the pocket 202. The external protrusion 216 can protrude through the distal-facing opening 194 of the docking feature 144 with the port 146 disposed in the receiving region 188. The portion of the pocket 202 disposed radially inward of the one or more internal threads 206 and/or within the cavity 208 can be disposed in the protrusion 203. The pocket 202 can extend 50%, 60%, 70%, 80% or more or any percentage between any of the foregoing of a longitudinal length of the protrusion 203.

The protrusion 203 can include an opening 212 (e.g., lumen, tapered lumen). The opening 212 can be disposed through a free end of the protrusion 203. The opening 212 can be fluidically connected with the pocket 202. The opening 212 can direct substance into a lumen of the end of the first portion 118 of the conduit 116 disposed in the pocket 202. The opening 212 can be a tapered lumen. The opening 212 can be tapered to a smaller cross-sectional size approaching the pocket 202. The opening 212 can taper to a cross-sectional size that is the same size as or smaller than the lumen of the end of the first portion 118 of the conduit 116.

The cap 148 can block access into the lumen of the first portion 118 of the conduit 116. The cap 148 can block access into the port 146. The cap 148 can include one or more external threads 204 that can interface with the one or more internal threads 206 of the port 146 to facilitate a threaded connection between the cap 148 and the port 146. The cap 148 can include a projection 201 (e.g., protrusion, annular projection) with a receiving region 200 (e.g., cavity, recess). The one or more external threads 204 can be disposed on the projection 201. The projection 201 can be disposed in the cavity 208 of the port 146. The receiving region 200 can receive at least a portion of the protrusion 203 of the port 146, which can include receiving the free end of the protrusion 203 within the receiving region 200 to block the opening 212. The receiving region 200 can be sized and shaped to be complimentary to the protrusion 203. The cap 148 can include a flange 198 (e.g., wall, panel) that can cover the proximal-facing opening 192 of the port 146, which can prevent access into the port 146 by way of the proximal-facing opening 192. The flange 198 can project perpendicularly relative to a longitudinal axis of the cap 148. The cap 148 can include a grasping feature 150 (e.g., handle, knob, textured knob) that can be grasped to remove the port 146 from the docking feature 144 and/or twist the cap 148 to uncouple from the port 146. The grasping feature 150 can include a surface feature (e.g., texture(s), ridge(s)) to facilitate grasping.

The cap 148 (e.g., grasping feature 150) can be used (e.g., pulled) to undock (e.g., remove, uncouple) the port 146 from the docking feature 144. The port 146 can be removed from the mouth 120 of the patient 100. The first portion 118 of the conduit 116 between the collar 142 and the port 146 can unravel (e.g., straighten) from a memorized configuration to enable the port 146 to be disposed outside of the mouth 120 of the patient 100. The cap 148 can be removed (e.g., rotated) to uncouple from the port 146. Another device can be coupled to the port 146 with a threaded connection, which can position the protrusion 203 of the port 146 within a receiving region of the other device. Substance can flow from the other device through the opening 212 and into the lumen of the first portion 118 of the conduit 116 disposed inside the pocket 202. The substance can flow through the conduit 116 to a second portion of the conduit 116 disposed at a target gastrointestinal tract site. The substance can flow out of one or more openings of the second portion to the target gastrointestinal tract site. When a desired quantity of substance has been delivered to the target gastrointestinal tract site, the cap 148 can be coupled to the port 146. The port 146 can be docked at (e.g., disposed in, interfaced with) the docking feature 144. For example, the port 146 can be disposed in the receiving region 188 of the docking feature 144 with a push fit. The first portion 118 of the conduit 116 can return to its memorized shape, which can arrange the first portion 118 of the conduit 116 in a compact configuration as described herein. With the port 146 docked, the intraoral gastrointestinal access device 138 can be substantially concealed in the mouth 120 of the patient 100. With the port 146 docked, the intraoral gastrointestinal access device 138 can be disposed distal of (e.g., posterior of) the incisor, cuspid, first premolar, second premolar, and/or first molar. In some variants, the second loop 154 can be disposed at or proximal of (e.g., anterior of) a distal-most molar, third molar, second molar, first molar, second premolar, and/or first premolar of the patient 100. The memorized shape of the first portion 118 (e.g., first loop 152 and/or second loop 154) can position the first portion 118 out of the occlusion of the patient 100.

Figure 9A:
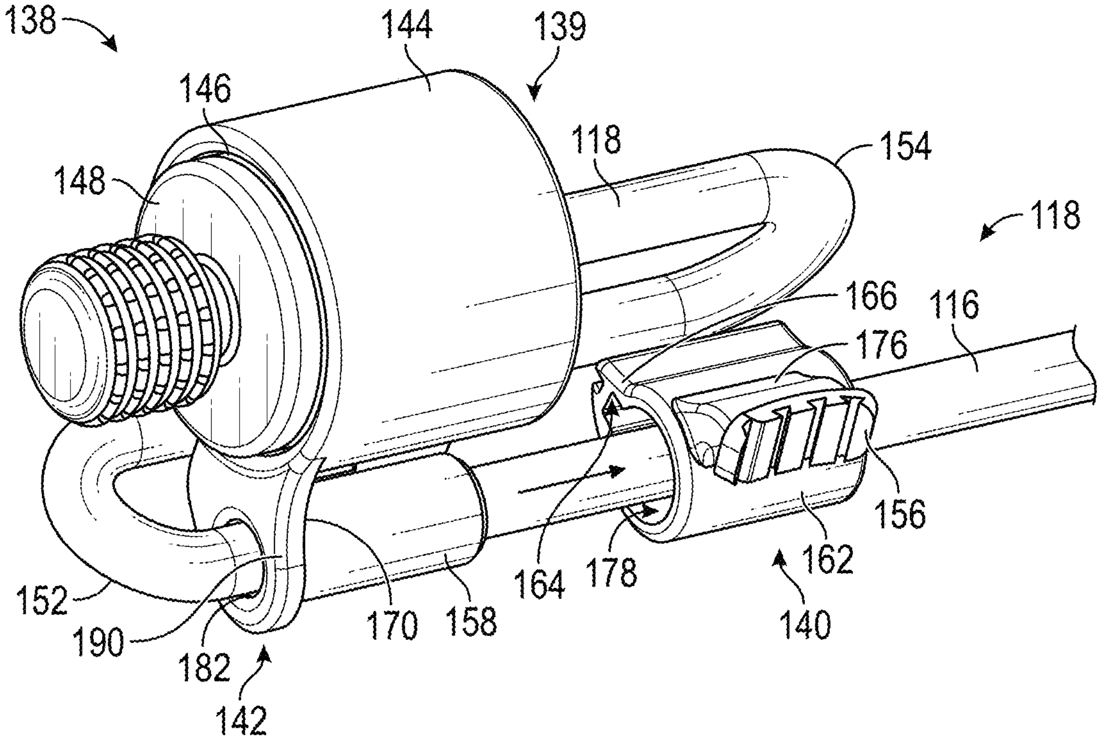
FIG. 9A illustrates a method of advancing a conduit through and toward the anchor of the intraoral gastrointestinal access device for coupling together.
Figure 9B:
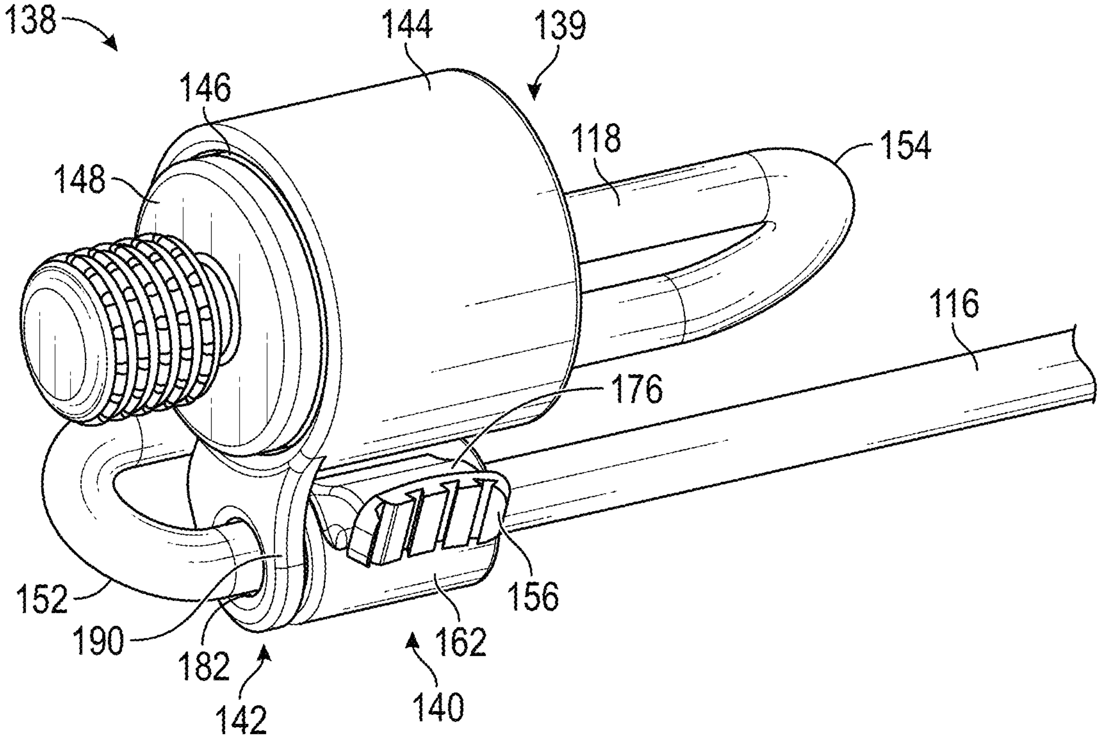
FIG. 9B illustrates a method of coupling the collar with the anchor.

FIGS. 9A and 9B illustrate the collar 142, adhered to the conduit 116, being coupled to the anchor 140. As described herein, the collar 142 can be adhered to the conduit 116 (e.g., first portion 118 of the conduit 116) to prevent movement of the collar 142 with respect to the conduit 116. In some variants, the collar 142 can be adhered to the conduit 116 at a location such that a second portion of the conduit 116 is disposed at a target gastrointestinal tract site with the intraoral gastrointestinal access device 138 disposed on the patient 100. In some variants, the conduit 116 can be cut at a length from the collar 142 such that a second portion of the conduit 116 is disposed at a target gastrointestinal tract site with the intraoral gastrointestinal access device 138 disposed on the patient 100. As shown, the conduit 116 can be advanced distally through the receiving region 178 of the second mating feature 162 of the anchor 140. The first mating feature 158 of the collar 142, adhered to the conduit 116, can be distally advanced into the receiving region 178 of the second mating feature 162. As described herein, the biased feature 160 of the first mating feature 158 of the collar 142 can be indexed (e.g., aligned) with the channel 164 of the anchor 140. The retaining feature 180 of the biased feature 160 can be deflected as the biased feature 160 is advanced into the channel 164 (e.g., a wall of the channel 164 can contact the retaining feature 180 of the biased feature 160 to deflect the retaining feature 180). The first mating feature 158 of the collar 142 can be distally advanced through the receiving region 178 of the anchor 140 until a distal-facing surface 170 of the collar 142 contacts a proximal-facing surface 172 of the anchor 140. The retaining feature 180 of the biased feature 160 of the first mating feature 158 can protrude free of the channel 164 of the anchor 140 such that the retaining feature 180 is free to spring back toward an unbiased configuration with the retaining feature 180 contacting the distal-facing surface 166. The retaining feature 180 and the proximal-facing surface 172 of the collar 142 can hold the collar 142 onto the anchor 140, which can prevent the conduit 116, port 146, and/or cap 148 from being swallowed by the patient 100. The biased feature 160 disposed within the channel 164 can prevent relative rotational movement between the anchor 140 and the collar 142.

Figure 10A:
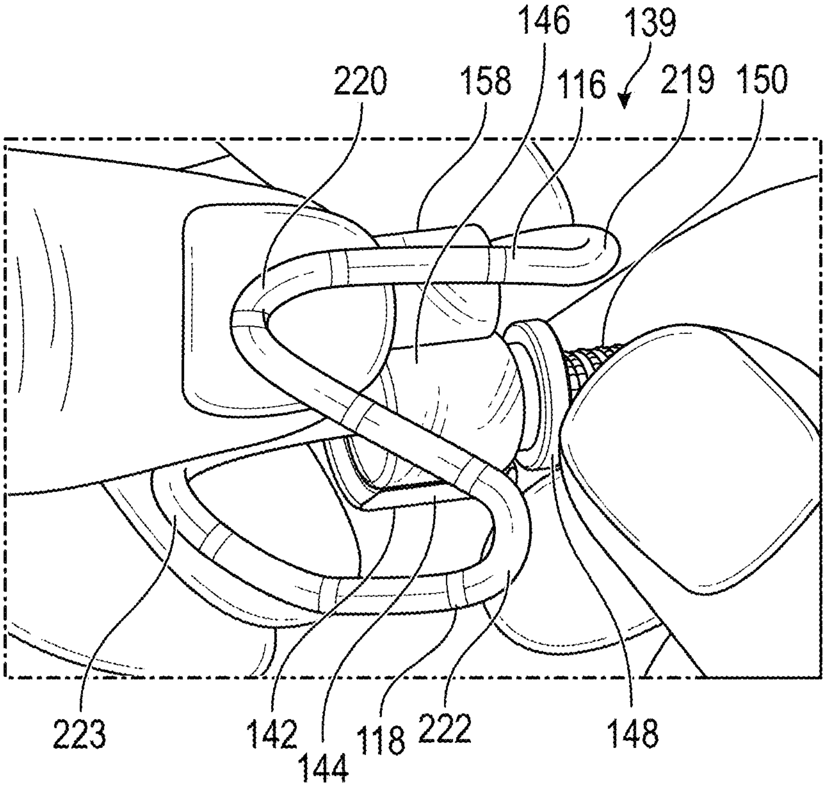
FIG. 10A illustrates the conduit of the intraoral gastrointestinal access device in a shape-set configuration.
Figure 10B:
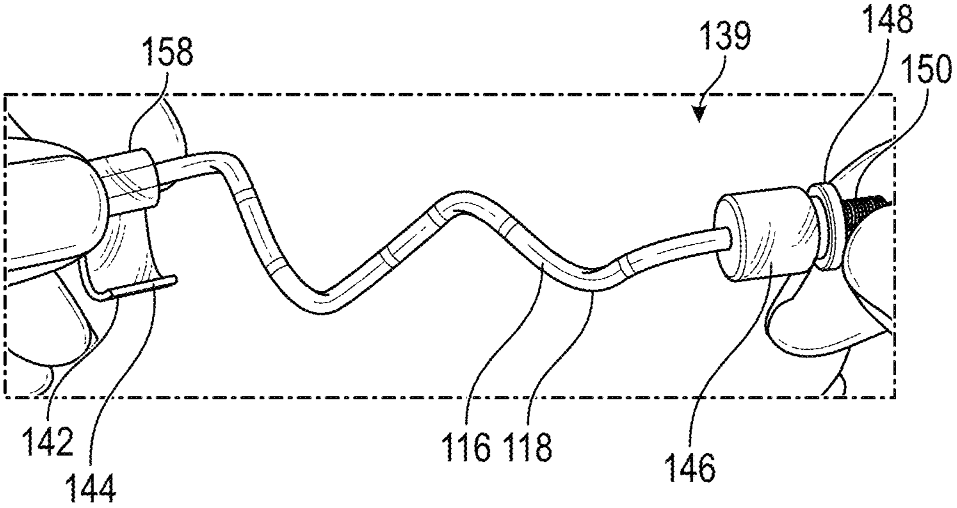
FIG. 10B illustrates the conduit moved from the shape-set configuration.

FIGS. 10A and 10B illustrate the gastrointestinal administration device 139 of the intraoral gastrointestinal access device 138 with the first portion 118 of the conduit 116 in different configurations. FIG. 10A illustrates the conduit 116 in a memorized configuration. As described herein, the first portion 118 of the conduit 116 can be set in a memorized configuration to organize the first portion 118 within the mouth 120 of the patient 100. The memorized configuration can be one that is shape set, e.g., by a process of heat forming over a mold. For example, a member (e.g., wire) can be arranged in the desired configuration for the first portion 118. The member can be advanced into the first portion 118 of the conduit 116 such that the first portion 118 assumes the arrangement of the member. Heat can be applied to the first portion 118 which can heat set the first portion 118 in the arrangement. The heat set arrangement of the first portion 118 can be the memorized configuration of the first portion 118 such that, with the member removed, the first portion 118 assumes the memorized configuration absent external forces. The first portion 118 can be deflected from the memorized configuration, as illustrated in FIG. 10B, when the port 146 is undocked from the docking feature 144 of the collar 142 but, with the port 146 redocked with the docking feature 144, the first portion 118 of the conduit 116 can reassume the memorized configuration, as illustrated in FIG. 10A. The first portion 118 can be heat set in a variety of configurations, which can include one or more loops (e.g., curves, coils). For example, as illustrated in FIG. 10A, the first portion 118 can extend proximally from the first mating feature 158 of the collar 142 to a first loop 219 that redirects the first portion 118 in a distal direction to a second loop 220 that redirects the first portion 118 in a proximal direction to a third loop 222 that redirects the first portion 118 in a distal direction to a fourth loop 223 that redirects the first portion 118 to the port 146 docket at the docking feature 144 of the collar 142. The inclusion of additional loops can provide additional length, while remaining organized within the mouth, to the first portion 118 disposed between the collar 142 and the port 146 which can enable the port 146 to be disposed farther outside the mouth of the patient 100 compared to the first portion with less loops.

Figure 11:
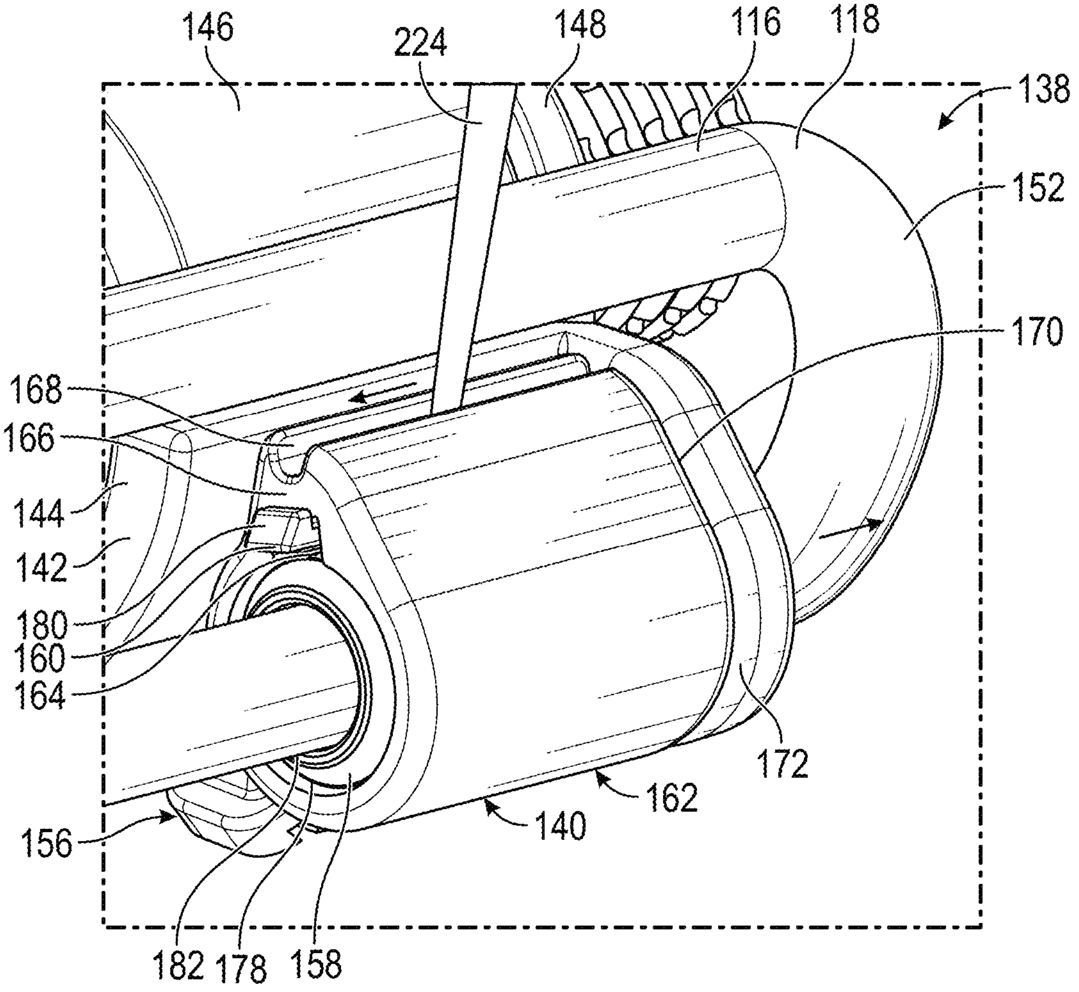
FIG. 11 illustrates a method of removal in which a tool (e.g., scaler) is advanced through a groove of the anchor of the intraoral gastrointestinal access device of FIGS. 4A-4C and 6 to deflect a biased feature of the collar to disengage the biased feature from the anchor to allow the collar to be removed from the anchor.

FIG. 11 illustrates a tool 224 (e.g., dental scaler) being used to uncouple the collar 142 from the anchor 140. As illustrated, a portion of the tool 224 (e.g., a tip thereof) can be positioned in the groove 168 and distally advanced. The groove 168 can guide the tool 224 to the retaining feature 180 of the biased feature 160 of the first mating feature 158. The operator of the tool can apply more force in a gingival direction within the groove 168 while advancing the tool. The taller of the walls of the groove 168 can be gingivally positioned to help prevent the tool slipping out of the groove 168. The tool 224 can be used to apply a force to the retaining feature 180 of the biased feature 160 to deflect the retaining feature 180 away from (e.g., free of) the distal-facing surface 166 of the anchor 140, which can include clearing a wall of the channel 164. With the biased feature 160 moved from the distal-facing surface 166, the first mating feature 158 can be proximally retracted (e.g., pulled) out of the receiving region 178 of the anchor 140 with the biased feature 160 proximally moving through the channel 164 to uncouple the collar 142 from the anchor 140.

Figure 12:
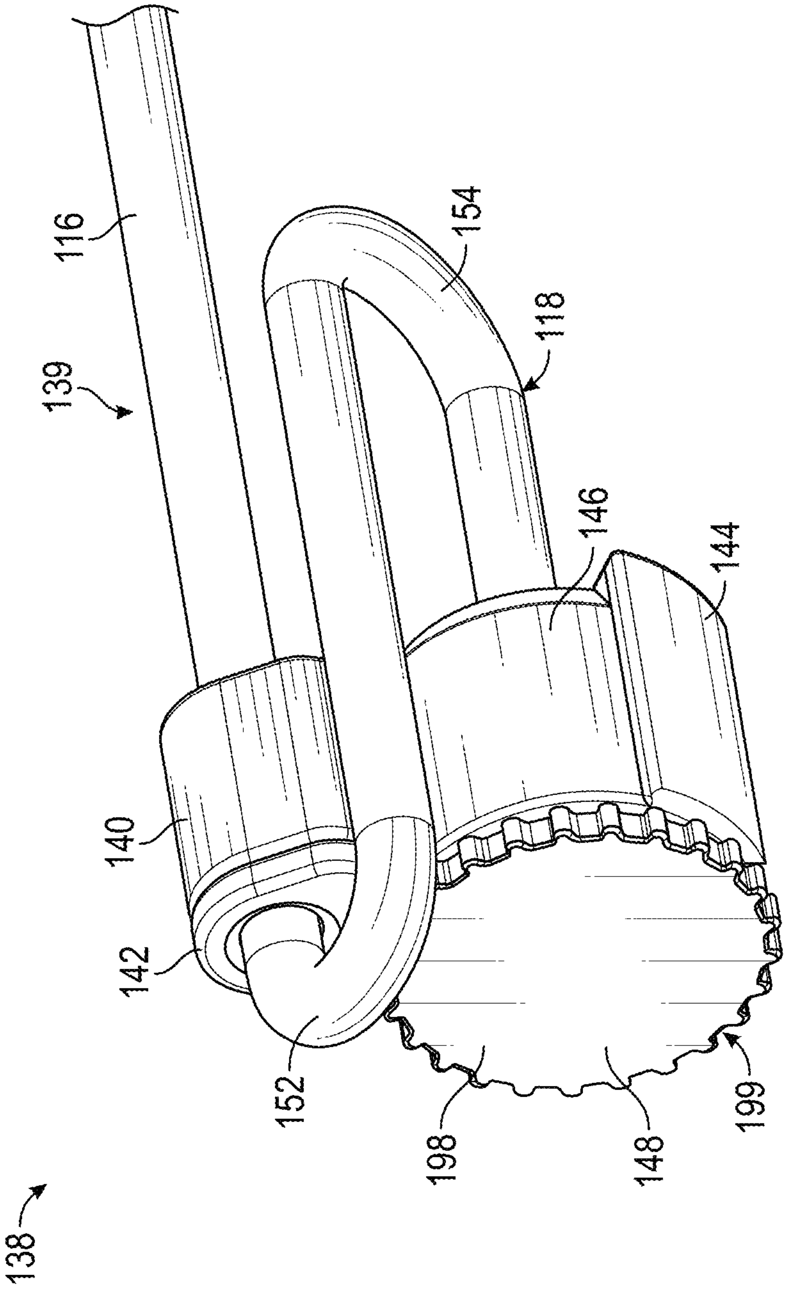
FIG. 12 illustrates another intraoral gastrointestinal access device with modified cap features.

FIG. 12 illustrates a variation of the cap 148. In some variants, the cap 148 can omit the grasping feature 150. The cap 148 can include a griping feature 199 (e.g., ridges, bumps) disposed at a periphery of the flange 198. The outer periphery of the flange 198 can extend beyond outer peripheries of the port 146 and/or docking feature 144. The gripping feature 199 can ease grasping and twisting the cap 148 to uncouple the cap 148 from the port 146. The gripping feature 199 can ease grabbing the cap 148 to move the port 146, which can include undocking the port 146 from the docking feature 144. By omitting the grasping feature 150, the cap 148 can be shorter in an anterior-posterior direction, which can render the intraoral gastrointestinal access device 138 more compact in the anterior-posterior direction. For example, the loop 152 can be disposed distal of the cap 148. The anchor 140, collar 142, port 146, and cap 148 can be disposed within an anterior-posterior length of the shape set first portion 118 (e.g., the anchor 140, collar 142, port 146, and cap 148 can be disposed posterior relative to the loop 152 and anterior relative to the loop 154). The flange 198 with the gripping feature 199 at an outer periphery thereof can include a diameter that is larger than the diameter of the grasping feature 14, which can be more ergonomic for grasping by hand.

E. Intraoral Gastrointestinal Access Device—FIGS. 13A-13E

Figure 13A:
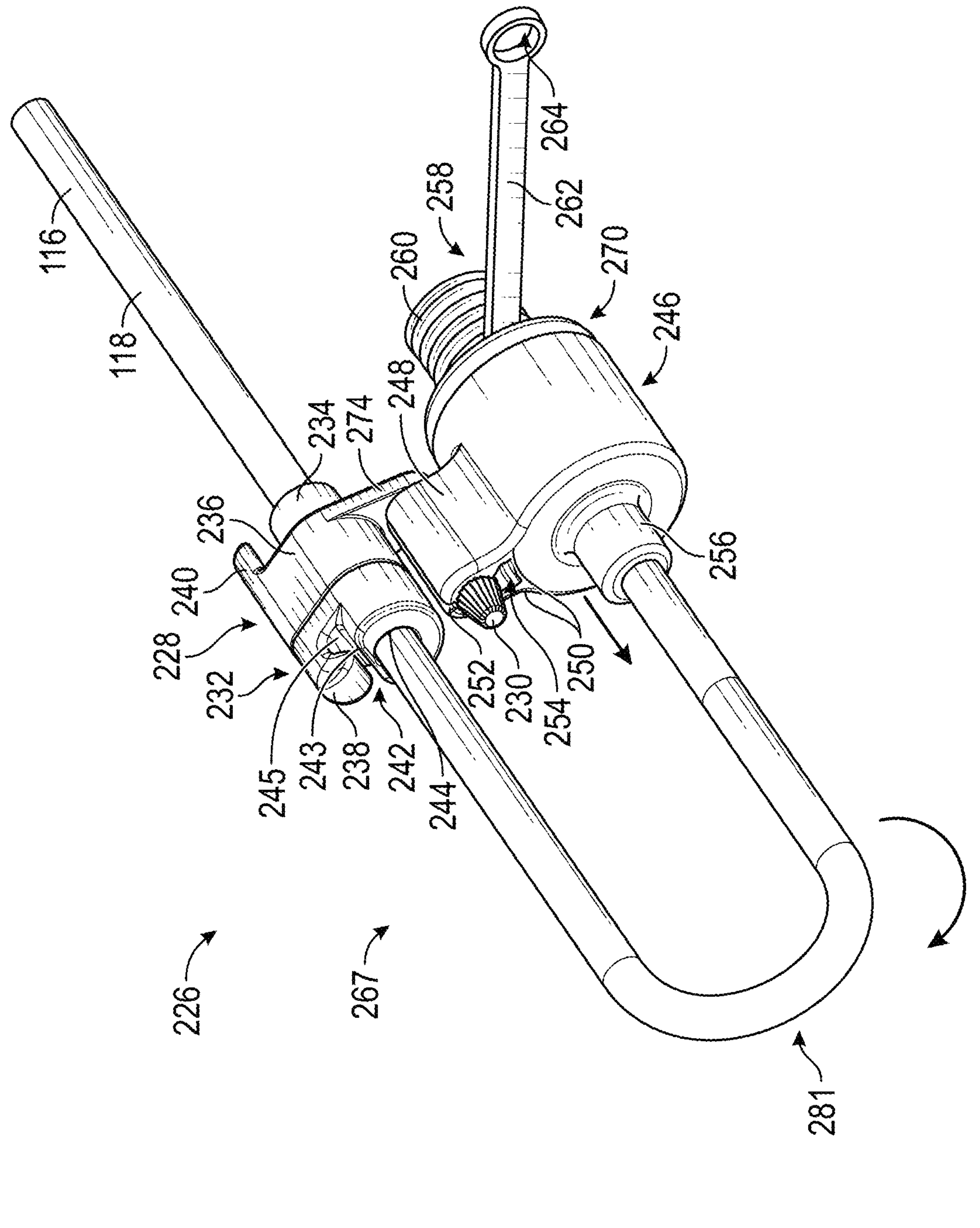
FIG. 13A illustrates another intraoral gastrointestinal access device in a stowed configuration and methods of using the same.
Figure 13B:
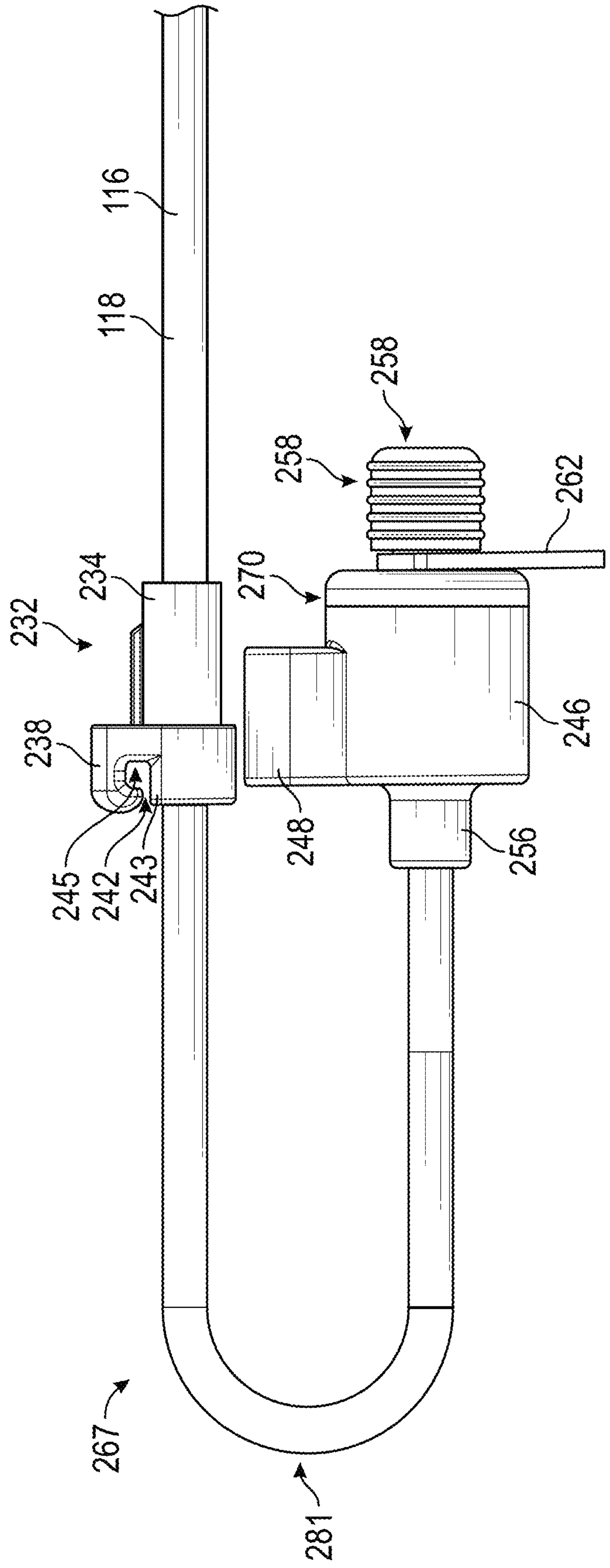
FIG. 13B illustrates a gastrointestinal administration device that includes a conduit, collar, port, and cap of the intraoral gastrointestinal access device.
Figure 13C:
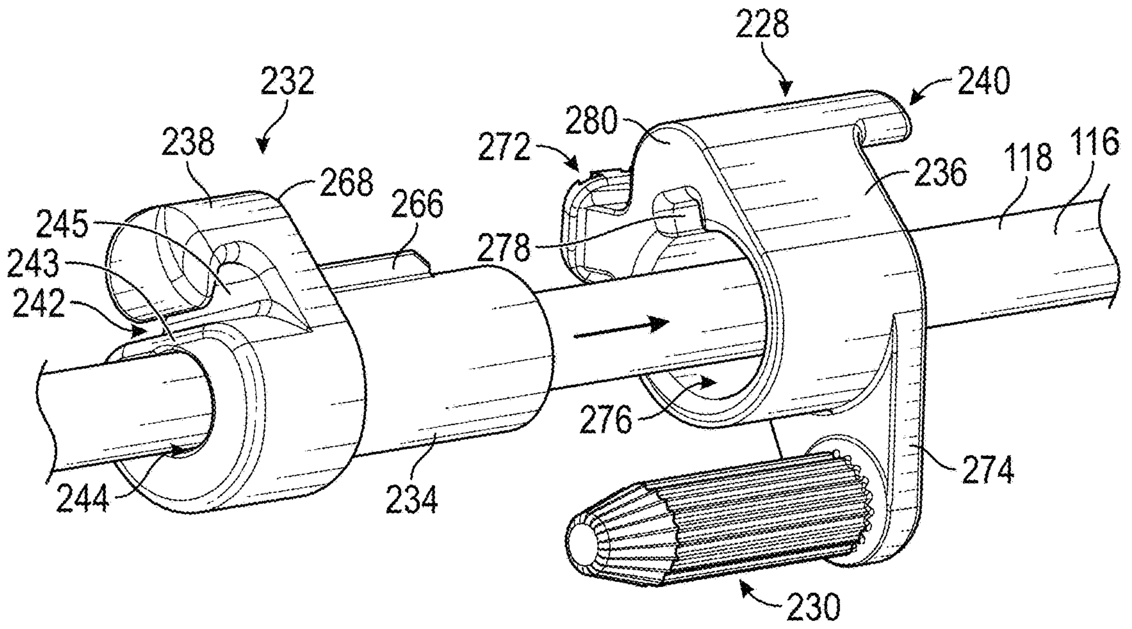
FIG. 13C illustrates the collar and anchor of the intraoral gastrointestinal access device being coupled together.

FIGS. 13A-13C illustrate various views of an intraoral gastrointestinal access device 226 and components thereof. The intraoral gastrointestinal access device 226 can include any of the features described in reference to the intraoral gastrointestinal access device 138 and/or the other intraoral gastrointestinal access devices described herein.

As illustrated in FIG. 13A, the intraoral gastrointestinal access device 226 can include an anchor 228 and a gastrointestinal administration device 267, which can at least include a collar 232, conduit 116, port 246, and/or cap 258. The anchor 228 can be secured within the mouth 120 of the patient 100 using any of the techniques described herein (e.g., direct bonding to the tooth of the patient 100, band around tooth, retainer, etc.). The collar 232 disposed on (e.g., adhered to) the conduit 116 can be coupled to the anchor 228, which can include using an elastic to couple as described herein. As shown, the collar 232 can include a hole 244 (e.g., lumen) through which the first portion 118 of the conduit 116 can be disposed and coupled (e.g., adhered) to the first portion 118 of the conduit 116. The collar 232 can include a first mating feature 234 (e.g., cylindrical structure, tube). The anchor 228 can include a second mating feature 236 (e.g., cylindrical structure, tube). The first mating feature 234 of the collar 232 can be disposed through the second mating feature 236 of the anchor 228. The hole 244 can extend through the first mating feature 234 of the collar 232.

The anchor 228 and the collar 232 can include features to facilitate coupling together with an elastic (e.g., band, ring, tie). The collar 232 can include a first hook 238 (e.g., catch). The anchor 228 can include a second hook 240 (e.g., catch). An elastic can be disposed around the first hook 238 and the second hook 240 to couple the anchor 228 and the collar 232. The first hook 238 can be configured to retain the elastic even with the elastic not coupling the first hook 238 and the second hook 240. For example, the first hook 238 can extend (e.g., curve) such that a free end thereof approaches a surface 243 (e.g., flat surface) of the collar 232 but maintains a gap 242 between the free end of the first hook 238 and the surface 243. A force can be applied to the elastic, such as an elastic band, to move the elastic through the gap 242 and into a receiving region 245 of the collar 232. The elastic can be pulled (e.g., tensioned) along an axis thereof to temporarily thin the elastic to fit through the gap 242 and then be released in the receiving region 245 to return the elastic to a default state, thicker than the thinned state, that avoids the elastic escaping the receiving region 245 through the gap 242 absent intentional outside force. The elastic can be pushed and/or pulled through the gap 242, which can temporarily deform the elastic to fit through the gap 242, to the receiving region 245 for retention therein absent intentional outside force to remove the elastic from the receiving region 245 through the gap 242. With the first mating feature 234 of the collar 232 disposed through the second mating feature 236 of the anchor 228, the elastic retained in the receiving region 245 of the collar 232 by the first hook 238 can be disposed (e.g., looped) around the second hook 240 to couple the collar 232 and the anchor 228 together. To uncouple the collar 232 and the anchor 228, the elastic can be uncoupled (e.g., removed from) the second hook 240 to free the collar 232 to be retracted proximally from the anchor 228.

The anchor 228 and the port 246 can be coupled together to retain the port 246 in the mouth 120 of the patient 100. The anchor 228 and the port 246 can include features to couple together. For example, the anchor 228 can include a first docking feature 230 and the port 246 can include a second docking feature 248 that can interface to couple the anchor 228 and the port 246 together. The first docking feature 230 can include male splines. The second docking feature 248 can include female splines. The male splines of the first docking feature 230 can interface (e.g., be inserted into) the female splines of the second docking feature 248. The first docking feature 230 can be push fit into the second docking feature 248. The first docking feature 230 can include an elongate structure (e.g., peg, torpedo-shaped structure, pin), which can be tapered, that can include the male splines. The first docking feature 230 can extend (e.g., extend in a proximal/anterior direction) from a connector 274 (e.g., surface, proximal-facing surface, wall, panel) of the anchor 228. The second docking feature 248 can include arms 250 that include the female splines. The female splines can be disposed proximate free ends of the arms 250. The female splines of the arms 250 can form an annular (e.g., ring) shape, which can include forming a receiving region (e.g., space) to receive the first docking feature 230. The arms 250 can flex, which can facilitate a push fit between the first docking feature 230 and the second docking feature 248 and/or facilitate the second docking feature 248 rotating about the first docking feature 230 when subject to an external force (e.g., forces inadvertently applied during mastication) to avoid breaks. The arms 250 can be spaced apart from each other at free ends by a gap 252 (e.g., space). The arms 250 can be spaced apart from each other opposite the free ends by a gap 254 (e.g., space). The gap 252 and/or gap 254 can facilitate flexing by the arms 250. In some variants, the gap 254 can be omitted. The arms 250 can be curved. The arms 250 can be the same length or different lengths. The arms 250 can be the same but in a mirrored arrangement relative to each other. In some variants, the second docking feature 248 can include an annular structure (e.g., ring) with the female splines. The annular structure can include one or more gaps to facilitate flexing. In some variants, the anchor 228 can include the second docking feature 248 and the port 246 can include the first docking feature 230. In some variants, the collar 232 instead of the anchor 228 can include the first docking feature 230 or second docking feature 248 to couple with the port 246 to retain the port 246 in the mouth 120 of the patient 100.

The conduit 116 can include one or more loops or other characteristics to arrange the first portion 118 of the conduit 116 within the mouth 120 of the patient 100. For example, the first portion 118 can include a loop 281 (e.g., curve). The first portion 118 can extend proximally from the collar 232 coupled to the anchor 228 to a loop 281 that redirects the first portion 118 in the distal/proximal direction to the port 246 coupled to the anchor 228. The port 146 can include an external protrusion 256 (e.g., protrusion, tube). The external protrusion 256, similar to the external protrusion 216 described with reference to intraoral gastrointestinal access device 138, can include a portion of a pocket of the port 246 that receives an end of the first portion 118 of the conduit 116. With the external protrusion 256, more of the pocket of the port 246 can be disposed outside an interior of the port 246 compared to the intraoral gastrointestinal access device 138.

To prepare the intraoral gastrointestinal access device 226 to administer substance, the port 246 can be uncoupled from the anchor 228 to remove the port 246 from the mouth 120 of the patient 100. For example, the port 246 can be grasped and pulled in a proximal/anterior direction to uncouple (e.g., slide off) the second docking feature 248 from the first docking feature 230. With the port 246 and the anchor 228 uncoupled, the port 246 can be removed from the mouth 120 of the patient 100 while the collar 232 remains coupled to the anchor 228. The first portion 118 of the conduit 116 can be moved from the shape set configuration with the loop 281 to unravel (e.g., straighten) to facilitate removal of the port 246 from the mouth 120.

The intraoral gastrointestinal access device 226 can include a cap 258 that can impede access to the port 246 and lumen of the first portion 118 when coupled to the port 246. The port 246 can include a flange 270 that can cover an opening into the port 246. The port 246 can include a grasping portion 260, which can include features for gripping, that can ease grasping the cap 258. The cap 258 can include a tether 262 (e.g., flexible member) that can couple the cap 258 to the first portion 118 and/or port 246 (e.g., external protrusion 256 of the port 246). For example, the tether 262 can include a hole 264 through which the first portion 118 of the conduit 116 and/or external protrusion 256 can be disposed to couple the cap 258 to the first portion 118 of the conduit 116 and/or external protrusion 256. The tether 262 can be adhered to the first portion 118 of the conduit 116 and/or external protrusion 256.

The cap 258 can be uncoupled from the port 246 to facilitate introducing substance through the port 246 into the lumen of the conduit 116. The cap 258 can be coupled to the port 246 with at least a push fit or threaded connection. With the cap 258 uncoupled from the port 246, a device (e.g., substance delivery device) can be coupled to the port 246 to flow substance through the port 246 and into the lumen of the conduit 116. The substance can flow through the conduit 116 and out one or more holes at a second portion of the conduit 116 disposed at a target gastrointestinal tract site. When finished, the cap 258 can be recoupled to the port 246 and the port 246 can be recoupled to the anchor 228. The second docking feature 248 of the port 246 can be disposed on (e.g., slid over, pushed on) the first docking feature 230 of the anchor 228 to couple the port 246 and anchor 228. The first portion 118 of the conduit 116 can return to the shape set configuration with the loop 281 when the port 246 is coupled to the anchor 228. With the port 246 coupled to the anchor 228, the intraoral gastrointestinal access device 226 can be substantially concealed from view.

As described herein, while leaving the anchor 228 fixed within the mouth 120 of the patient 100, the gastrointestinal administration device 267 (e.g., conduit 116, collar 232, port 246, and/or cap 258), as illustrated in FIG. 13B, may be replaced as needed or removed for durations when the patient 100 will not be receiving substance by way of the intraoral gastrointestinal access device 226. As described herein, the gastrointestinal administration device 267 can be replaceable, which can include disposable, while leaving the anchor 228 fixed within the mouth of the patient 100. The collar 232 and the port 246 can be adhered or otherwise fixed to the first portion 118 of the conduit 116. The collar 232 can be disposed on the first portion 118 of the conduit 116 at a position relative to the second portion of the conduit 116 such that, when the anchor 228 is coupled to the collar 232, the second portion of the conduit 116 is located at the target gastrointestinal tract site of the patient 100. The conduit 116 can be cut a length from the collar 232 based on measurements of the anatomy of the patient 100 to position the second portion at the target gastrointestinal tract site. The collar 232 can be fixed at a position along the conduit 116 based on measurements of the anatomy of the patient 100 to position the second portion at the target gastrointestinal tract site. The end of the first portion 118 can be adhered within a pocket of the port 246.

Figure 13D:
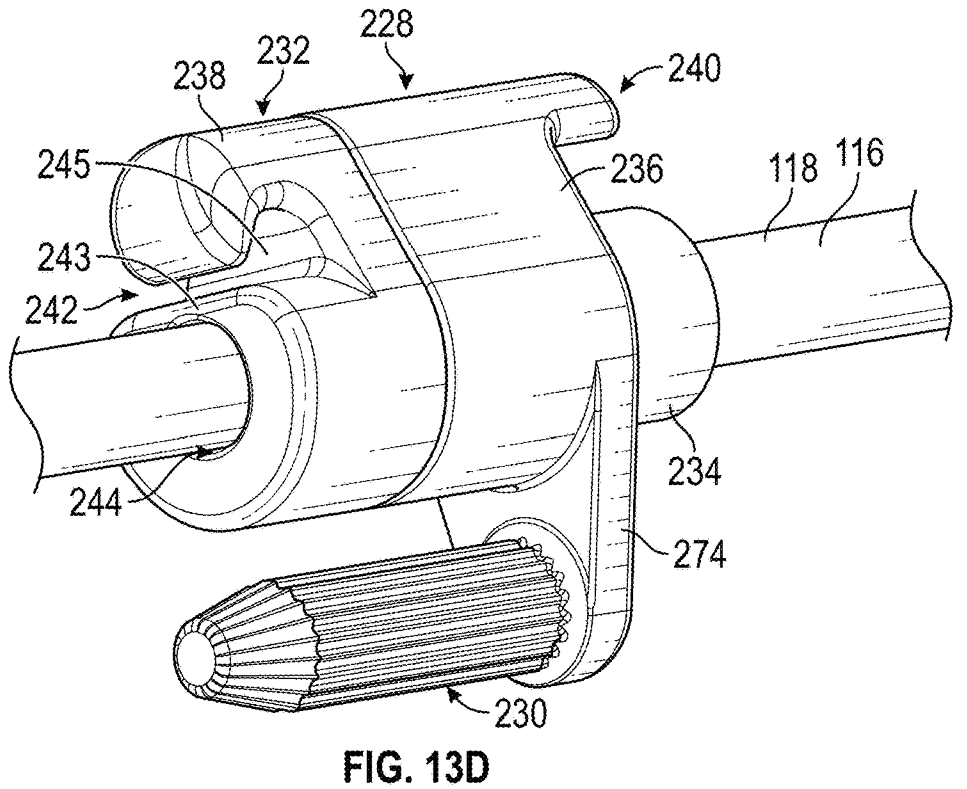
FIG. 13D illustrates the collar and anchor coupled together.
Figure 13E:
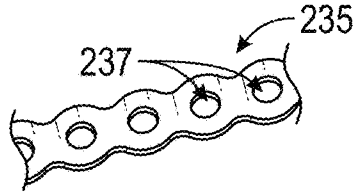
FIG. 13E illustrates an example elastic for securing the collar and the anchor together.

FIGS. 13C and 13D illustrate the collar 232 and the anchor 228 being positioned (e.g., mated) for coupling with an elastic. As shown in FIG. 13C, the conduit 116 can be advanced distally through a receiving region 276 (e.g., hole, lumen) of the second mating feature 236. The collar 232 disposed on (e.g., adhered to) the conduit 116 can be distally advanced with the conduit 116 and into the receiving region 276 of the second mating feature 236 of the anchor 228. As shown, the anchor 228 can include an attachment feature 272 (e.g., bonding surface, tooth band) to secure the anchor 228 within the mouth 120. For example, the attachment feature 272 can include a bonding surface to bond to the tooth 132 of the patient 100. The collar 232 (e.g., first mating feature 234) can include an indexing feature 266 (e.g., protrusion, key, bar). The anchor 228 (e.g., second mating feature 236) can include a channel 278 (e.g., recess, groove) that can receive the indexing feature 266. The collar 232 can be rotated to align the indexing feature 266 with the channel 278 to facilitate advancing the first mating feature 234 into the receiving region 276 of the second mating feature 236. The first mating feature 234 can be distally advanced through the receiving region 276 until a distal-facing surface 268 (e.g., wall) of the collar 232 contacts a proximal-facing surface 280 of the anchor 228. The indexing feature 266 disposed in the channel 278 can prevent relative rotation between the collar 232 and the anchor 228. With the distal-facing surface 268 of the collar 232 contacting a proximal-facing surface 280 of the anchor 228, an elastic (e.g., elastic band) retained by the first hook 238 within the receiving region 245 can be looped around the second hook 240 to couple the collar 232 and anchor 228 together in the arrangement shown in FIG. 13D.

FIG. 13 E illustrates an example elastic 235 (e.g., elastic band, tie, loop) that can be used to secure the collar 232 and anchor 228 together. The elastic 235 can be sectioned to a length to be disposed around the first hook 238 of the collar 232 and the second hook 240 of the anchor 228. The elastic 235 can include one or more openings 237 (e.g., loops, rings). In some variants, the first hook 238 can be disposed through one opening 237 and the second hook 240 can be disposed through another opening 237. The elastic 235 can be made of a flexible material to facilitate stretching to secure the collar 232 and the anchor 228 together.

F. Intraoral Gastrointestinal Access Device—FIGS. 14A-14C

Figure 14A:
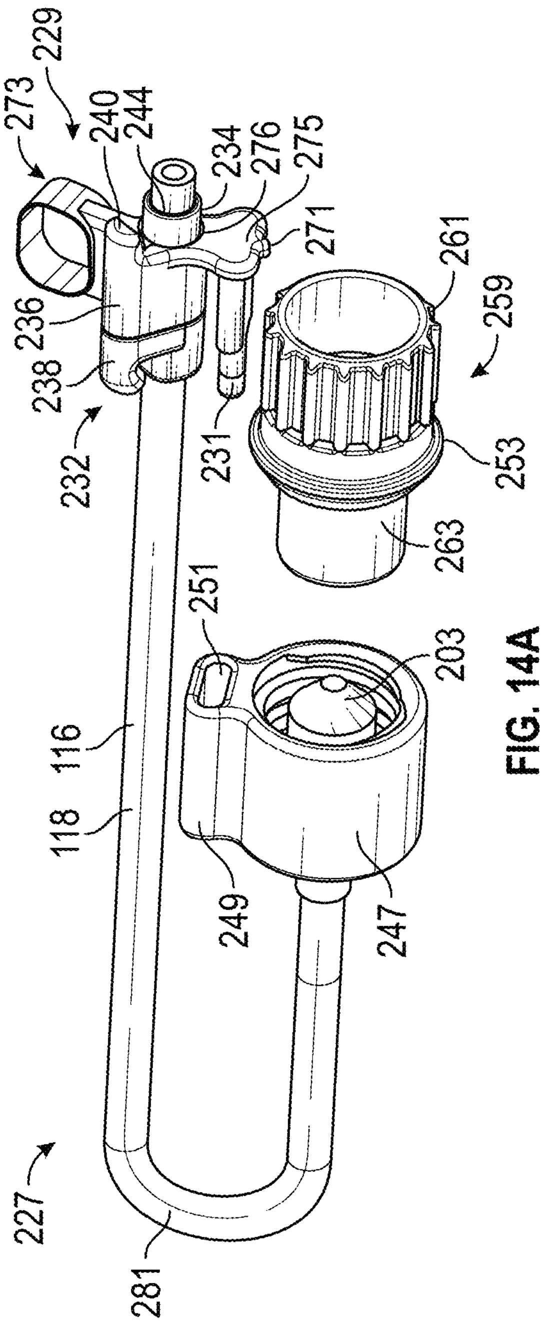
FIG. 14A illustrates another configuration of an intraoral gastrointestinal access device with a hand-actuated locking configuration, with a cap removed.
Figure 14B:
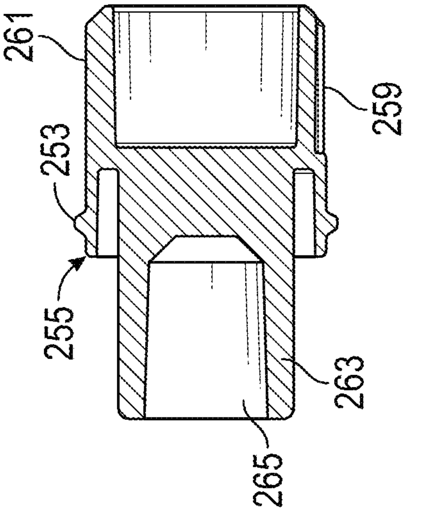
FIG. 14B illustrates a sectioned view of the cap of the intraoral gastrointestinal access device of FIG. 14A.
Figure 14C:
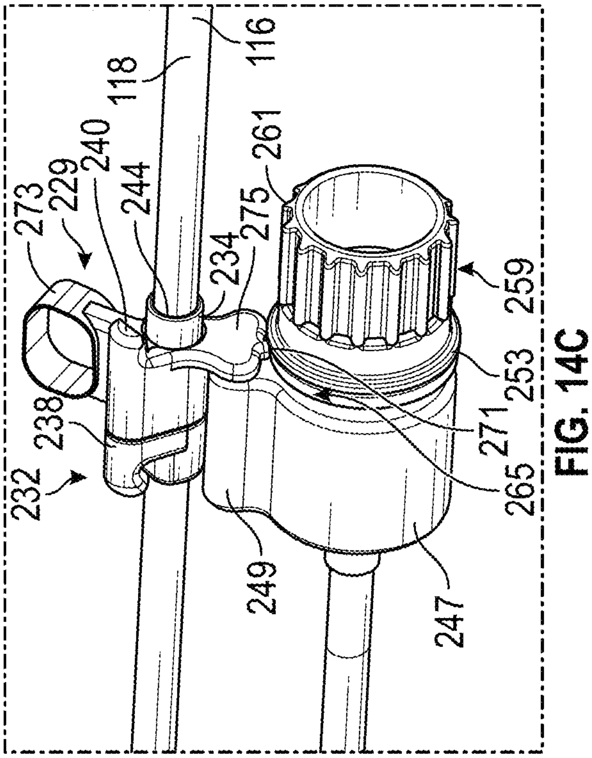
FIG. 14C illustrates the intraoral gastrointestinal access device of FIG. 14A with the cap coupled to a port and the port coupled to an anchor.

FIGS. 14A-14C illustrate various views of an intraoral gastrointestinal access device 227 and components thereof. The intraoral gastrointestinal access device 227 can include any of the features described in reference to the intraoral gastrointestinal access device 226 and/or the other intraoral gastrointestinal access devices described herein.

As illustrated in FIG. 14A, the intraoral gastrointestinal access device 227 can include an anchor 229 and a gastrointestinal administration device 269, which can include a collar 232, conduit 116, port 246, and/or cap 258. The anchor 229 can be secured within the mouth 120 of the patient 100 using any of the techniques described herein. For example, the anchor 229 can include an attachment feature 273. The attachment feature 273, as illustrated in FIG. 14A, can be a tooth band to couple the anchor 229 to a tooth of the patient 100.

As described in reference to the intraoral gastrointestinal access device 226, the collar 232 of the intraoral gastrointestinal access device 227 can be coupled to the anchor 229. The first mating feature 234 of the collar 232 can be disposed through the receiving region 276 of the second mating feature 236 of the anchor 229. An elastic can be disposed around the first hook 238 of the collar 232 and the second hook 240 of the anchor 229 to couple the collar 232 and the anchor 229 together.

The intraoral gastrointestinal access device 227 can include a hand-actuated locking configuration to retain the port 247 in the mouth 120 of the patient 100. The anchor 229 and the port 247 can be coupled together to retain the port 247 in the mouth 120 of the patient 100. The anchor 229 and the port 247 can include features to couple together. For example, the anchor 228 can include a first docking feature 231 and the port 247 can include a second docking feature 249 that can interface to couple the anchor 229 and the port 247 together. The first docking feature 231 can include an elongate protrusion (e.g., projection), which can have an oval shaped periphery. The second docking feature 249 can include a receiving region 251 (e.g., hole, lumen, cavity) that can be sized and shaped to receive the first docking feature 231. The first docking feature 231 can extend distally from a connector 275 (e.g., wall, surface) of the anchor 229.

The cap 259 can be coupled to (e.g., threaded connection, push fit) the port 247 to impede access into the port 247 and an internal lumen of the first portion 118 of the conduit 116. The cap 259 can include a grasping portion 261. The grasping portion 261 can include one or more gripping features (e.g., ridges, bumps, textures) to enhance grip on the grasping portion 261. As illustrated in FIG. 14B, the cap 259 can include a projection 263 (e.g., protrusion, annular projection). The projection 263 can be disposed into an interior of the port 247. The projection 263 can include a space 265 (e.g., receiving region) sized and shaped to receive the protrusion 203 (e.g., male protrusion, inner protrusion) of the port 247 when the projection 263 is disposed into the interior of the port 247. The projection 263 can include one or more external threads disposed around a periphery thereof that interface with internal threads of the port 247. The cap 259 can include a contact surface 255 (e.g., rim, annular surface). The contact surface 255 can contact the port 247 when the cap 259 is coupled to the port 247. The cap 259 can include a detent 253 (e.g., protrusion, annular protrusion, ring). The detent 253 can project perpendicularly relative to a center longitudinal axis of the cap 259. The detent 253 can couple the port 247 and cap 259 to the anchor 229.

As illustrated in FIG. 14C, the cap 259 can be coupled with (e.g., threaded to) the port 247. The contact surface 255 of the cap 259 can contact a surface of the port 247. The detent 253 can be spaced apart from the port 247 by a space 265 (e.g., gap, annular space, annular gap). The port 247 can be distally advanced into the mouth 120 of the patient 100 to couple the first docking feature 231 of the anchor 229 and the second docking feature 249 (e.g., position the first docking feature 231 of the anchor 229 inside the receiving region 251 of the second docking feature 249). The port 247 can be distally advanced until the connector 275 of the anchor 229 contacts the second docking feature 249 of the port 247. The anchor 229 can include a protrusion 271 (e.g., tab, projection, flange) that can be disposed in the space 265 between the detent 253 and the port 247. The protrusion 271 can extend from the connector 275 of the anchor 229. As the port 247 is distally advanced to couple with the anchor 229, the protrusion 271 can contact and pass the detent 253, which can temporarily deform (e.g., deflect) the detent 253. With the protrusion 271 past the detent 253, the detent 253 can return to an undeformed state. The port 247 and cap 259 can be coupled (e.g., retained) to the anchor 229 with the protrusion 271 of the anchor 229 in the space 265 between the port 247 and the detent 253. The protrusion 271 interfacing with (e.g., contacting) the detent 253 can impede unintentional decoupling of the port 247 and cap 259 from the anchor 229. For example, contact between the protrusion 271 and the detent 253 can impede proximal movement of the port 247 with respect to the anchor 229, contact between the connector 275 and the second docking feature 249 can impede distal movement of the port 247 with respect to the anchor 229, and the interface between the first docking feature 231 and the receiving region 251 of the second docking feature 249 can impede rotation of the port 247. In some variants, the anchor 229 can include the second docking feature 249 and the port 247 can include the first docking feature 231.

To remove the port 247 from the mouth 120, the port 247 can be grasped and retracted proximally with respect to the anchor 229 with a force. The force can be sufficient such that contact between the protrusion 271 and the detent 253 temporarily deforms (e.g., deflects) the detent 253 to permit the proximal retraction of the port 247 and to position the protrusion 271 outside of the space 265. The first portion 118 of the conduit 116 can move from the shape set configuration with the loop 281 to unravel (e.g., straighten) to facilitate removal of the port 247 from the mouth 120. The cap 259 can be uncoupled (e.g., unthreaded) from the port 247. A device (e.g., substance delivery device) can be coupled to the port 247 to flow substance through the port 247 and into the lumen of the first portion 118 of the conduit 116. When finished, the cap 259 can be recoupled (e.g., threaded, push fit) to the port 247. The port 247 with the cap 259 can be distally advanced into the mouth 120 to couple with the anchor 229. The first docking feature 231 of the anchor 229 can be aligned with the receiving region 251 of the second docking feature 249 such that the first docking feature 231 advances into the receiving region 251 as the port 247 is distally advanced. The detent 253 can contact the protrusion 271 of the anchor 229 while the port 247 and cap 259 are distally advanced which can temporarily deform (e.g., deflect) the detent 253 to facilitate passing the detent 253 distally relative to the protrusion 271 such that the protrusion 271 is disposed in the space 265 between the detent 253 and the port 247 to couple the port 247 and cap 259 to the anchor 229. The first portion 118 of the conduit 116 can return to the memorized configuration with the loop 281 with the port 247 and cap 259 coupled to the anchor 229.

G. Anchor, Collar, and Port of an Intraoral Gastrointestinal Access Device—FIGS. 15A-15D FIGS. 15A-15C illustrate various views of an anchor 282, collar 292, and port 298 for an intraoral gastrointestinal access device. The anchor 282, collar 292, and port 298 can include any of the features described in reference to the anchor 228, collar 232, and port 246 of intraoral gastrointestinal access device 226 and/or the other anchors, collars, and ports of other intraoral gastrointestinal access devices described herein.

Figure 15A:
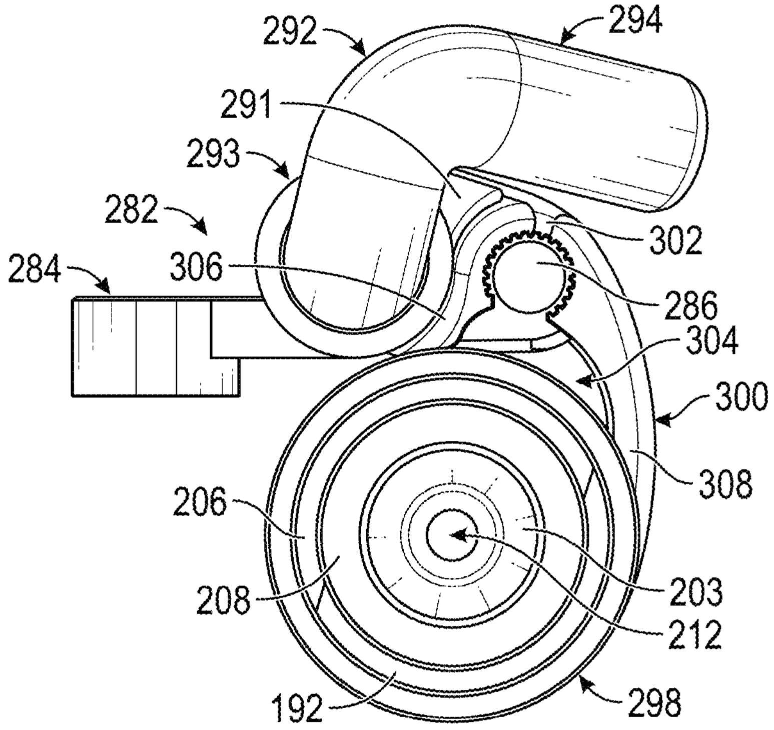
FIG. 15A illustrates a proximal view of a port, a collar, and an anchor of an intraoral gastrointestinal access device coupled together.

As illustrated in FIG. 15A, the anchor 282 and the port 298 can include features similar to the anchor 228 and the port 246 to facilitate coupling to retain the port 246 in the mouth 120 of the patient 100. For example, the anchor 282 can include a first docking feature 286 and the port 298 can include a second docking feature 300 that can interface to couple the anchor 282 and the port 298 together. The first docking feature 286 can include male splines. The second docking feature 300 can include female splines. The male splines of the first docking feature 286 can interface (e.g., be inserted into) the female splines of the second docking feature 300. The first docking feature 286 can be press fit or push fit into the second docking feature 300. The first docking feature 286 can include an elongate structure (e.g., peg, torpedo-shaped structure, pin), which can be tapered, that can include male splines. The first docking feature 286 can extend (e.g., extend in a proximal direction) from a connector 291 (e.g., surface, proximal-facing surface, wall, panel) of the anchor 282. The first docking feature 286 can be disposed more gingival than an attachment feature 284 of the anchor 282.

The second docking feature 300 can include arms, such as an arm 306 and arm 308, that include the female splines. The female splines can be disposed proximate free ends of the arm 306 and arm 308. The female splines of the arm 306 and arm 308 can form an annular (e.g., ring) shape, which can include forming a receiving region (e.g., space) to receive the first docking feature 286. The arm 306 and arm 308 can flex, which can facilitate a press fit or push fit between the first docking feature 286 and the second docking feature 300 and/or facilitate the second docking feature 300 to rotate about the first docking feature 286 when subject to external force (e.g., forces inadvertently applied during mastication) to avoid breaks. The arm 306 and the arm 308 can be spaced apart from each other at free ends by a gap 302 (e.g., space). The arm 306 and arm 308 can be spaced apart from each other opposite the free ends by a gap 304 (e.g., space). The gap 302 and/or gap 304 can facilitate flexing by arm 306 and arm 308. The arm 306 and arm 308 can be curved. The arm 306 and the arm 308 can be different lengths. For example, the arm 306 (e.g., arm more lingually positioned) can be shorter than the arm 308 (e.g., arm more labially positioned), which can arrange the anchor 282 and port 298, when coupled together, in a narrower lingual-labial region and/or occlusal-gingival region than if the arm 306 and arm 308 were the same length. The arm 306 can include a concave contour (e.g., outer periphery can include concave contour) and the arm 308 can include a convex contour (e.g., outer periphery can include convex contour) to package the anchor 282 and port 298 in a narrower lingual-labial region and/or occlusal-gingival region. The arm 306 and/or arm 308 can position a center longitudinal axis of the port 298 closer to the teeth compared to a center longitudinal axis of the first docking feature 286. The center longitudinal axis of the port 298 can be generally aligned with the occlusal plane of the patient 100. In some variants, the second docking feature 300 can include an annular structure (e.g., ring) with female splines. The annular structure can include one or more gaps to facilitate flexing. In some variants, the anchor 282 can include the second docking feature 300 and the port 298 can include the first docking feature 286. In some variants, the collar 292 instead of the anchor 282 can include the first docking feature 286 or second docking feature 300 to couple with the port 298 to retain the port 298 in the mouth 120 of the patient 100.

The anchor 282 can be secured within the mouth 120 of the patient 100 using any of the techniques described herein. The anchor 282 can include an attachment feature 284 to facilitate anchoring within the mouth 120. In some variants, as illustrated, the attachment feature 284 can be an orthodontic band to be disposed around the tooth of the patient.

The collar 292 can include a conduit guide 294 (e.g., tube, duct). The conduit guide 294 can redirect the first portion 118 of the conduit 116 disposed through a lumen 297 (e.g., hole, tube) of the conduit guide 294. The conduit guide 294 can include one or more curves to direct the first portion 118. For example, with the collar 292 coupled to the anchor 282, the conduit guide 294 can direct the first portion 118 disposed therethrough in a proximal direction and/or labial direction away from the teeth of the patient 100.

Figure 15B:
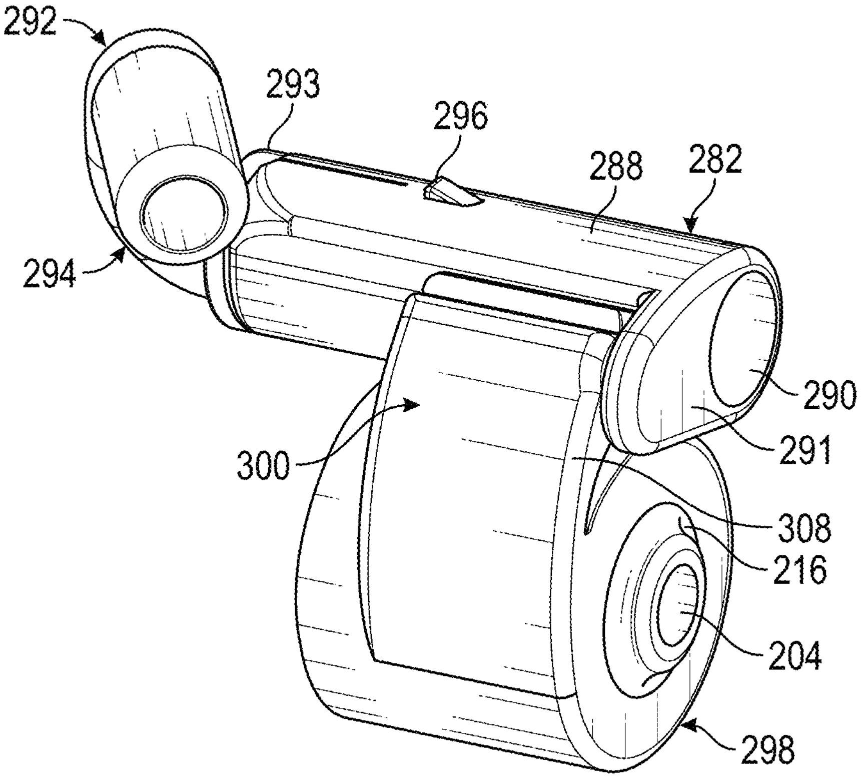
FIG. 15B illustrates a perspective view of the port, collar, and anchor of the intraoral gastrointestinal access device of FIG. 15A.
Figure 15C:
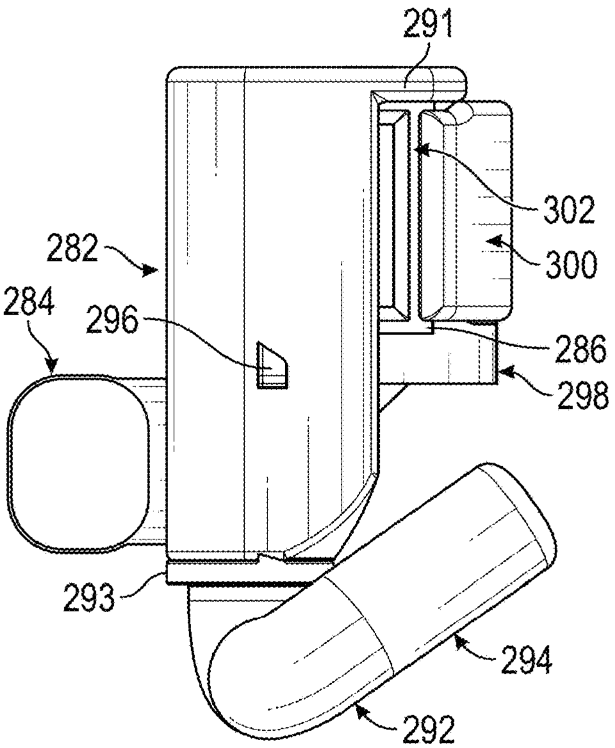
FIG. 15C illustrates a top view of the port, collar, and the anchor of the intraoral gastrointestinal access device of FIG. 15A.

As illustrated in FIG. 15B, to couple the collar 292 and the anchor 282, the collar 292 can be distally advanced through a receiving region 290 of the anchor 282 until a wall 293 (e.g., flange, panel, surface) of the collar 292 contacts the anchor 282. The collar 292 can include a biased feature 296 (e.g., locking tab, spring tab, spring feature, biased hook, biased edge) that can interface (e.g., engage) with the anchor 282 to couple the collar 292 and anchor 282 together. For example, with the wall 293 of the collar 292 contacting the anchor 282, the biased feature 296 of the collar 292 can be free to spring to a corresponding feature (e.g., recess, catch, notch, hook, edge, contour) of the anchor 282 to couple the collar 292 and the anchor 282 together. To uncouple the collar 292 and the anchor 282, a force can be applied to the biased feature 296 of the collar 292 (e.g., force applied with a tool and/or by hand) to overcome the biasing force of the biased feature 296 and disengage the biased feature 296 from the corresponding feature of the anchor 282. With the biased feature 296 disengaged, the collar 292 can be uncoupled from the anchor 282 (e.g., removed from the receiving region 290 of the anchor 282). The anchor 282 can include a channel to receive the biased feature 296 such that the interface between the biased feature 296 and the channel impedes relative rotational movement between the anchor 282 and the collar 292. The collar 292 can be disposed on (e.g., adhered to) the first portion 118 of the conduit 116.

As illustrated in 15C, the anchor 282 can include an elongate body 288 (e.g., elongate extension, bridge). The elongate body 288 can offset the attachment feature 284 of the anchor 282 and the first docking feature 286 and/or connector 291 in a longitudinal direction of the anchor 282, which can offset the attachment feature 284 and the port 298 coupled to the first docking feature 286 in the longitudinal direction of the anchor 282. For example, the elongate body 288 can offset the attachment feature 284 of the anchor 282 and the first docking feature 286 and/or connector 291 in a mesial-distal direction, which can offset the attachment feature 284 and the port 298 coupled to the first docking feature 286 in the mesial-distal direction. The elongate body 288 can be used to secure the anchor 282 with the attachment feature 284 to a first tooth and position the connector 291 and/or first docking feature 286 at a second tooth, which can position the port 298 at the second tooth. The elongate body 288 can be used to secure the anchor 282 with the attachment feature 284 to a tooth and position the connector 291 and/or first docking feature 286 at a location of a missing tooth, which can position the port 298 at the missing tooth. An elongate body can be incorporated into any of the anchors, collars, and/or ports disclosed herein.

Figure 15D:
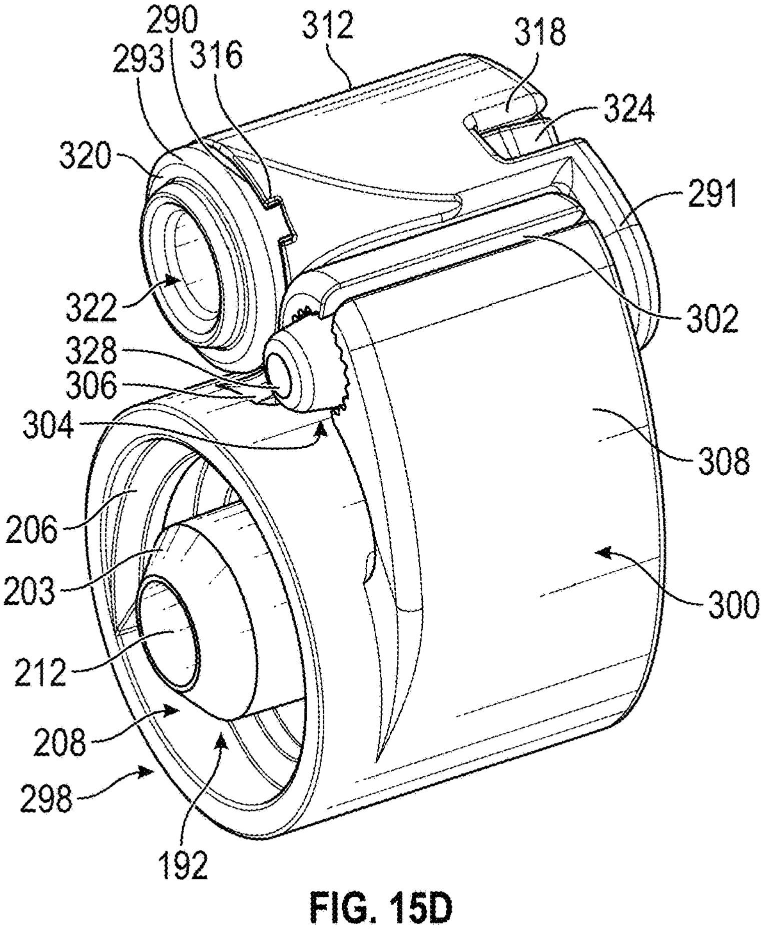
FIG. 15D illustrates another perspective view of the port, a collar, and an anchor of the intraoral gastrointestinal access device of FIG. 15A coupled together with modified collar features.

FIG. 15D illustrates an anchor 312 coupled to the port 298 and a collar 320 coupled to the anchor 312. The anchor 312 can include the connector 291 and first docking feature 328 described in reference to FIGS. 15A-15C to couple with the port 298. The anchor 312 can include features to facilitate coupling with the collar 320. For example, the anchor 312 can include a receiving region 290 (e.g., lumen, hole, tube) to receive the collar 320. The anchor 312 can include a channel 316 (e.g., groove, recess) to receive a biased feature 324 (e.g., locking tab, spring tab, spring feature, biased hook, biased edge) of the collar 320. The biased feature 324 can act as an indexing feature. For example, the interface between the biased feature 324 and the channel 316 can prevent relative rotation between the collar 320 and the anchor 312. The anchor 312 can include a notch 318 (e.g., edge, surface, recess) to interface with the biased feature 324. The collar 320 can be advanced distally through the receiving region 290 until the wall 293 of the collar 320 contacts the anchor 312 which can position the biased feature 324 out of the channel 316 and free to spring to the notch 318 to couple the collar 320 and the anchor 312 together. To uncouple the collar 320 and the anchor 312, a force (e.g., force applied with a tool) can be applied to the biased feature 324 (e.g., force applied with a tool and/or by hand) to deflect the biased feature 324 to disengage from the notch 318. With the biased feature 324 disengaged from the notch 318, the collar 320 can be proximally retracted out of the receiving region 290 of the anchor 312. As described herein, the first portion 118 of the conduit 116 can be disposed through a lumen 322 (e.g., tube, hole) of the collar 320. The first portion 118 can be adhered to the collar 320 in the lumen 322. The conduit 116, collar 320, port 298, and/or a cap that can couple to the port 298 can be removed while leaving the anchor 312 secured within the mouth 120 of the patient 100.

H. Anchor, Collar, and Conduit of an Intraoral Gastrointestinal Access Device—FIGS. 16A-16D FIGS. 16A-16D illustrate various views of an anchor 330, collar 334, and conduit 116 for an intraoral gastrointestinal access device. The anchor 330, collar 334, and conduit 116 can include any of the features described in reference to other anchors, collars, and conduits described herein.

Figure 16A:
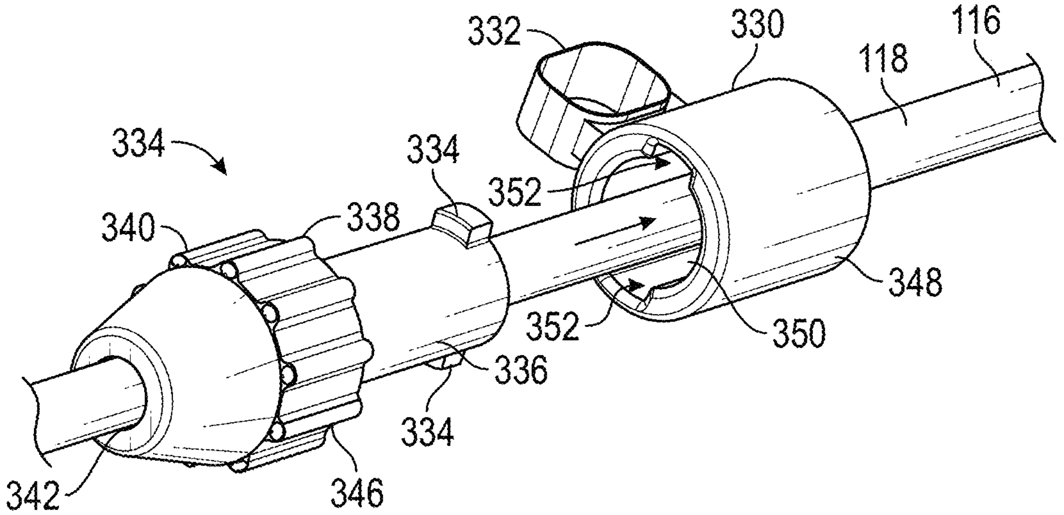
FIG. 16A illustrates a collar coupled to a conduit being distally advanced into a receiving region of an anchor of another configuration of an intraoral gastrointestinal access device.

FIG. 16A illustrates the collar 334 disposed (e.g., adhered) to the conduit 116 being distally advanced to couple with the anchor 330. The end of the first portion 118 of the conduit 116 can be coupled to a port as described herein. The anchor 330 can be secured within the mouth 120 of the patient 100 using any of the techniques described herein. The anchor 330 can include an attachment feature 332 to facilitate anchoring within the mouth 120. In some variants, as illustrated, the attachment feature 332 can be an orthodontic band to be disposed around the tooth of the patient.

The anchor 330 can include a second mating feature 348 (e.g., cylindrical structure, tube) that can interface (e.g., receive) a first mating feature 336 (e.g., cylindrical structure, tube) of the collar 334. For example, the second mating feature 348 can include a receiving region 350 (e.g., lumen, hole) that can receive the first mating feature 336 of the collar 334. The receiving region 350 can be various sizes, which can at least include being sized to allow a #11 French tube to pass therethrough. The second mating feature 348 can include one or more channels 352 (e.g., grooves, recesses), which can be disposed on opposing sides of the receiving region 350. The one or more channels 352 can receive one or more retention features 344 (e.g., tabs, protrusions, flanges), which can be disposed on opposing sides of the first mating feature 336. The one or more channels 352 and the one or more retention features 344 can include complementary sizes, shapes, and/or positions. In some variants, the one or more channels 352 can include two channels 352. In some variants, the one or more retention features 344 can include two retention features 344.

The collar 334 can include a grasping portion 346 (e.g., grasping feature, enlarged portion, biased portion). The grasping portion 346 can be coupled to the first mating feature 336 with a spring mechanism, which can facilitate limited relative movement between the grasping portion 346 and the first mating feature 336. The grasping portion 346 can include grip features 340 (e.g., ridges, texture). The collar 334 can include a hole 342 (e.g., lumen, receiving region) through which the first portion 118 of the conduit 116 can be disposed. The first mating feature 336 can be fixed (e.g., adhered) to the first portion 118 to prevent relative movement between the first mating feature 336 and the first portion 118. The spring mechanism coupling the grasping portion 346 and the first mating feature 336 can facilitate limited relative movement between grasping portion 346 and the portion of the first portion 118 of the conduit 116 that the first mating feature 336 is fixed to.

Figure 16B:
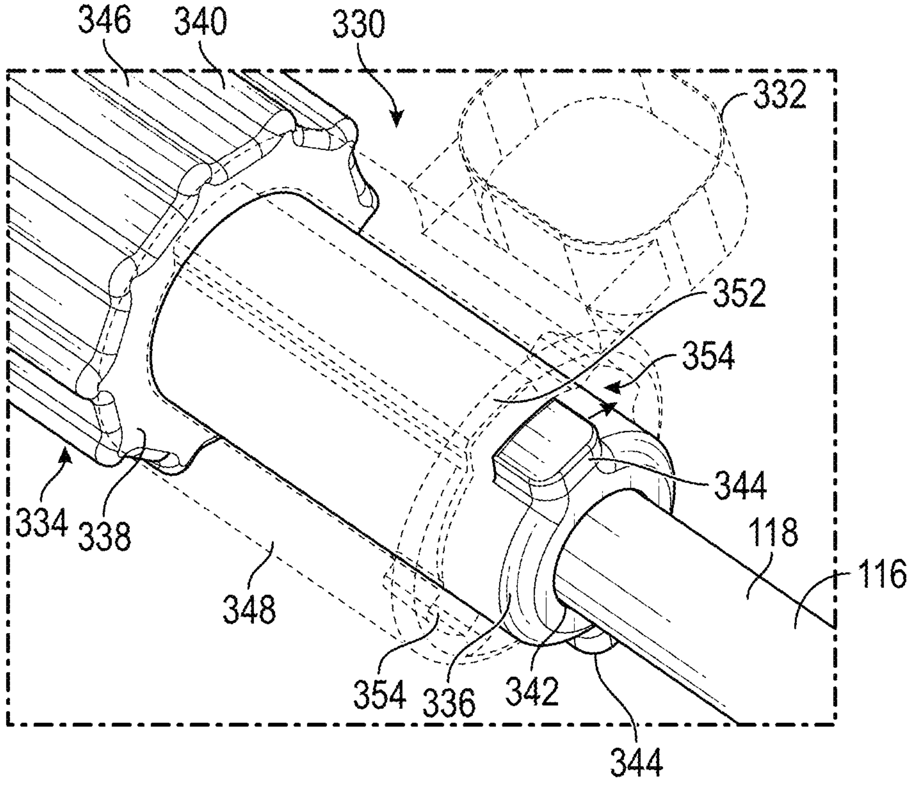
FIG. 16B illustrates a method of using the of the intraoral gastrointestinal access device of FIG. 16A, where the collar is rotated to align retention features with pockets of the anchor.
Figure 16C:
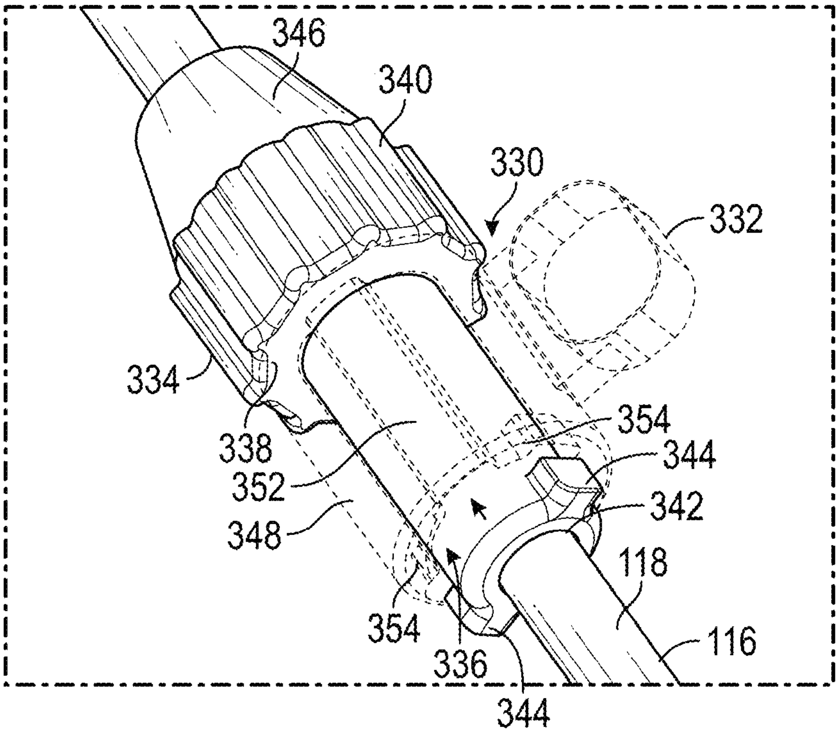
FIG. 16C illustrates a method in which a mating feature of the collar is aligned with the pockets of the anchor.
Figure 16D:
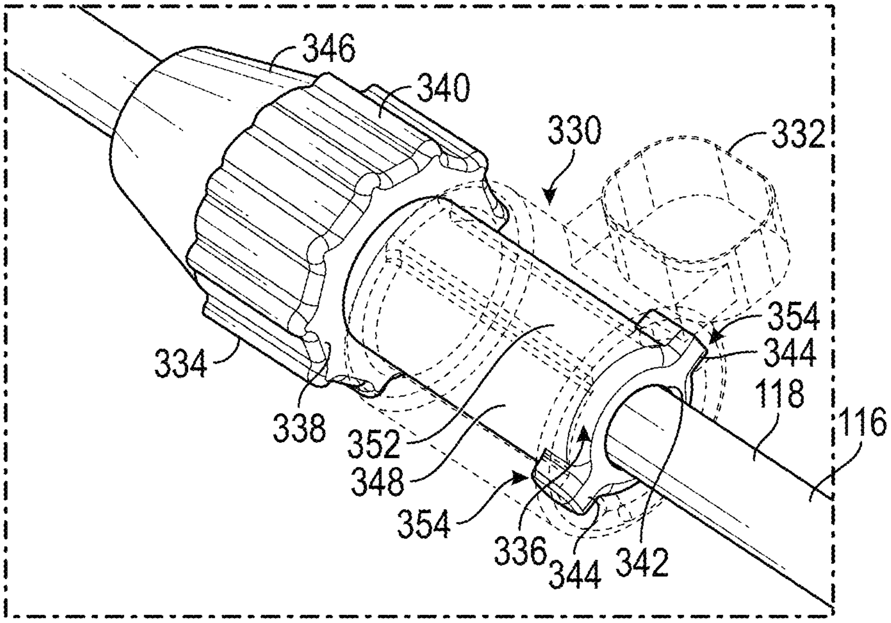
FIG. 16D illustrates a method in which the mating feature is retracted proximally into the pockets of the anchor.

As illustrated in FIG. 16A, the first mating feature 336 of the collar 334 and the first portion 118 of the conduit 116 can be distally advanced through the receiving region 350 of the second mating feature 348 of the anchor 330 with the retention features 344 of the first mating feature 336 disposed in the channels 352 of the anchor 330 until a distal-facing surface 338 of the grasping portion 346 contacts the anchor 330. As illustrated in FIG. 16B, a distal force can be applied to the first portion 118 to overcome the biasing force of the spring mechanism such that the first mating feature 336 fixed to the first portion 118 distally advances relative to the grasping portion 346 such that the one or more retention features 344 do not prevent rotation of the first mating feature 336 (e.g., the one or more retention features 344 are disposed distally out of the channels 352). In some variants, a distal force can be applied to the first mating feature 336 to overcome the biasing force of the spring mechanism such that the first mating feature 336 distally advanced=s relative to the grasping portion 346 such that the one or more retention features 344 do not prevent rotation of the first mating feature 336 (e.g., the one or more retention features 344 are disposed distally out of the channels 352). With the one or more retention features 344 not impeding rotation, the first mating feature 336 can be rotated (e.g., by rotating the first portion 118) to align the one or more retention features 344 with one or more pockets 354 (e.g., cutouts, recesses, holes) of the anchor 330, as illustrated in FIG. 16C. The one or more pockets 354 can be open in a distal direction. The one or more pockets 354 can be disposed on a distal end of the second mating feature 348. With the one or more retention features 344 aligned with the one or more pockets 354, the application of the distal force on the first mating feature 336 (e.g., first portion 118 fixed to the first mating feature 336) can be terminated (e.g., the first mating feature 336 and/or first portion 118 can be released) such that the spring mechanism proximally retracts the first mating feature 336 to position the one or more retention features 344 in the one or more pockets 354 to create a positive lock. The one or more retention features 344 disposed in the one or more pockets 354 can couple the collar 334 and the anchor 330, which can include preventing relative movement between the two until the one or more retention features 344 are removed from the one or more pockets 354. To uncouple the collar 334 and the anchor 330, a distal force can be applied to the first mating feature 336 (e.g., first portion 118 fixed to the first mating feature 336) to overcome the biasing force of the spring mechanism such that the first mating feature 336 is distally advanced to position the one or more retention features 344 outside of the one or more pockets 354. With the one or more retention features 344 outside of the one or more pockets 354, the first mating feature 336 (e.g., first portion 118 fixed to the first mating feature 336) can be rotated to rotate the first mating feature 336 to align the one or more retention features 344 with the one or more channels 352 of the second mating feature 348. The first portion 118 and/or collar 334 can be proximally retracted to proximally retract the first mating feature 336 out of the receiving region 350 of the second mating feature 348 of the anchor 330 with the one or more retention features 344 passing through the one or more channels 352 to uncouple the collar 334 and the anchor 330.

I. Intraoral Gastrointestinal Access Device—FIGS. 17A and 17B

Figure 17A:
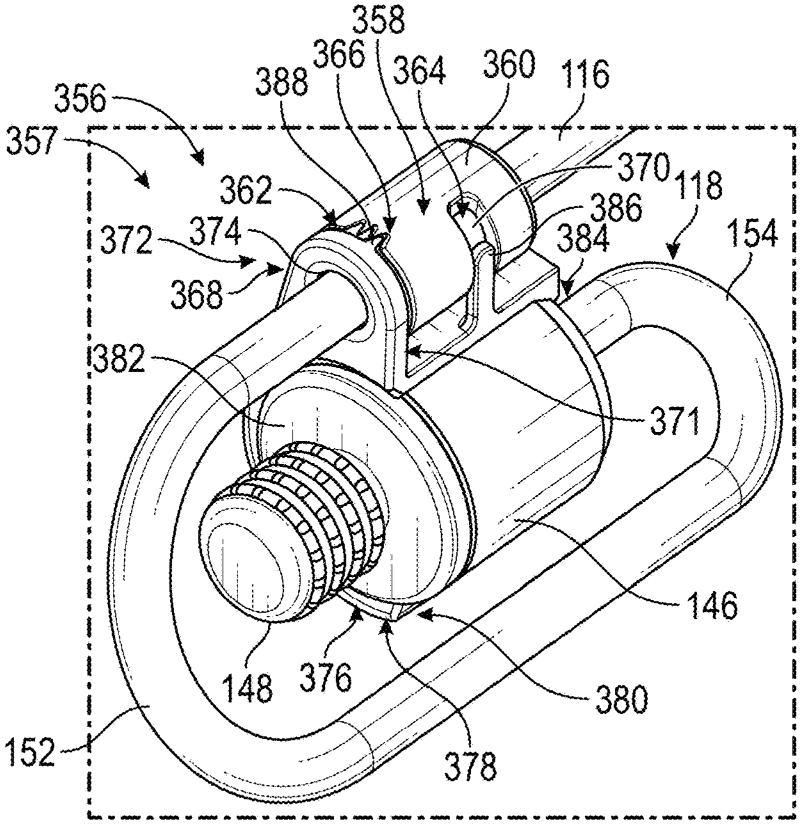
FIG. 17A illustrates another intraoral gastrointestinal access device in a stowed configuration.
Figure 17B:
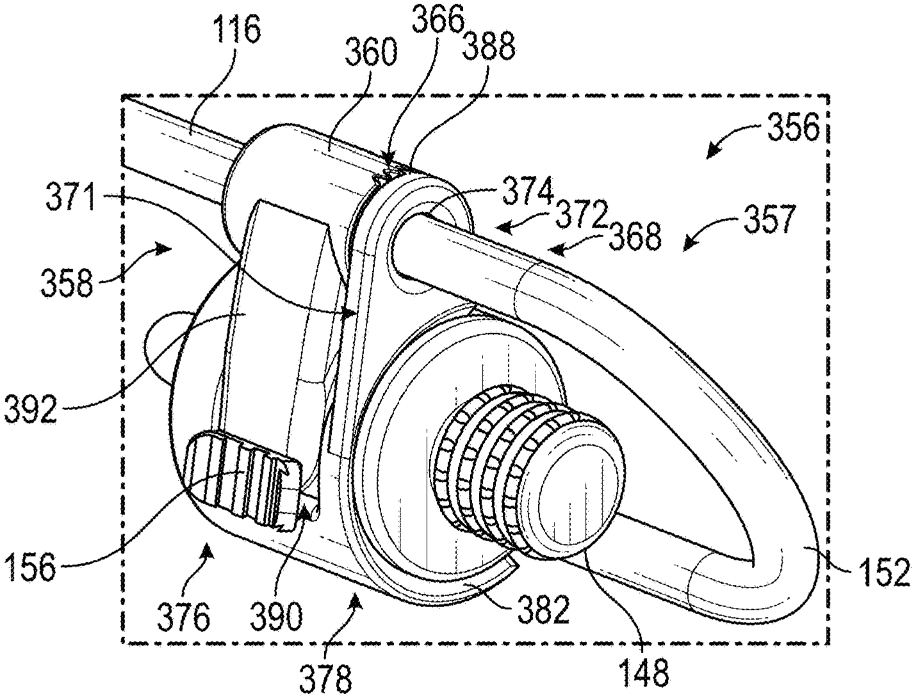
FIG. 17B illustrates another view of the intraoral gastrointestinal access device of FIG. 17A.

FIGS. 17A and 17B illustrate various views of an intraoral gastrointestinal access device 356 (e.g., gastrointestinal administration device) and components thereof. The intraoral gastrointestinal access device 356 can include any of the features described in reference to the other gastrointestinal administration devices described herein.

As illustrated in FIG. 17A, the intraoral gastrointestinal access device 356 can include an anchor 358 and a gastrointestinal administration device 357, which can at least include a collar 368, conduit 116, port 146, and/or cap 148. The anchor 358 can be secured within the mouth 120 of the patient 100 using any of the techniques described herein (e.g., direct bonding to the tooth of the patient 100, band around tooth, retainer, etc.). The collar 368 disposed on (e.g., adhered to) the conduit 116 can be coupled to the anchor 358. The collar 368 can include a hole 374 (e.g., lumen) through which the first portion 118 of the conduit 116 can be disposed and coupled (e.g., adhered). The collar 368 can include a first mating feature 370 (e.g., cylindrical structure, tube). The first mating feature 370 can extend distally from a distal-facing surface 371 of the collar 368. The distal-facing surface 371 can be disposed on a connector 372 (e.g., bridge) that extends between the first mating feature 370 and a docking feature 376 of the collar 368. The anchor 358 can include a second mating feature 360 (e.g., cylindrical structure, tube). The first mating feature 370 of the collar 368 can be disposed through the second mating feature 360 of the anchor 358.

The anchor 358 and/or collar 368 can include features to releasably lock the anchor 358 and collar 368 together, which can include locking the first mating feature 370 and second mating feature 360 together. For example, the anchor 358 and/or collar 368 can include one or more features to prevent relative distal-proximal movement between the anchor 358 and collar 368. The second mating feature 360 of the anchor 358 can include a channel 364 (e.g., recess, cutout). The channel 364 can be disposed in a wall (e.g., annular wall) of the second mating feature 360. The channel 364 can be oriented to extend along a portion of the circumference of the second mating feature 360. The collar 368 can include a locking feature 386, which can be a tab, biased member, and/or protrusion. The locking feature 386 can protrude from the docking feature 376 (e.g., annular structure 378 of the docking feature 376) to proximate the first mating feature 370. In some variants, the locking feature 386 can extend to contact the first mating feature 370. As the first mating feature 370 of the collar 368 is advanced distally through a receiving region 362 (e.g., hole, lumen) of the second mating feature 360 of the anchor 358, the locking feature 386 can be deflected (e.g., deflect outward) to slide along an outer surface of the second mating feature 360. The collar 368 can be distally advanced until the distal-facing surface 371 of the connector 372 contacts the second mating feature 360. The locking feature 386 can slide along the outer surface of the second mating feature 360 until reaching the channel 364. The locking feature 386 can be biased such that, upon reaching the channel 364, the locking feature 386 moves (e.g., springs) into the channel 364 to restrict relative movement between the anchor 358 and collar 368 in the distal-proximal direction. In some variants, a distal edge (e.g., leading edge) of the locking feature 386 can include a chamfer (e.g., angled surface) to ease deflection of the locking feature 386 outward upon contacting the second mating feature 360. The placement of the locking feature 386 in the channel 364 can lock the collar 368 and anchor 358 together. However, with force, the collar 368 can be pulled proximally to cause the locking feature 386 to deflect outward out of the channel 364 from contact with the second mating feature 360 such that the collar 368 can be decoupled from the anchor 358 and retracted proximally. The deflected locking feature 386 can slide along the outer surface of the second mating feature 360 as the collar 368 is retracted proximally relative to the anchor 358.

The anchor 358 and/or collar 368 can include one or more features to restrict relative rotational movement between the anchor 358 and collar 368, which can include one or more features to lock the collar 368 at different rotational orientations with respect to the anchor 358. The second mating feature 360 of the anchor 358 can include one or more recesses 366 (e.g., cutouts, notches). The recesses 366 can be disposed at a proximal edge of the second mating feature 360. The recesses 366 can be disposed along a circumference of the second mating feature 360. The recesses 366 can be various shapes, which can include polygonal (e.g., triangular), irregular, and/or others. In some variants, the one or more recesses 366 can include one, two, three, four, five, or more recesses. With two or more recesses 366, the collar 368 can be locked at different rotational orientations with respect to the anchor 358. The one or more recesses 366 can be open in a proximal direction. The anchor 358 can include an indexing feature 388 (e.g., protrusion, tab) that can be disposed in the one or more recesses 366 to lock the collar 368 at a rotational orientation with respect to the anchor 358. The indexing feature 388 can include a size and/or shape that corresponds to the one or more recesses 366 such that the indexing feature 388 can be disposed in the one or more recesses 366. The indexing feature 388 can be various shapes, which can include polygonal (e.g., triangular), irregular and/or others. The indexing feature 388 can be a tooth. The indexing feature 388 can protrude in a distal direction. The indexing feature 388 can protrude distally from the distal-facing surface 371 of the connector 372 of the anchor 358. To rotationally lock the collar 368 and anchor 358, the collar 368 can be rotated to a desired rotational orientation that aligns the indexing feature 388 with one of the one or more recesses 366. With the indexing feature 388 aligned with one of the one or more recesses 366, the first mating feature 370 of the collar 368 can be distally advanced through the receiving region 362 of the second mating feature 360 of the anchor 358 until the indexing feature 388 is received by the recess 366 with which the indexing feature 388 is aligned, which can also include advancing until the second mating feature 360 contacts the distal-facing surface 371 of the connector 372 of the collar 368. The indexing feature 388 can interface with the recesses 366 to lock the rotational orientation of the collar 368 relative to the anchor 358 such that the docking feature 376 is at a position closer to or further from the teeth in a buccal direction.

As described in reference to other devices herein, the collar 368 can include a docking feature 376 (e.g., receiving feature, holder, pocket, cavity) that can hold (e.g., receive) the port 146. The docking feature 376 can include an annular structure 378. The annular structure 378 can include an opening 382 to receive the port 146. The opening 382 can be disposed at a proximal portion of the annular structure 378. The annular structure 378 can include an opening 384. The opening 384 can be disposed at a distal portion of the annular structure 378. The opening 384 can enable the conduit 116 to connect with the port 146 held by the docking feature 376. The annular structure 378 can include a gap 380. With the gap 380, the annular structure 378 can have a C shape when viewed from a proximal perspective. The gap 380 can be disposed at a buccal portion of the docking feature 376. The gap 380 can define a break in the annular structure 378. The gap 380 can facilitate flexing by the annular structure 378 to receive the port 146 with a push fit. The gap 380 can expose buccal surfaces of the port 146 and/or cap 148 with the port 146 received by the docking feature 376.

As illustrated in FIG. 17B, the anchor 358 can include an attachment feature 156. In some variants, the attachment feature 156 can include a bonding surface (e.g., textured surface, surface with recesses) to facilitate directly bonding the anchor 358 to a tooth of the patient 100. In some variants, the attachment feature 156 can include or be coupled to a band (e.g., molar band) that can be disposed around a tooth of the patient 100 to secure the anchor 358 to the tooth. The anchor 358 can include a connector 392, which can be described as a bridge and/or extension portion. The connector 392 can position the second mating feature 360 away from the attachment feature 156. For example, the connector 392 can extend away from the attachment feature 156 in the occlusal or gingival direction to position the second mating feature 360 away from the attachment feature 156 in the occlusal or gingival direction. In some variants, the connector 392 can position the second mating feature 360 away from the attachment feature 156 in a mesial or distal direction. The annular structure 378 of the docking feature 376 can include a cutout 390 (e.g., recess, gap, channel). The cutout 390 can be disposed at a lingual portion of the docking feature 376. The cutout 390 can receive at least a portion of the connector 392 of the anchor 358, which can decrease the size (e.g., profile) of the intraoral gastrointestinal access device 356 in a buccal-lingual direction to improve patient comfort.

In use, the anchor 358 can be secured within the mouth of the user, which can include bonding the attachment feature 156 to a tooth. The conduit 116 can be routed distally through the receiving region 362 of the second mating feature 360 and down the throat of the user to a gastrointestinal tract site. The collar 368 coupled (e.g., adhered) to the conduit 116 can be coupled to the anchor 358 at a desired rotational orientation. The first mating feature 370 of the collar 368 can be distally advanced into the receiving region 362 of the second mating feature 360 of the anchor 358, which can cause the locking feature 386 of the collar 368 to deflect from contact with the second mating feature 360. As the collar 368 is distally advanced relative to the anchor 358, the deflected locking feature 386 can slide along an outer surface of the second mating feature 360. The collar 368 can be rotated to align the indexing feature 388 with one of the recesses 366. The first mating feature 370 can be distally advanced through the receiving region 362 of the second mating feature 360 until the indexing feature 388 is received by the recess 366 with which the indexing feature 388 was aligned and/or the distal-facing surface 371 of the collar 368 contacts the second mating feature 360. With the indexing feature 388 received by the recess 366 with which the indexing feature 388 was aligned and/or the distal-facing surface 371 of the collar 368 contacting the second mating feature 360, the locking feature 386 of the collar 368 can be disposed in the channel 364 of the anchor 358. As described herein, the interface between the indexing feature 388 and the recess 366 can lock the relative rotational orientation between the collar 368 and the anchor 358. The positioning of the locking feature 386 in the channel 364 can restrict (e.g., prevent) relative movement between the collar 368 and the anchor 358 in a distal-proximal direction. The relative rotational orientation between the collar 368 and the anchor 358 can be adjusted by proximally pulling the collar 368 with enough force to cause the locking feature 386 to deflect outward from contact with the second mating feature 360 and out of the channel 364 to permit proximal retraction of the collar 368 with respect to the anchor 358 such that the indexing feature 388 is moved out of the recess 366. With the indexing feature 388 out of the recess 366, the collar 368 can be rotated to align the indexing feature 388 with a different recess 366. The locking feature 386 can slide along the outer surface of the second mating feature 360 as the collar 368 is rotated. With the indexing feature 388 aligned with a different recess 366, the first mating feature 370 of the collar 368 can be advanced distally through the receiving region 362 of the second mating feature 360 until the indexing feature 388 is received by the different recess 366 with which the indexing feature 388 was aligned and/or the distal-facing surface 371 of the collar 368 contacts the second mating feature 360. With the indexing feature 388 received by the different recess 366 with which the indexing feature 388 was aligned and/or the distal-facing surface 371 of the collar 368 contacting the second mating feature 360, the locking feature 386 of the collar 368 can be disposed in the channel 364 of the anchor 358. To decouple the collar 368 from the anchor 358, the collar 368 can be proximally pulled with enough force to cause the locking feature 386 to deflect outward from contact with the second mating feature 360 and out of the channel 364 to permit proximal retraction of the collar 368 with respect to the anchor 358, which can include the locking feature 386 sliding along an outer surface of the second mating feature 360 as the collar 368 is proximally retracted.

Similar to the other intraoral gastrointestinal access devices described herein, the port 146 can be received by the docking feature 376 for stowing in the mouth of the user. For example, the port 146 can be push fit in the docking feature 376, which can include being inserted through the opening 382 of the annular structure 378. The gap 380 of the annular structure 378 can enable the annular structure 378 to flex to receive the port 146. The conduit 116 can extend from the distal side of the port 146 through the opening 384 of the annular structure 378. To remove the port 146, the port 146 can be grasped and pulled proximally. The first loop 152 and/or second loop 154 of the conduit 116 can straighten to enable the port 146 to be removed from the user's mouth to administer substance while the collar 368 remains coupled to the anchor 358. The cap 148 can be removed and substance introduced into the conduit 116 by way of the port 146. As described herein, the port 146 can temporarily couple with a substance supply that flows substance into the conduit 116 by way of the port 146.

J. Intraoral Gastrointestinal Access Device—FIGS. 18A-18C

Figure 18A:
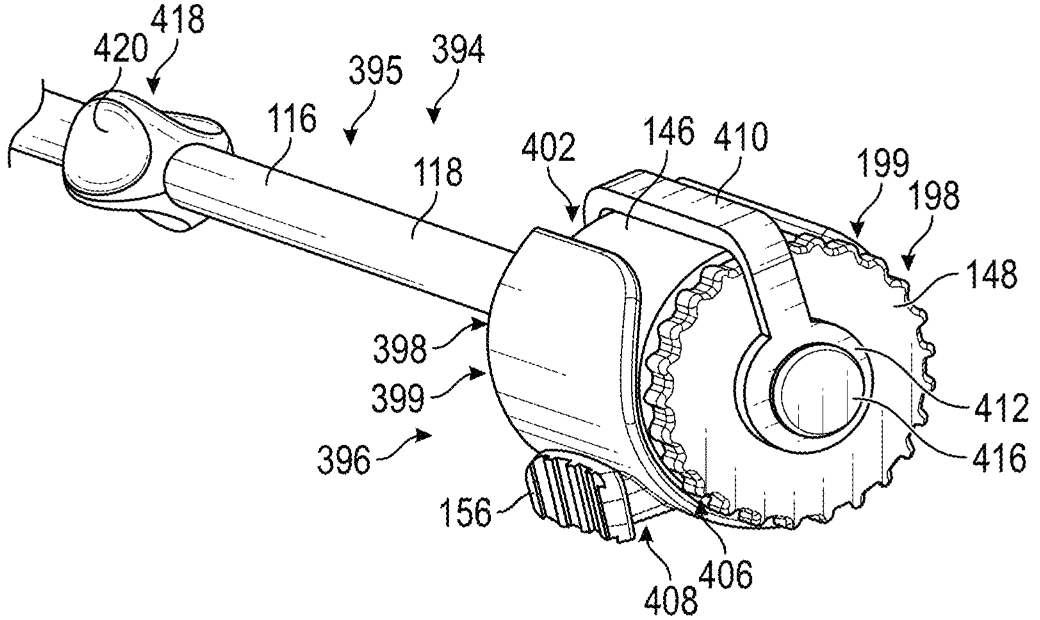
FIG. 18A illustrates another intraoral gastrointestinal access device in a stowed configuration.
Figure 18B:
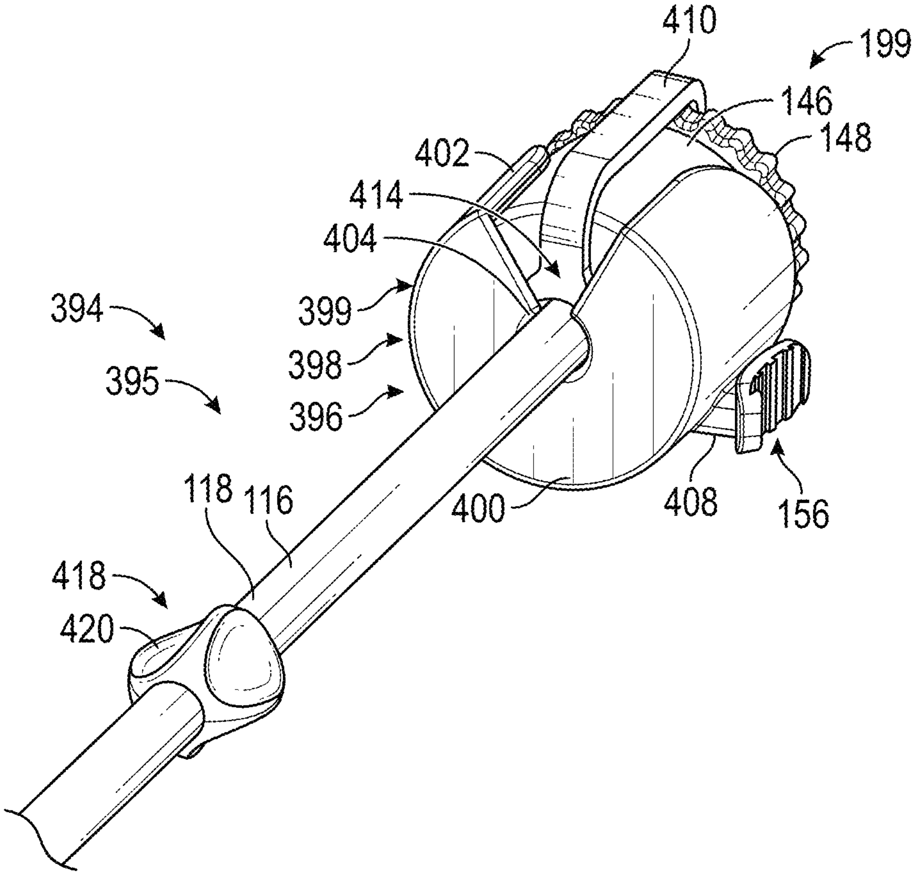
FIG. 18B illustrates another view of the intraoral gastrointestinal access device of FIG. 18A.
Figure 18C:
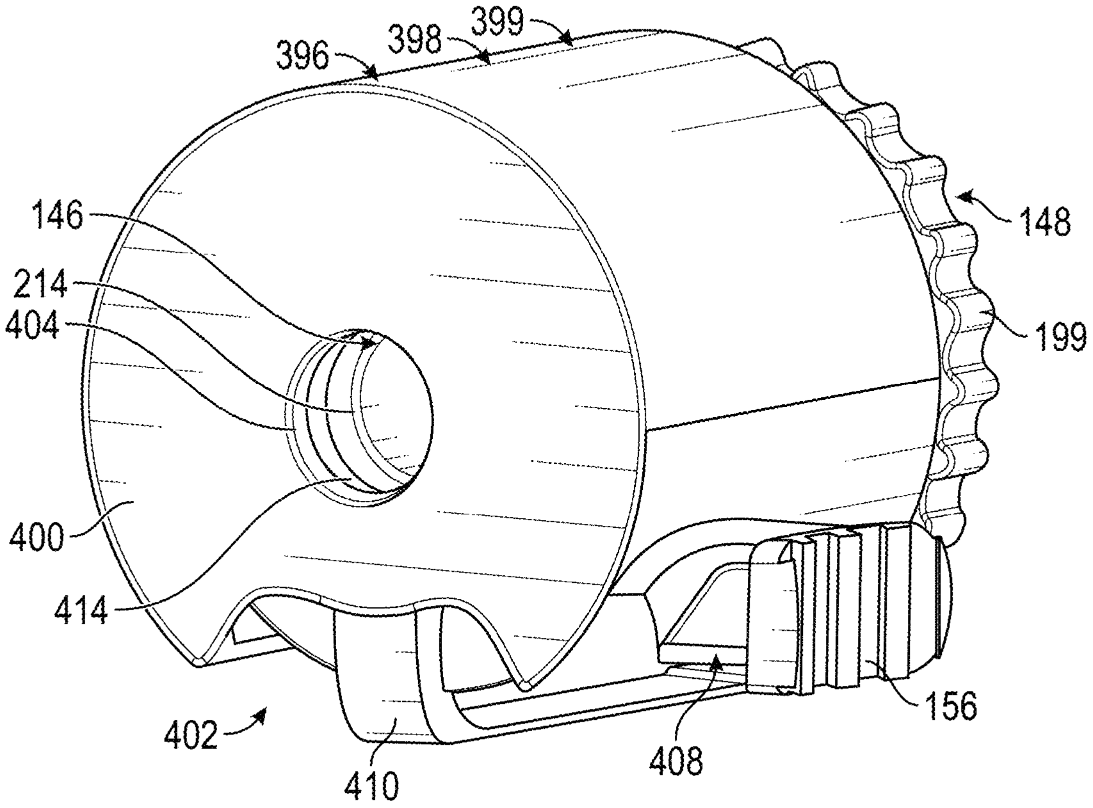
FIG. 18C illustrates the intraoral gastrointestinal access device of FIG. 18A with a modified gap.

FIGS. 18A-18C illustrate various views of an intraoral gastrointestinal access device 394 (e.g., gastrointestinal administration device) and components thereof. The intraoral gastrointestinal access device 394 can include any of the features described in reference to the other gastrointestinal administration devices described herein.

As illustrated in FIG. 18A, the intraoral gastrointestinal access device 356 can include an anchor 396 and a gastrointestinal administration device 395, which can at least include a conduit 116, port 146, and/or cap 148. In some variants, the intraoral gastrointestinal access device 356 can omit a collar.

The anchor 396 can be secured within the mouth 120 of the patient 100 using any of the techniques described herein (e.g., direct bonding to the tooth of the patient 100, band around tooth, retainer, etc.). The anchor 396 can include an attachment feature 156. In some variants, the attachment feature 156 can include a bonding surface (e.g., textured surface, surface with recesses) to facilitate directly bonding the anchor 396 to a tooth of the patient 100. In some variants, the attachment feature 156 can include or be coupled to a band (e.g., molar band) that can be disposed around a tooth of the patient 100 to secure the anchor 396 to the tooth. In some variants, the attachment feature 156 can be secured to the second molar of a patient.

The anchor 396 can include a docking feature 398 (e.g., receiving feature, holder, pocket, cavity) that can hold (e.g., receive) the port 146. The docking feature 398 can include an annular structure 399. The anchor 396 can include a connector 408, which can be described as a bridge and/or extension portion. The connector 408 can extend buccally from the attachment feature 156 to the docking feature 398. The connector 408 can space the docking feature 398 away from the attachment feature 156 and/or tooth. The connector

408 can, in some variants, be coupled with an occlusal portion of the annular structure 399.

The annular structure 399 can include an opening 406 to receive the port 146 into an interior of the annular structure 399, which can include the annular structure 399 being disposed about an outer periphery of the port 146. The opening 406 can be open in a proximal direction. The annular structure 399 can include a gap 402. The gap 402 can define a break in the annular structure 399, which can include defining a break that is 10-90 degrees or any value or range between the foregoing range. The gap 402 can extend a longitudinal length of the annular structure 399. The gap 402 can be disposed on a gingival portion of the docking feature 398. With the gap 402, the annular structure 399 can have a C shape when viewed from a proximal perspective. The gap 402 can facilitate flexing by the annular structure 399 to receive the port 146 with a push fit. The gap 402 can expose a gingival surface of the port 146 with the port 146 received by the docking feature 398. The annular structure 378 can include a distal wall 400 as illustrated in FIG. 18B. The distal wall 400 can impede distal advancement of the port 146 within the annular structure 399. The annular structure 378 can include an opening 404 in the distal wall 400 through which the conduit 116 can be routed to the port 146. In some variants, as illustrated in FIG. 18B, the gap 402 can extend to the opening 404. In some variants, the gap 402 can narrow as the gap 402 approaches the opening 404. The gap 402 can define a break in the distal wall 400, which can include defining a break that tapers smaller as the gap 402 approaches the opening 404. In some variants, the conduit 116 extending through the opening 404 can be removed by applying a force (e.g., a pull force) to move the conduit 116 (e.g., first portion 118) out of the opening 404 through the gap 402. The width of the portion of the gap 402 adjacent the opening 404 can be smaller than the outer diameter of the conduit 116, which can prevent the conduit 116 from being moved out of the opening 404 through the gap 402 unintentionally but facilitate the removal of the conduit 116 when sufficient directional force is applied. With sufficient force in the direction of the gap 402, the conduit 116 can be moved out of the opening 404 through the narrowed portion of the gap 402 adjacent the opening 404 with deflection of the conduit 116 to a reduced width. This can enable the conduit 116 to be retracted proximally out of the patient. Similarly, the conduit 116 can be placed in the opening 404 by moving the conduit 116 through the gap 402 toward the opening 404 and applying a force to the conduit 116 in the direction of the opening 404 to squeeze (e.g., deflect to narrowed width) the conduit 116 through the narrowed portion of the gap 402 adjacent the opening 404.

The conduit 116 can include a stop 418 (e.g., scalloped stop, enlarged portion, bulge, radial protrusion). The stop 418 can be formed as part of the conduit 116 or fixed (e.g., adhered) thereto. The stop 418 can include a size (e.g., width, diameter) that is larger than that of the opening 404, which can impede the stop 418 from passing unintentionally through the opening 404. The stop 418 can impede the conduit 116 being pulled beyond the stop 418 when the user removes the port 146 from the mouth to administer substance therethrough. The stop 418 can include one or more recesses 420 (e.g., cutouts, areas of a reduced diameter size). The one or more recesses 420 can reduce the diameter of the stop 418 at various locations. The one or more recesses 420 can enable the stop 418 to deflect, when sufficient force is applied, to reduce the size (e.g., width) of the stop 418 to permit passage through the opening 404. For example, the port 146 coupled to the conduit 116 can be pulled proximally with sufficient force such that contact between the stop 418 and the periphery of the distal wall 400 defining the opening 404 deflects the stop 418 to permit passage through the opening 404, which can permit the conduit 116 to be retracted proximally through the opening 404.

The cap 148, as described herein, can cover a proximal-facing opening of the port 146 through which substance can be introduced into the conduit 116 for administration. The cap 148 can couple to the port 146 with a push fit and/or a threaded connection. The cap 148 can include a flange 198 that covers the proximal-facing opening of the port 146. The outer periphery of the cap 148 (e.g., flange 198) can include one or more gripping features 199 (e.g., ridges, bumps) to facilitate gripping the cap 148.

The gastrointestinal administration device 395 can include a tether 410 to retain the cap 148. The tether 410 can tether the cap 148 to conduit 116. For example, the tether 410 can include a distal attachment portion 414 (e.g., loop) that can be coupled to the conduit 116, which can include being disposed around the conduit 116. The tether 410 can include a proximal attachment portion 412 (e.g., loop) that can be coupled to the cap 148, which can include being disposed around a protrusion 416 protruding proximally from the cap 148. The protrusion 416 can include a portion with a reduced diameter and another portion with an enlarged diameter. The proximal attachment portion 412 can be disposed around the portion with the reduced diameter and the portion with the enlarged diameter can retain the proximal attachment portion 412 on the protrusion 416. The tether 410 can prevent the cap 148 from falling when the cap 148 is decoupled from the port 146.

In use, the anchor 396 can be secured within the mouth of the user, which can include being bonded to a tooth. The conduit 116 can be advanced distally down the throat of the patient until the distal portion of the conduit 116 is at or proximate a gastrointestinal site. The first portion 118 of the conduit 116 can be disposed in the gap 402 of the annular structure 399 and advanced toward the opening 404. A force can be applied to the first portion 118 in the direction of the opening 404, which can include applying a force to the port 146 that is coupled to the conduit 116, to squeeze the first portion 118 through the narrowed portion of the gap 402 and into the opening 404. The port 146 can be push fit into the annular structure 399 through the opening 406. To remove the port 146 from the docking feature 398, the port 146 and/or the cap 148 can be grasped and pulled proximally until out of the docking feature 398. The stop 418 can contact the periphery of the opening 404 to prevent further proximal movement of the conduit 116. With the proximal pulling of the port 146 and conduit 116, the distal portion of the conduit 116 can move proximally as well. The port 146 can then be removed from the mouth of the patient to receive substance from a substance source. For example, the port 146 can be coupled to a substance supply device to receive substance that flows through the port 146 and into the conduit 116 for delivery to a gastrointestinal tract site.

As illustrated in FIG. 18C, the gap 402, in some variants, can be disposed on an occlusal portion of the annular structure 399, which can help drain the annular structure 399. The gap 402, in some variants, may not extend to the opening 404. The gap 402 may, in some variants, extend partially through the distal wall 400. With the gap 402 not connected to the opening 404, the conduit 116 may not be removed from the opening 404 by way of the gap 402. Instead, the conduit 116 can be removed through the opening 404. The stop 418, as described herein, can impede the conduit 116 being inadvertently removed proximally through the opening 404 past the stop 418. However, as described herein, the stop 418 can be deflected to a smaller size (e.g., smaller diameter) from contact with the periphery of the opening 404 with the application of a sufficient proximal force on the conduit 116, which can facilitate the stop 418 squeezing through the opening 404 to permit the conduit 116 to be removed through the opening 404.

K. Intraoral Gastrointestinal Access Device—FIGS. 19A-22B

FIGS. 19A-22B illustrate various views of an intraoral gastrointestinal access device 422 (e.g., gastrointestinal administration device) and components thereof. The intraoral gastrointestinal access device 422 can include any of the features described in reference to the other gastrointestinal administration devices described herein.

Figure 19A:
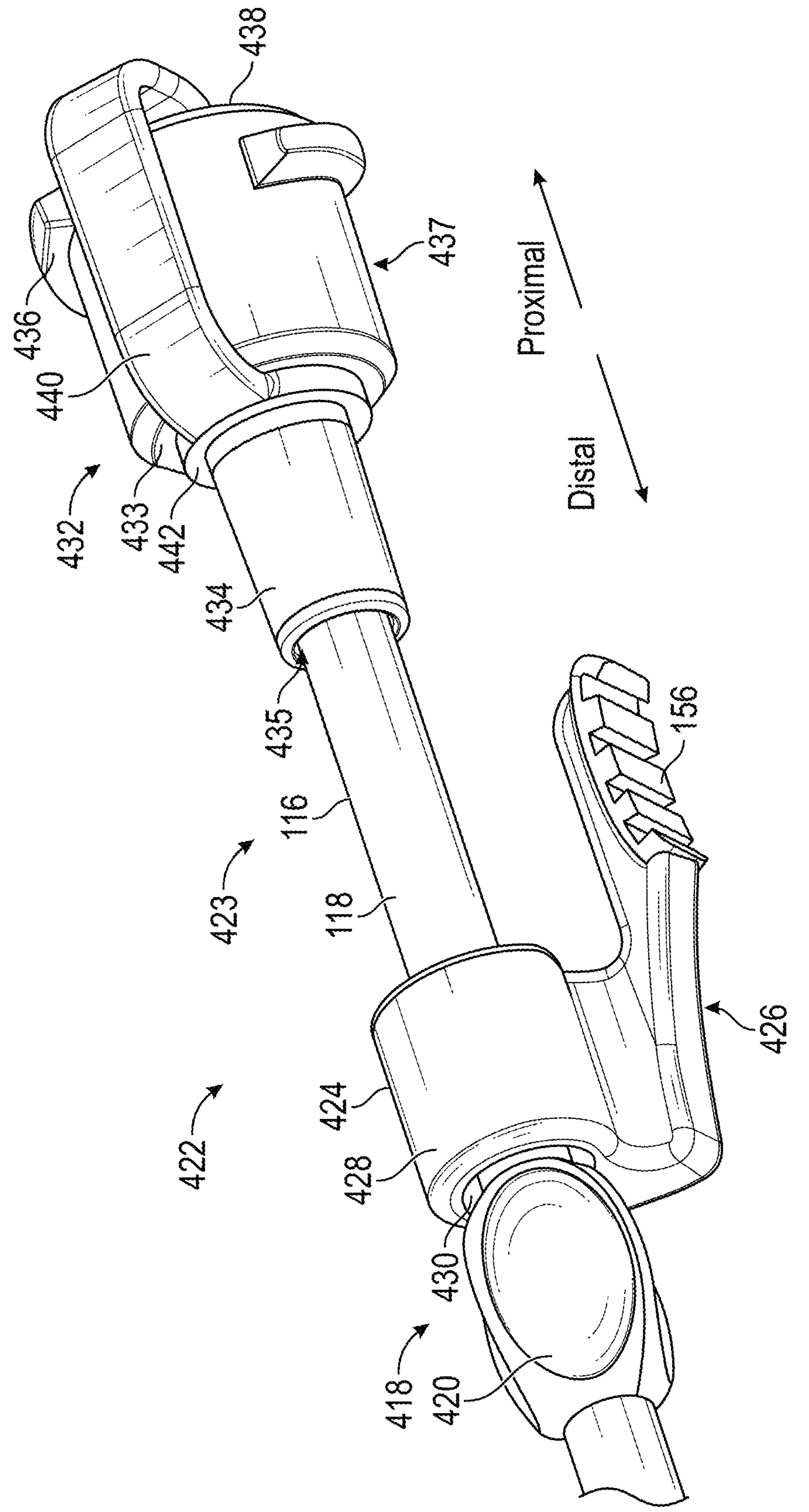
FIG. 19A illustrates another intraoral gastrointestinal access device in a stowed configuration.

As illustrated in FIG. 19A, the intraoral gastrointestinal access device 422 can include an anchor 424 and a gastrointestinal administration device 423, which can at least include a conduit 116, port 432, and/or cap 438. In some variants, the intraoral gastrointestinal access device 356 can omit a collar.

The port 432 (e.g., connector, interface, valve, opening, luer, needleless access connector type valve, therapeutic loading site) can be disposed on (e.g., adhered, bonded) to the first portion 118 (e.g., proximal end of the first portion 118) of the conduit 116. The port 432 can receive and direct substance into the conduit 116. The port 432 can interface (e.g., couple, engage, interlock), directly or indirectly, with a substance supply device with a reservoir (e.g., bottle, squeeze bottle, container, syringe, pouch, bag) that can hold substance to be delivered to the gastrointestinal tract site. In contrast to the port 146, the port 432 can include external threads 436 which can facilitate coupling, directly or indirectly, with a threaded connection to the substance supply device. The external threads 436 can be disposed on a main body 437 of the port 432. The port 432 can be sized and configured to be ENFit compatible. The port 432 can be a female ENFit connector. The port 432 can include features of a female ENFit connector. The port 432 can include features to couple with a male ENFit connector and/or device including features of a male ENFit connector. In some variants, substance delivery devices may include female ENFit connectors or features of a female ENFit connector such that the port 432 may not directly couple with the substance delivery device (i.e., female to female ENFit style connectors). At least in those instances, the port 432 can be coupled to the substance supply device with an adapter that includes a first male ENFit style connector (e.g., same as or similar to port 146) to connect with the port 432, a second male ENFit style connector (e.g., same as or similar to port 146) to connect with the substance supply device, and a conduit coupling the first and second male ENFit style connectors. In some variants, the substance supply device can include a male ENFit style connector or adapter connected thereto such that the port 432 can connect. The port 432 can be threaded into a male ENFit connector or male ENFit style connector, which can at least be the same as or similar to the port 146. The port 432 can include a size that is smaller than that of the port 146 which can occupy less volume in the mouth of the patient, which can improve user comfort. For example, the port 432 can include an outer periphery (e.g., outer diameter) that is smaller than that of the port 146.

The port 432 can include a first mating feature 434 (e.g., tubular structure, tube). The first mating feature 434 can protrude distally from a main body 437 of the port 432. The first mating feature 434 can protrude distally from a distal-facing surface 433 of the port 432. The distal-facing surface 433 can, in some variants, be flat. In some variants, the size (e.g., diameter) of the outer periphery of the first mating feature 434 can taper in a proximal-distal direction with the proximal outer periphery being larger than the distal outer periphery. The first mating feature 434 can include a hole 435 (e.g., lumen). The first portion 118 of the conduit 116 can be disposed (e.g., adhered) in the hole 435. The first mating feature 434 can have a reduced size (e.g., diameter, outer periphery) compared to the main body 437 of the port 432.

The cap 438 can block a proximal opening of the port 432. In some variants, the cap 438 can be push fit into the proximal opening of the port 432. In some variants, the cap 438 can be threaded into the proximal opening of the port 432. The cap 438 can be coupled to one or more features of the intraoral gastrointestinal access device 422, which can prevent the cap 438 from falling when removed from the proximal opening of the port 432. For example, the cap 438 can include a tether 440 to couple to the one or more features of the intraoral gastrointestinal access device 422 (e.g., port 432, conduit 116, and/or anchor 424). The tether 440 can include a distal attachment portion 442 (e.g., loop). The distal attachment portion 442 can, in some variants, be coupled to (e.g., disposed around) the first mating feature 434. The distal attachment portion 442 can be disposed proximate (e.g., against) the distal-facing surface 433. The distal attachment portion 442 can be disposed between the distal-facing surface 433 of the port 432 and the anchor 424 with the first mating feature 434 advanced through a region 430 (e.g., hole, lumen) of the anchor 424. The cap 438, which can include the tether 440 and distal attachment portion 442, can be made of a polymer. To attach the distal attachment portion 442 to the port 432, the distal attachment portion 442 can be moved proximally along the first mating feature 434. The distal attachment portion 442 can stretch as the intraoral gastrointestinal access device 422 is moved proximally along the first mating feature 434 due to the tapered profile of the first mating feature 434, which can help secure the distal attachment portion 442 in position on the first mating feature 434.

The anchor 424 can be secured within the mouth 120 of the patient 100 using any of the techniques described herein (e.g., direct bonding to the tooth of the patient 100, band around tooth, retainer, etc.). The anchor 424 can include an attachment feature 156. In some variants, the attachment feature 156 can include a bonding surface (e.g., textured surface, surface with recesses) to facilitate directly bonding the anchor 424 to a tooth of the patient 100. In some variants, the attachment feature 156 can include or be coupled to a band (e.g., molar band) that can be disposed around a tooth of the patient 100 to secure the anchor 424 to the tooth.

The anchor 424 can be coupled to the port 432, which can include being coupled to the port 432 without a separate collar component. The anchor 424 can include a second mating feature 428 (e.g., docking feature, holder, receiver, tubular structure, tube, annular structure). The second mating feature 428 can be used to couple the port 432 to the anchor 424. The second mating feature 428 can be sized and configured to couple with (e.g., receive) the first mating feature 434 of the port 432. The second mating feature 428 can include a region 430 (e.g., hole, lumen). The region 430 can receive the first mating feature 434 of the port 432 to facilitate coupling. In some variants, the inner periphery (e.g., inner diameter) of the region 430 can be constant. In some variants, the inner periphery of the region 430 can be tapered. The second mating feature 428 can receive the first mating feature 434, as opposed to the main body 437 of the port 432, which can enable the anchor 424 (e.g., second mating feature 428) to be smaller in size to occupy less space in a patient's mouth and improve comfort. The first mating feature 434 can be advanced distally through the region 430 of the second mating feature 428 to couple the port 432 to the anchor 424. The tapered profile of the first mating feature 434 can facilitate push fitting the first mating feature 434 in the region 430 of the second mating feature 428. The first mating feature 434 can be removed from the region 430 of the second mating feature 428 by pulling on the port 432 in a proximal direction with sufficient force.

The anchor 424 can include a connector 426 (e.g., bridge, extension member). The connector 426 can connect the second mating feature 428 and the attachment feature 156. The connector 426 can space the second mating feature 428 away from the attachment feature 156 (e.g., tooth to which the attachment feature 156 is attached) in a buccal direction. The connector 426 can space the second mating feature 428 away from the attachment feature 156 in a distal or mesial direction. For example, in some variants, the attachment feature 156 can be attached to a first tooth and the connector 426 can position the second mating feature 428 proximate (e.g., buccal of) a second tooth (e.g., tooth adjacent the first tooth in the distal or mesial direction). In some variants, the attachment feature 156 can be coupled to the first molar of the patient and the connector 426 can position the second mating feature 428 proximate (e.g., buccal of) the second molar.

The conduit 116 can be routed through the region 430 of the second mating feature 428. The conduit 116 (e.g., first portion 118) can include the stop 418 as described herein. The stop 418 can impede the conduit 116 being pulled proximally out of the mouth of the patient past the stop 418. For example, the stop 418 can include an outer periphery (e.g., diameter) that is larger than the periphery of the region 430 which can impede proximal retraction through the region 430. However, with sufficient proximal force, the outer portions of the stop 418 can deflect inward from contact with the periphery of the region 430 to permit the stop 418 to be pulled through the region 430.

In use, the anchor 424 can be secured within the mouth of the patient. The distal attachment portion 442 of the cap 438 can be disposed on the first mating feature 434 of the port 432. The distal attachment portion 442 can be moved proximally along the first mating feature 434 until proximate (e.g., contacting) the distal-facing surface 433 of the port 432. The cap 438 can be positioned to cover the proximal opening of the port 432. The first portion 118 of the conduit 116 can be disposed in (e.g., press fit, push fit) and/or adhered within the hole 435 of the first mating feature 434 of the port 432. The conduit 116 can be distally advanced through the region 430 of the anchor 424 and down the throat of the patient. A distally-directed force can be applied to the conduit 116 to pull the stop 418 through the region 430. The first mating feature 434 can be distally advanced into the region 430 of the anchor 424 to secure the port 432 to the anchor 424. The port 432 can be grasped and pulled proximally to outside the mouth. The cap 438 can be moved from covering the proximal opening of the port 432. The port 432 can be coupled (e.g., by way of a threaded connection) directly or indirectly through an adapter to a substance supply device. Substance can flow from the substance supply device through the port 432 and into the conduit 116 for delivery to a gastrointestinal tract site. When substance delivery is finished, the cap 438 can be positioned to cover the proximal opening of the port 432 and the port 432 can be recoupled to the anchor 424 in the mouth of the patient. To remove the gastrointestinal administration device 423, the port 432 can be grasped and pulled proximally with sufficient force to decouple from the second mating feature 428 and pull the stop 418 through the region 430 of the second mating feature 428.

Figure 19B:
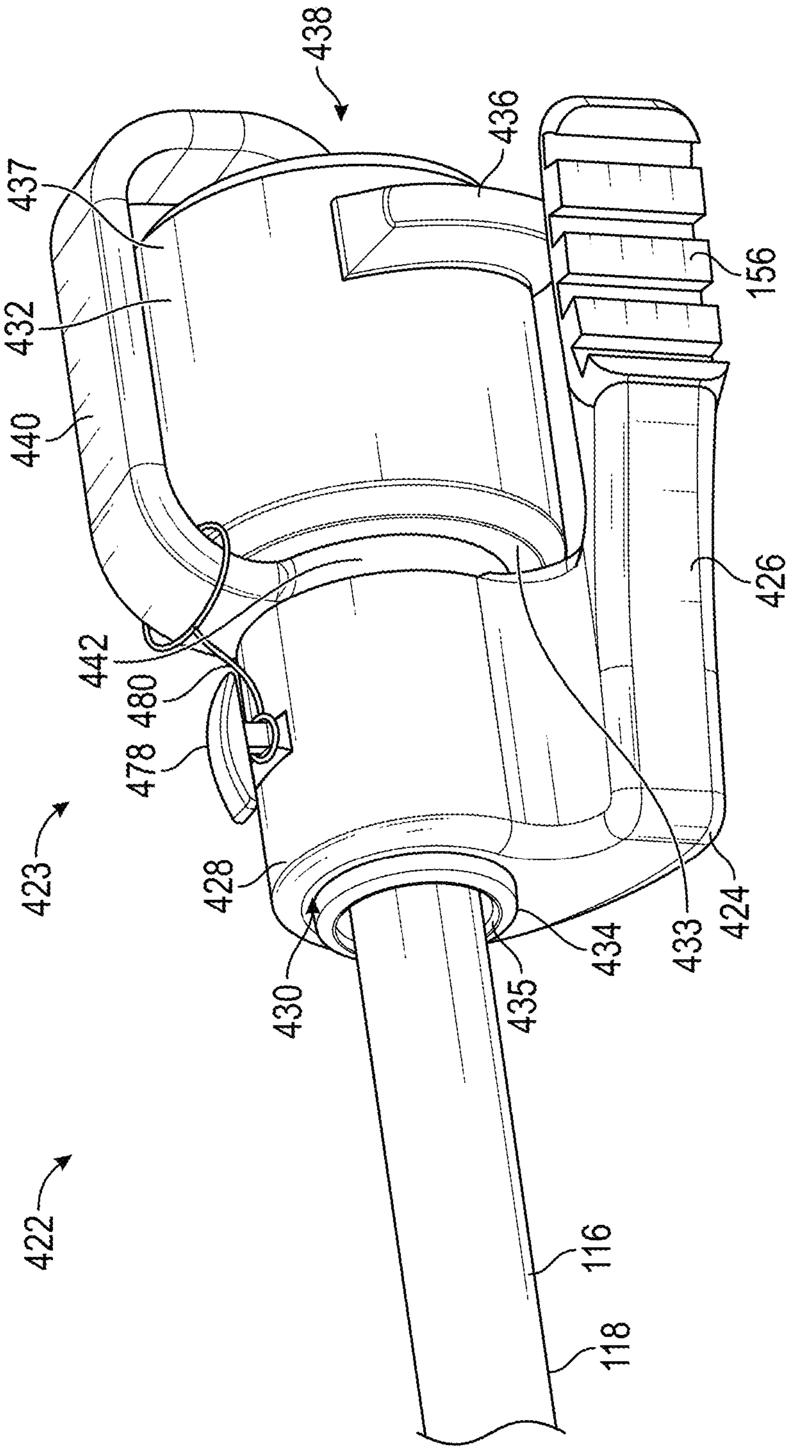
FIG. 19B illustrates the intraoral gastrointestinal access device of FIG. 19A in the stowed configuration, wherein the anchor includes an attachment portion for coupling a tether.

As illustrated in FIG. 19B, the intraoral gastrointestinal access device 422 can, in some variants, include a tether 480. The tether 480 can be used in addition to or in the alternative of the stop 418. The tether 480 can couple the anchor 424 to the port 432, cap 438 (e.g., tether 440 and/or distal attachment portion 442), and/or conduit 116. The anchor 424 can include an attachment portion 478 (e.g., cleat, hook, protrusion, T-shaped protrusion) to which one side of the tether 480 can couple. The other side of the tether 480 can be coupled to the port 432, cap 438 (e.g., tether 440, distal attachment portion 442), and/or conduit 116. The tether 480 can impede the port 432 and/or conduit 116 from being moved away from the anchor 424 beyond a length of the tether 480, which can prevent the conduit 116 from being pulled proximally out of the throat of the patient. The tether 480 can be decoupled from the attachment portion 478 to remove the conduit 116 from the patient.

Figure 19C:
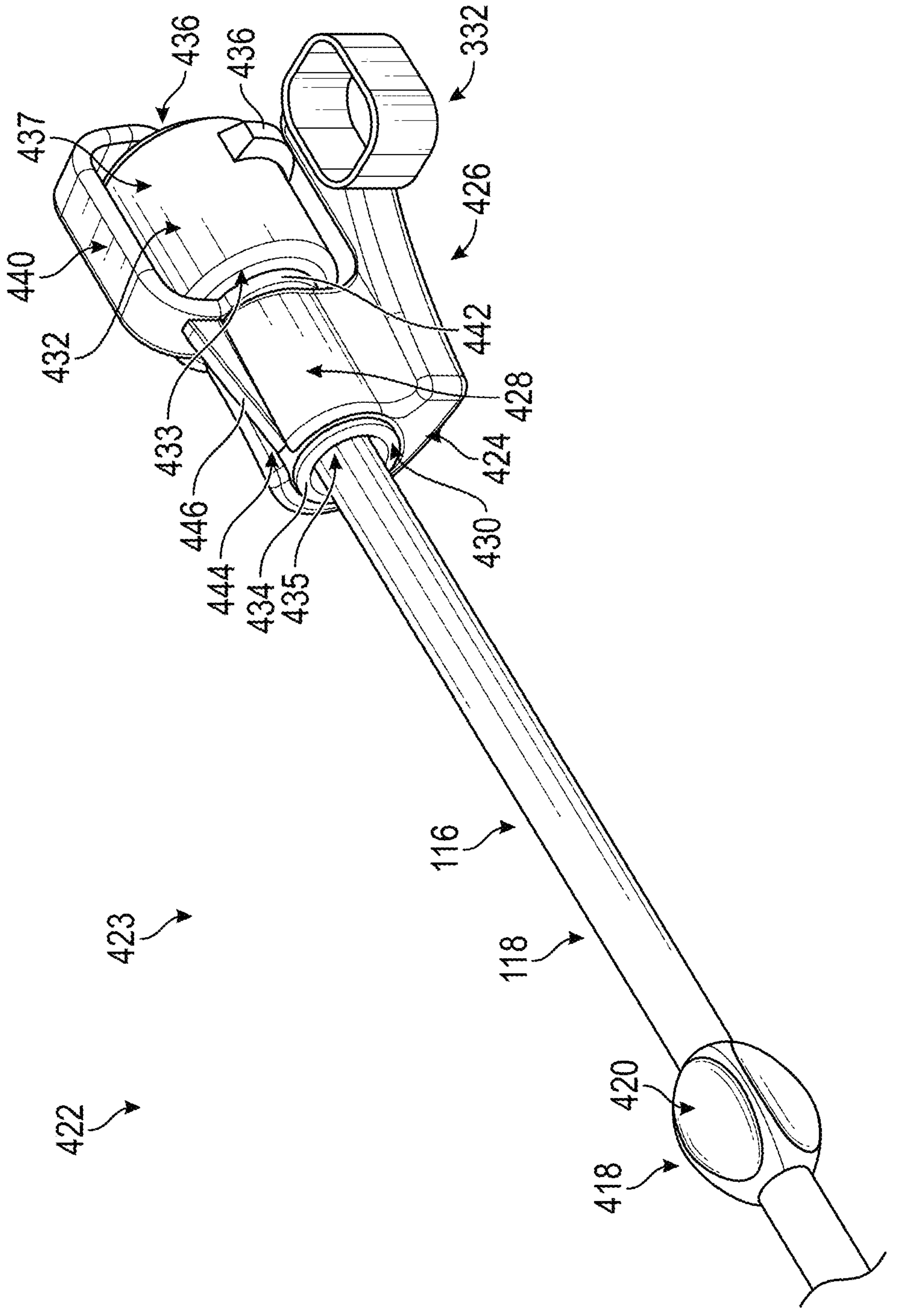
FIG. 19C illustrates the intraoral gastrointestinal access device of FIG. 19A in the stowed configuration, wherein the port includes a flange that is received by a slot of the anchor.

As illustrated in FIG. 19C, the first mating feature 434 can, in some variants, include a feature to facilitate handling (e.g., rotating, grasping) the port 432. For example, the first mating feature 434 can include a flange 446 (e.g., fin, protrusion). The flange 446 can project radially outward from the first mating feature 434. The flange 446 can extend along a length of the first mating feature 434. The flange 446 can be distally spaced from the distal-facing surface 433 of the main body 437 of the port 432 to provide space for the distal attachment portion 442 of the cap 438. The distal attachment portion 442 can be disposed between the main body 437 (e.g., distal-facing surface 433) and the flange 446. The flange 446 can be tapered in a proximal-distal direction. The size of the flange 446 can increase in the proximal direction. The proximal portion of the flange 446 can extend radially outward further than the distal portion of the flange 446. For example, the distal end of the flange 446 can extend radially outward a first distance from the outer surface of the first mating feature 434 and gradually extend more radially outward to the proximal end of the flange 446 such that the proximal end projects radially outward further than the distal end. The periphery of the flange 446 can be in the shape of a right triangle. The tapered shape of the flange 446 can facilitate placement of the distal attachment portion 442. For example, the distal attachment portion 442 can be disposed over the distal portion of the first mating feature 434 and flange 446 with relative ease then proximally retracted over the first mating feature 434 and flange 446 to gradually stretch the distal attachment portion 442. The distal attachment portion 442 can be proximally pulled until proximal of the flange 446. With the distal attachment portion 442 proximal of the flange 446, the distal attachment portion 442 can spring (e.g., snap) to the periphery of the first mating feature 434 between the flange 446 and main body 437 (e.g., distal-facing surface 433) of the port 432. The positioning of the distal attachment portion 442 between the flange 446 and the main body 437 can secure the distal attachment portion 442.

As illustrated in FIG. 19C, the second mating feature 428 can include a slot 444 (e.g., gap, break). The slot 444 can define a break in the wall of the tubular structure of the second mating feature 428. The slot 444 can receive the flange 446 with the first mating feature 434 disposed in the region 430 of the second mating feature 428. The placement of the flange 446 in the slot 444 can impede rotation of the port 432 relative to the anchor 424. The slot 444 can be tapered. The width (e.g., circumferential direction) of the slot 444 can narrow in the distal direction. For example, the proximal portion of the slot 444 can be wider than the distal portion of the slot 444. In some variants, the width (e.g., circumferential direction) of the flange 446 can be tapered, which can include a proximal portion of the flange 446 being wider than the distal portion of the flange 446. The flange 446 can, in some variants, be wedged in the slot 444 as the port 432 is distally advanced. The conduit 116 can be removed from the region 430 of the second mating feature 428 of the anchor 424 by way of the slot 444. For example, a force (e.g., pull and/or push force) can be applied to the conduit 116 in the direction of slot 444 which can cause the conduit 116 to flex from contact with the sides of the slot 144 to permit the conduit 116 to be squeezed through the slot 444. The diameter of the conduit 116 can be larger than the width of the slot 444 which can impede inadvertent passage of the conduit 116 through the slot 444. The slot 444 can be positioned at an upper portion of the second mating feature 428 (e.g., the slot 444 can be disposed at about the 12 o'clock position). The slot 444 can be open in an upward direction, which can help avoid accidental passage of the conduit 116 and/or stop 418 through the slot 444. For example, a user may accidentally drop a substance supply device (e.g., pouch, feeding pouch) coupled to the port 432, but with the slot 444 open in an upward direction, the likelihood that the conduit 116 and/or stop 418 will inadvertently squeeze through the slot 444 to allow the conduit 116 to be inadvertently pulled out of the user from the force of the falling substance supply device is low. If the slot 444 were open downward, the likelihood that the conduit 116 and/or stop 418 would inadvertently squeeze through the slot 444 from a falling substance supply device coupled to the port 432 may be higher. In some variants, the slot 444 can have a consistent width. In some variants, the slot 444 can permit flexing of the second mating feature 428 to facilitate a push fit coupling of the first mating feature 434 and the second mating feature 428.

Figure 20A:
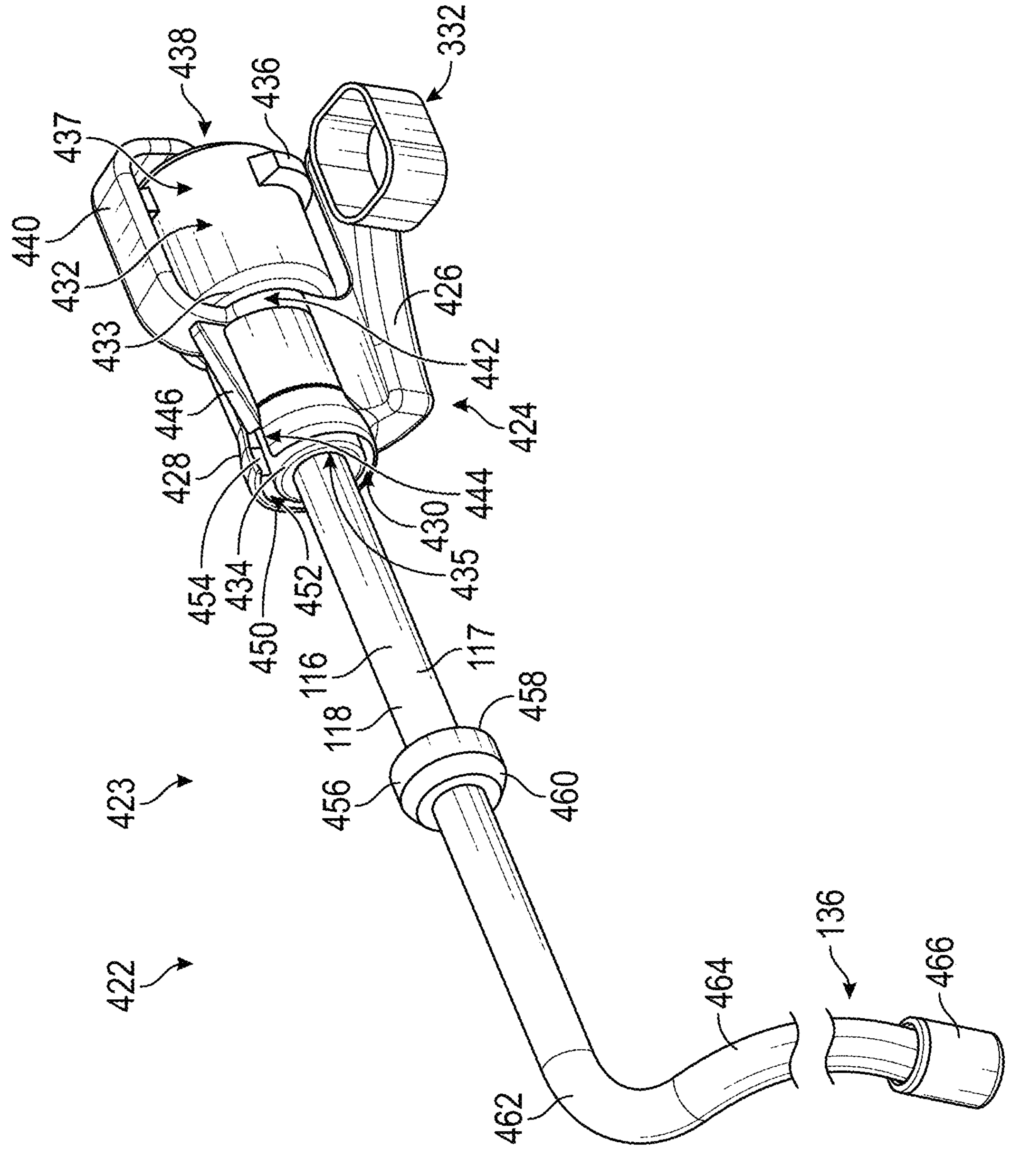
FIG. 20A illustrates the intraoral gastrointestinal access device of FIG. 19C in the stowed configuration, wherein the conduit includes a protective coating, a distal stop, and a distal cap.

As illustrated in FIG. 20A, a sleeve 117 (e.g., protective sleeve) can be disposed over at least a portion of the conduit 116 (e.g., first portion 118). The sleeve 17 can protect the conduit 116 from the teeth of the patient, which can include preventing biting from damaging (e.g., perforating) the conduit 116. The conduit 116 (e.g., portions of the conduit 116) can include a coating with characteristics to ease sliding down the esophagus and/or throat of the patient. For example, the coating can reduce friction (e.g., make the conduit 116 more slippery) to ease sliding down the esophagus and/or throat to increase patient comfort. Peristaltic forces during digestion can pull the conduit 116 distally down the throat, which can create discomfort in the esophagus. The coating on the conduit 116 can reduce the discomfort caused by peristaltic forces pulling on the conduit 116.

The conduit 116 can be shape set to improve positioning in the mouth, esophagus, and/or throat of the patient for comfort. For example, the shape set can return the conduit 116 to a more comfortable position in the patient's mouth, esophagus, and/or throat after peristaltic forces diminish. The conduit 116 can be shape set to reduce (e.g., avoid) contact with the walls of the esophagus and/or throat. The conduit 116 can be shape set to include a curve 462 and/or curve 464. The curve 462 can direct the conduit 116 from the mouth to an opening into the throat of the patient, which can include centering the conduit 116 relative to the walls of the throat. The curve 464 can direct the conduit 116 down the throat.

Figure 20B:
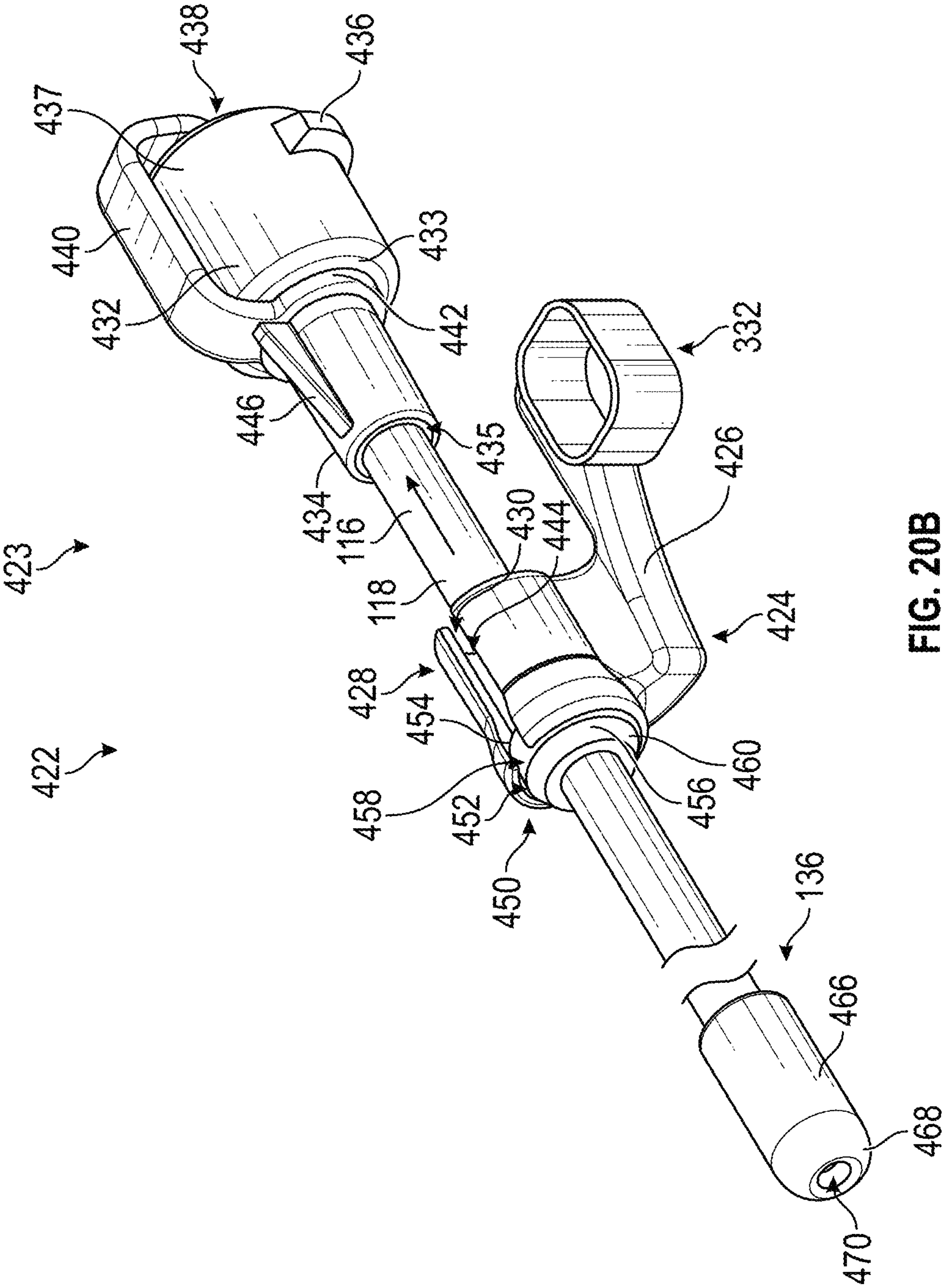
FIG. 20B illustrates the intraoral gastrointestinal access device of FIG. 20A in a deployed configuration, wherein the distal stop is received by a distal recess of the anchor.

The conduit 116 can include a distal stop 456 (e.g., enlarged portion, radially enlarged portion, radial protrusion). The distal stop 456 can include a larger radius than the conduit 116. The distal stop 456 can include an annular shape. The distal stop 456 can be adhered to the conduit 116. In some variants, the distal stop 456 can be integrally formed with the conduit 116. The distal stop 456 can include a distal chamfer 460 (e.g., angled surface) which can reduce catching on anatomy. In some variants, the distal chamfer 460 can be a rounded surface. The distal stop 456 can include a proximal-facing surface 458, which can be flat (e.g., perpendicular relative to outer surface of conduit 116). The distal stop 456, similar to the stop 418, can impede the first portion 118 from being proximally retracted past the anchor 424. The distal stop 456 can contact the anchor 424 to impede further proximal retraction. The anchor 424 can include features to receive the distal stop 456. For example, the second mating feature 428 can include a recess 452 (e.g., circular recess, annular recess) to receive the distal stop 456. The recess 452 can be disposed about the longitudinal axis of the region 430 of the second mating feature 428. The recess 452 can be disposed in an enlarged distal portion 450 (e.g., flared distal portion) of the second mating feature 428. The recess 452 can include a distal-facing surface 454 that can contact the proximal-facing surface 458 of the distal stop 456 to impede further proximal retraction, as illustrated in FIG. 20B, with the distal stop 456 received within the recess 452. To remove the conduit 116 from the anchor 424, the conduit 116 can be distally advanced to move the distal stop 456 distally out of the recess 452. With the distal stop 456 removed from the recess 452, the conduit 116 can be moved through the slot 444 as described herein. The distal stop 456 can be sized and/or shaped to never squeeze through the slot 444. Instead, squeezing the conduit 116, as opposed to the distal stop 456, through the slot 444 can be the method for removing the conduit 116 from the anchor 424 and the user. Accordingly, the slot 444 can be open in any direction, which can include downward (e.g., 6 o'clock), because the distal stop 456 can prevent inadvertent removal of the conduit 116 from a falling substance supply device coupled to the port 432. For example, the conduit 116 might partially squeeze through the slot 444 due to a falling substance supply device coupled to the port 432 but the distal stop 456, with its shape and/or size, may not squeeze through the slot 444, which can prevent the conduit 116 from being inadvertently removed from the anchor 424 and pulled out of the user. To pull the conduit 116 out, the user can intentionally apply a force on the conduit 116, which can include applying a force on the port 432 coupled to the conduit 116, in the direction of the slot 444 to squeeze the conduit 116 through the slot 444. In some variants, the force applied by a falling substance supply device can be insufficient to squeeze the conduit 116 through the slot 444.

The second portion 136 of the conduit 116 can include a distal cap 466 (e.g., comfort tip, distal tip, comfort cap). The distal cap 466 can include an atraumatic end portion 468. The atraumatic end portion 468 can be rounded, chamfered, angled, and/or include other features to avoid irritating and/or damaging anatomy of the patient. For example, the atraumatic end portion 468 can include a rounded end. The atraumatic end portion 468 can include an opening 470 through which substance flowing distally through the conduit 116 can exit. The periphery of the opening 470 can be rounded. The end of the second portion 136 of the conduit 116 can be press fit or push fit into the distal cap 466. The end of the second portion 136 of the conduit 116 can be adhered to the inside of the distal cap 466. Prior to insertion of the conduit 116, the length of the conduit 116 for a specific patient can be measured outside the body and cut to the correct length to target a gastrointestinal tract site. The cut end of the conduit 116 can be sharp, which can be uncomfortable during insertion down the throat of the patient. The distal cap 466 can be disposed over the sharp end of the conduit 116 to improve comfort. The inside of the distal cap 466 can include a liquid activated adhesive to facilitate adhering to the conduit 116.

Figure 20C:
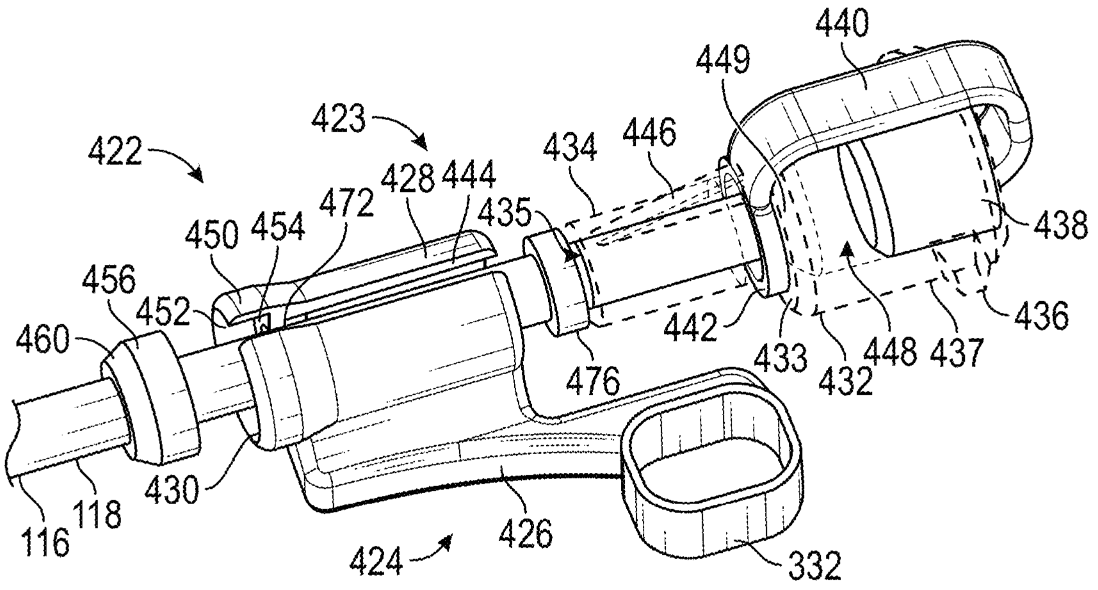
FIG. 20C illustrates the intraoral gastrointestinal access device of FIG. 20A in a deployed configuration, wherein the conduit includes a proximal stop.

As illustrated in FIG. 20C, the cap 438 can be disposed in the proximal opening 448 (e.g., hole, cavity) of the port 432. The cap 438, in some variants, can be push fit in the proximal opening 448. The proximal opening 448 can be coaxial with the hole 435 of the first mating feature 434. A tapered portion 449 can be disposed at the transition between the proximal opening 448 and the hole 435. The proximal opening 448 can be larger in diameter than the hole 435. The tapered portion 449 can funnel substance received within the proximal opening 448 to flow into the conduit 116 disposed in the hole 435 of the first mating feature 434. The tapered portion 449 can extend radially inward from the proximal opening 448 to the proximal opening of the conduit 116 disposed in the hole 435 of the first mating feature 434. The proximal opening 448 can include an anti-microbial coating (e.g., silver nitrate). If the conduit 116 is placed in the duodenum or jejunum or if the patient is taking antacids, the lack of stomach acids to kill microbes present in the intraoral gastrointestinal access device 422 may lead to gastrointestinal complications; the inclusion of an anti-microbial coating in the proximal opening 448 can combat that the risk of gastrointestinal complications resulting from microbes.

Figure 20D:
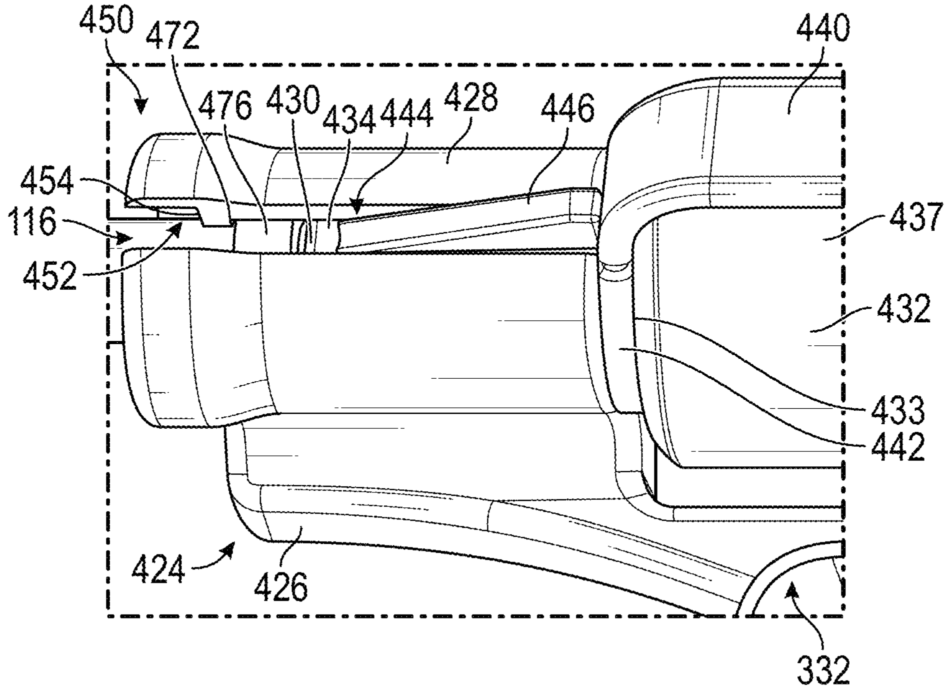
FIG. 20D illustrates the intraoral gastrointestinal access device of FIG. 20C in a stowed configuration.

The conduit 116 can include a proximal stop 476 (e.g., annular structure, ring, enlarged portion, radially enlarged portion, radial protrusion) disposed thereon. The proximal stop 476 can be adhered to or integrally formed with the conduit 116. The proximal stop 476 can be proximal of the distal stop 456. The distal stop 456 can be disposed distal of the anchor 424. The proximal stop 476 can be disposed proximal of the anchor 424. The proximal stop 476 can be disposed distal of the port 432 (e.g., first mating feature 434). The proximal stop 476 can be a primary stop for preventing further distal advancement of the conduit 116 and port 432. The proximal stop 476 can be received within the region 430 of the second mating feature 428 with distal advancement of the conduit 116 through the region 430. As illustrated in FIG. 20D, the proximal stop 476 can contact a proximal-facing surface 472 of the first mating feature 434 disposed in the region 430 to prevent further distal advancement as the conduit 116 and first mating feature 434 are distally advanced through the region 430, which can prevent the ingestion of the conduit 116 and/or port 432. The port 432 adhered to the conduit 116 can act as a secondary stop, should the proximal stop 476 fail, to prevent the ingestion of the conduit 116 and/or port 432.

FIGS. 21A-21D illustrate the intraoral gastrointestinal access device 422 with a distal stop 457 (e.g., enlarged portion, radially enlarged portion, radial protrusion). The distal stop 457 can include any of the features of the distal stop 456 and/or 418. The distal stop 457, as described in reference to distal stops 456 and/or 418, can prevent the conduit 116 from being proximally retracted through the anchor 424 past the distal stop 457. Accordingly, the distal stop 457 can impede the conduit 116 from being inadvertently pulled out of the user through the anchor 424.

Figure 21A:
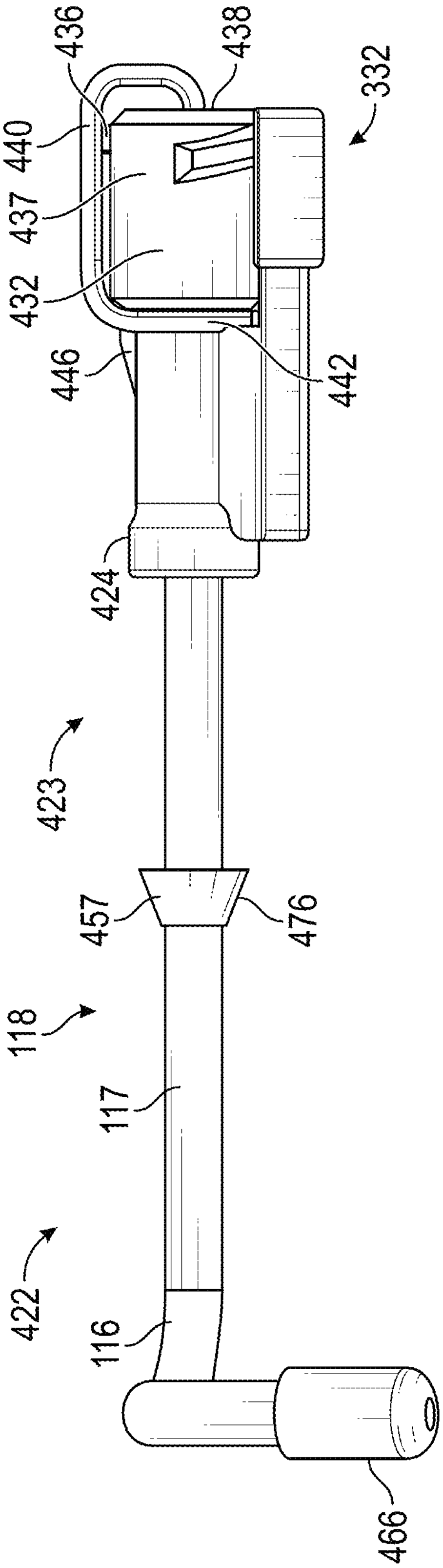
FIG. 21A illustrates another intraoral gastrointestinal access device with a tapered distal stop.

As illustrated in FIG. 21A, the distal stop 457 can be disposed on the conduit 116, which can include being disposed on the sleeve 117. The distal stop 457, similar to the stop 456 and stop 418, can impede proximal retraction past the anchor 424. The distal stop 457 can include a tapered shape, which can include the distal portion of the distal stop 457 being smaller than the proximal portion of the distal stop 457. The distal stop 457 can include a conical frustum shape or cone shape.

Figure 21B:
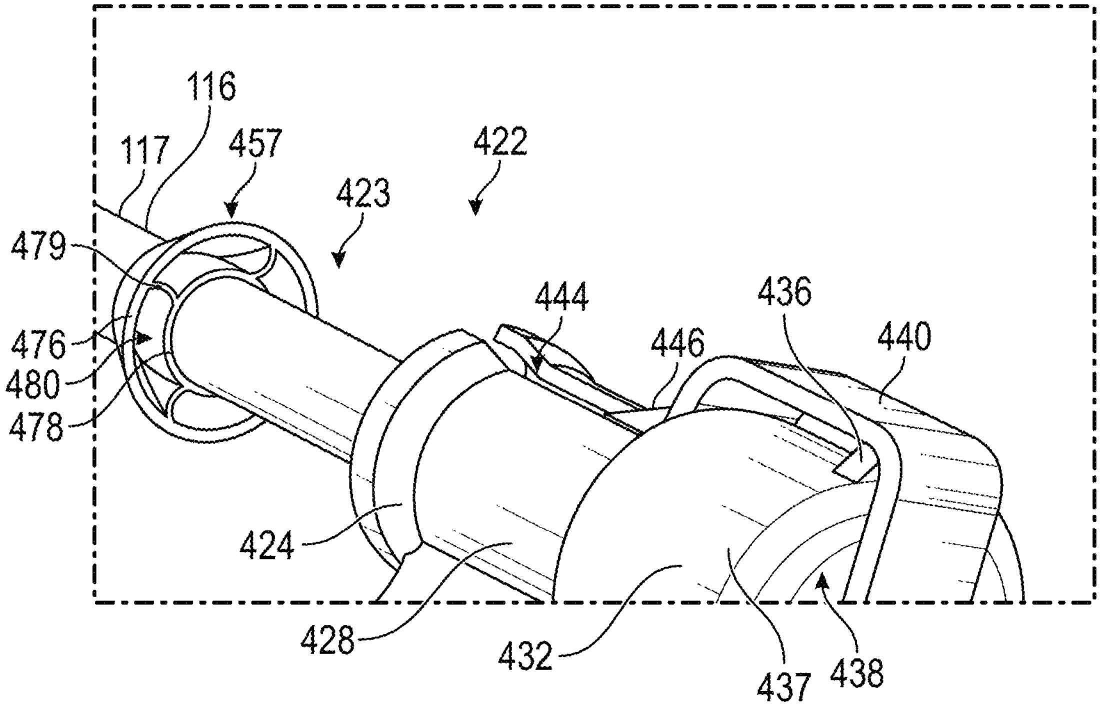
FIG. 21B illustrates an enlarged proximal view of the tapered distal stop of the intraoral gastrointestinal access device of FIG. 21A.

The distal stop 457 can be collapsible in one direction but not another (e.g., one-way collapsible stop). As illustrated in FIG. 21B, the distal stop 457 can include an outer wall 476 and/or inner wall 478. The outer wall 476 can define the tapered shape of the distal stop 457. The inner wall 478 can be disposed on (e.g., coupled to, adhered to) the conduit 116, which can include the sleeve 117. The inner wall 478 can have a shape (e.g., annular) corresponding to that of the conduit 116, which can include having a consistent periphery. The inner wall 478 can define a hole (e.g., lumen, passageway), which can be of a consistent size, through which the conduit 116 passes. A gap 480 (e.g. space) can be disposed between the inner wall 478 and the outer wall 476, which can facilitate the outer wall 476 deflecting inward to enable the distal stop 457 to pass through the anchor 424. The distal stop 457 can include one or more flanges 479 (e.g., ribs, fins, vanes) that extend from the inner wall 478 to the outer wall 476. The one or more flanges 479 can be curved. The one or more flanges 479 can act as a spring to bias the outer wall 476 away from the inner wall 478. The one or more flanges 479 can include one, two, three, four, five, six, seven, eight, or more flanges. The one or more flanges 479 can restrict the radially outward movement of the outer wall 476 relative to the inner wall 478.

Figure 21C:
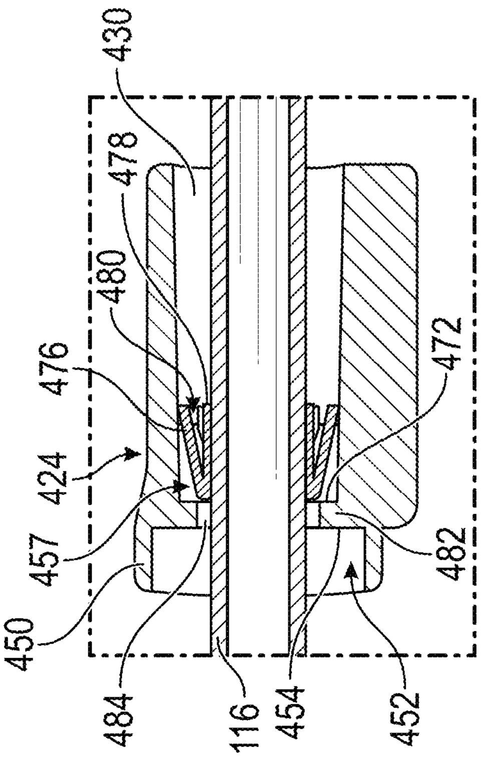
FIG. 21C illustrates a cross-sectional view of the distal stop being advanced distally through the anchor of the intraoral gastrointestinal access device of FIG. 21A.
Figure 21D:
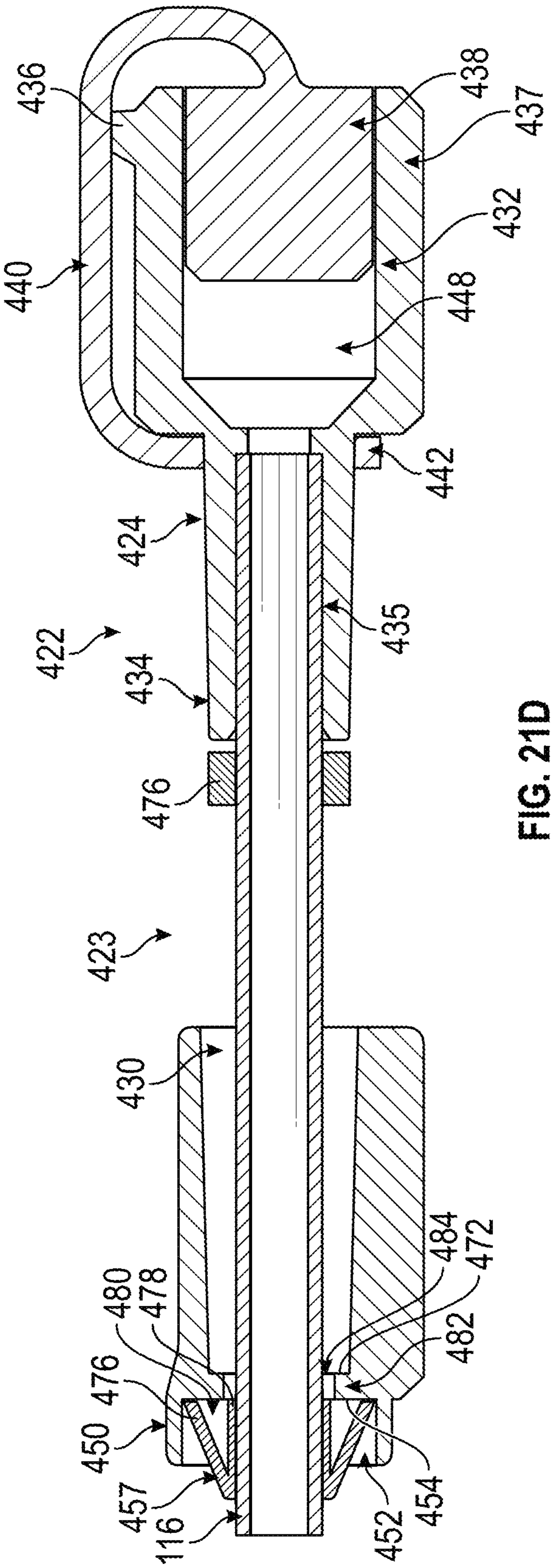
FIG. 21D illustrates a cross-sectional view of the distal stop disposed within a distally-open recess of the anchor of the intraoral gastrointestinal access device of FIG. 21A.

FIG. 21C illustrates a cross-sectional view of the distal stop 457 being advanced through the region 430 (e.g., lumen, channel, passage, hole) of the anchor 424 to assemble the intraoral gastrointestinal access device 422, which can include coupling the gastrointestinal administration device 423 to the anchor 424. As shown, the walls of the region 430 can compress the distal stop 457, which can include deflecting (e.g., collapsing) the outer wall 476 radially inward toward the inner wall 478 against the biasing force(s) of the one or more flanges 476. The region 430 can be tapered such that the distal portion of the region 430 is smaller than the proximal portion, which can facilitate the region 430 gradually deflecting the outer wall 476 more radially inward as the distal stop 457 is advanced through the region 430. With the application of force (e.g., pull) in the distal direction, the distal stop 457 can be advanced distally through and out of the region 430 as illustrated in FIG. 21D, which can include passing through a hole 484, and into the recess 452 of the anchor 424. After exiting the region 430, the outer wall 476 of the distal stop 457 can spring outward, which can be from the biasing force of the one or more flanges 479. With the outer wall 476 expanded, the distal stop 457 can have an enlarged profile which can prevent proximal retraction into the region 430 (e.g., the outer wall 476 can expand to a size larger than the hole 484). The expanded distal stop 457 can prevent the distal stop 457 and the conduit 116 from being proximally retracted through the anchor 424 past the distal stop 457. For example, the expanded outer wall 476 can contact one or features of the recess 452, which can prevent proximal retraction through the anchor 424. The expanded outer wall 476 can contact a distal-facing surface 454 of the wall 482 of the anchor 424 to prevent proximal retraction. The one or more flanges 479 can limit movement of the outer wall 476 radially away from the inner wall 478 to prevent the distal stop 457 from being pulled through the anchor 424.

To decouple the conduit 116 from the anchor 424, the conduit 116 can be forced (e.g., pulled, moved) through the slot 444 of the anchor 424. For example, a user and/or clinician can pull the conduit 116 through the slot 444 of the anchor 424. The conduit 116 can have a diameter that is larger than the width of the slot 444 to prevent the conduit 116 from inadvertently passing through the slot 444. The conduit 116 can deflect with sufficient force applied thereto to fit through the slot 444 to decouple the conduit 116 from the anchor 424. With the conduit 116 decoupled form the anchor 424, the conduit 116 can be proximally retracted out of the user. To couple the conduit 116 to the anchor 424, the conduit 116 and distal stop 457 can be advanced distally through the region 430 of the anchor 424 as described herein. In some variants, the conduit 116 can be advanced (e.g., pushed, pulled) through the slot 444 of the anchor 424 into the region 430 of the anchor 424. As described herein, the diameter of the conduit 116 can be larger than the width of the slot 444 such that the conduit 116 is deflected when being advanced through the slot 444.

Figure 21E:
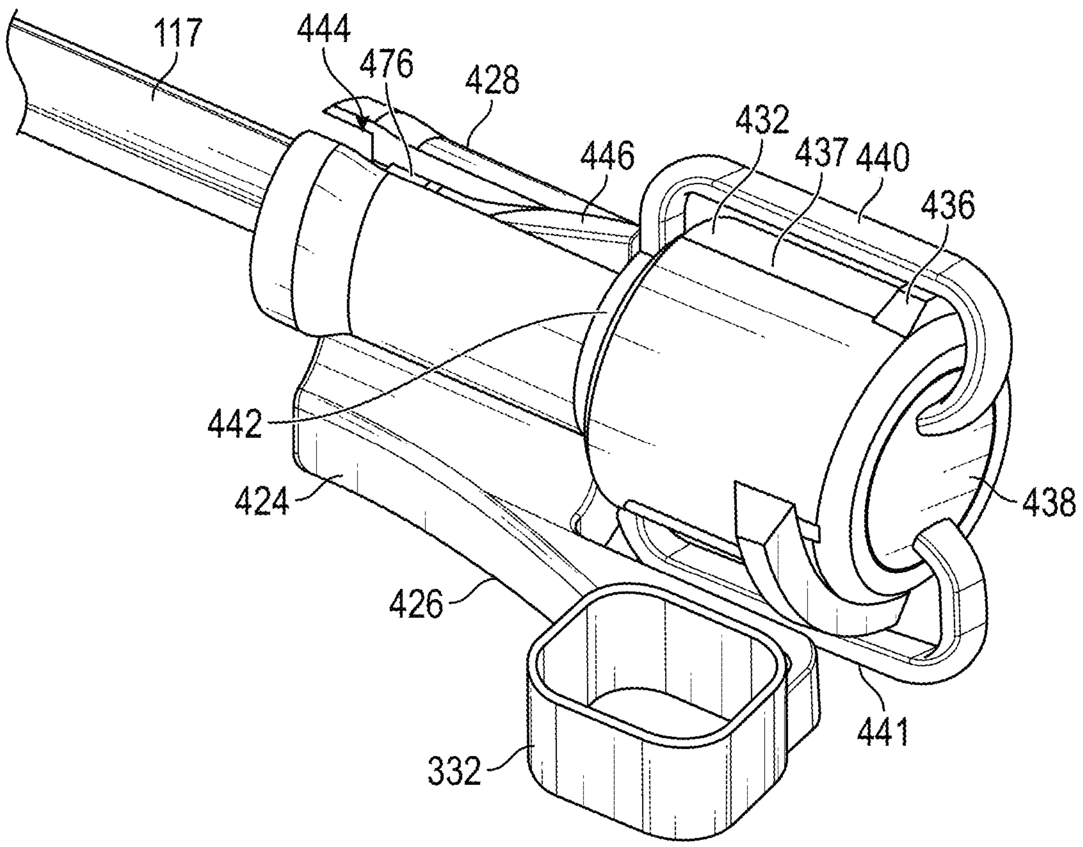
FIG. 21E illustrates the intraoral gastrointestinal access device of FIG. 21A with the cap having two tethers.

As illustrated in FIG. 21E, the cap 438 can, in some variants, include multiple tethers as a safety redundancy to retain the cap 438. For example, the tether 440 and/or tether 441 can couple the cap 438 to one or more other features, such as the port 432, first mating feature 434 of the port 432, conduit 116, and/or anchor 424. The tether 440 and tether 441 can be coupled to the same distal attachment portion 442 (e.g., ring) that is coupled to the one or more features of the intraoral gastrointestinal access device 422. In some variants, the tether 440 and tether 441 can be coupled to separate distal attachment portions that are coupled to one or more features of the intraoral gastrointestinal access device 422.

Figure 22A:
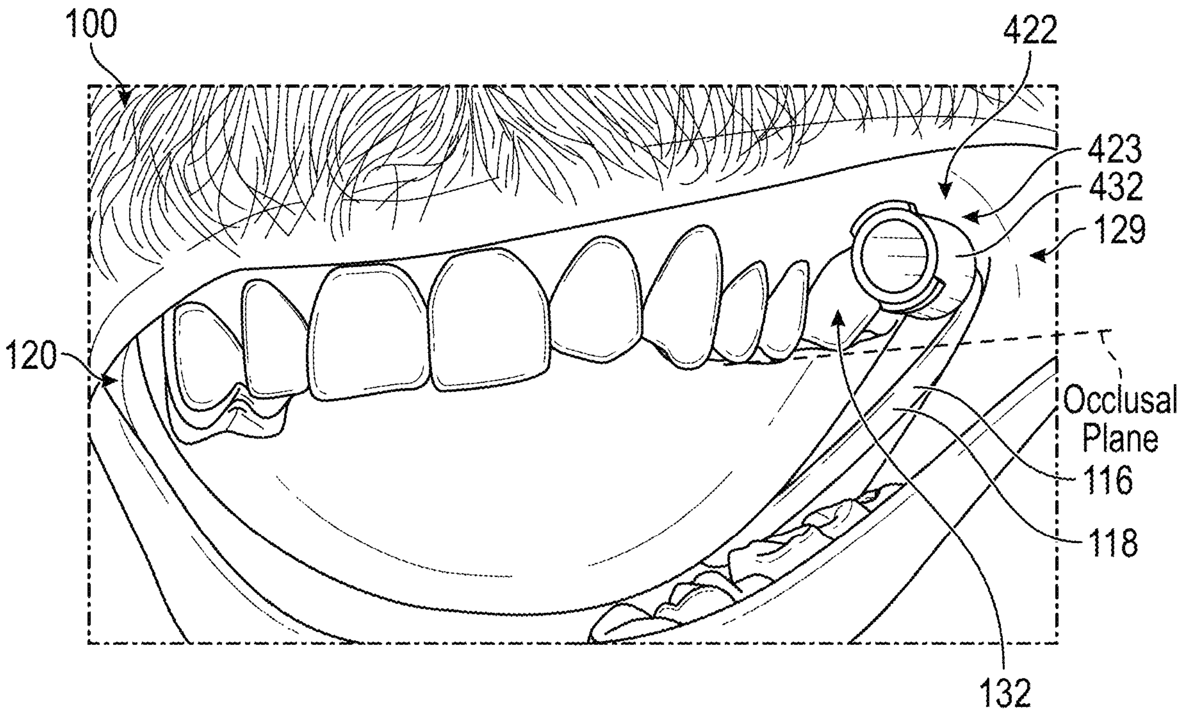
FIG. 22A illustrates the port of the intraoral gastrointestinal access device of FIGS. 20A-21E in a stowed configuration in the mouth of a patient.
Figure 22B:
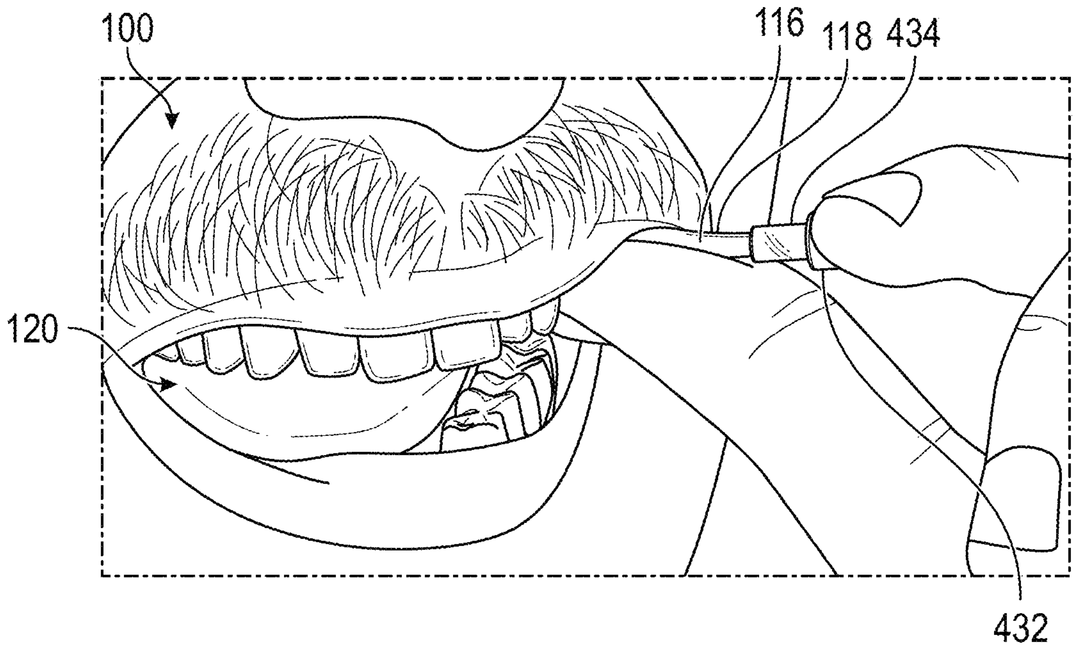
FIG. 22B illustrates the port of the intraoral gastrointestinal access device of FIG. 20A-21E in a deployed configuration outside the mouth of the patient.

FIG. 22A illustrates the port 432 stowed inside the mouth 120 of the patient 100. The port 432 is coupled to the anchor 424 secured to a tooth 132 of the patient 100. As shown, the port 432 can be disposed within the vestibule 129 of the mouth 120 and/or gingival of the occlusal plane (e.g., occlusal surfaces of the teeth of the patient). Positioning the port 432 gingival of the occlusal plane can help avoid the impacts of mastication. FIG. 22B illustrates the port 432 decoupled from the anchor 424 and positioned outside the mouth 120 of the patient 100, which can be for substance delivery as described herein. In some variants, the port 432 can be pulled out about 1.5 inches. In some variants, the port 432 can be pulled out about 1-3.5 inches or any value or range between the foregoing. The conduit 116 disposed inside the patient can be moved proximally a distance that matches the amount the port 432 is pulled out.

L. Certain Examples

Below is a list of non-limiting examples described herein. These examples are for illustrative purposes and should not be viewed to restrict or limit the disclosure herein in any way.

In a $1^{st}$ Example, a gastrointestinal administration device comprising: an anchor configured to be coupled with an anatomical feature inside a mouth of a user; a conduit comprising a first portion, a second portion, and a lumen fluidically coupling the first portion and the second portion, the first portion configured to be positioned in the mouth of the user and the second portion configured to be disposed at a gastrointestinal tract site of the user to deliver a substance; a port disposed at an end of the first portion of the conduit, the port configured to receive and direct the substance into the lumen of the conduit; a collar disposed on the first portion of the conduit between the port and the second portion of the conduit, the collar configured to impede movement of the conduit relative to the anchor; and a docking feature configured to hold the port to position the port inside the mouth of the user; wherein the port is configured to be removed from the docking feature to position the port outside of the mouth of the user to introduce the substance into the lumen of the conduit through the port.

In a 2nd Example, the gastrointestinal administration device of Example 1, wherein an opening of the port configured to receive and direct the substance into the lumen of the conduit faces a proximal direction with the port held by the docking feature.

In a 3rd Example, the gastrointestinal administration device of Example 1 or any of the preceding Examples, wherein the conduit is configured to form one or more loops between the port and the collar with the port held by the docking feature.

In a 4th Example, the gastrointestinal administration device of Example 1 or any of the preceding Examples, wherein the conduit is configured to form two loops between the collar and the port.

In a 5th Example, the gastrointestinal administration device of Example 1 or any of the preceding Examples, wherein the conduit is configured to extend toward a posterior of the mouth from the port, loop to extend toward an anterior of the mouth, and loop to extend toward the posterior of the mouth through the collar.

In a 6th Example, the gastrointestinal administration device of Example 1 or any of the preceding Examples, further comprising a cap configured to be coupled with the port to impede access into the lumen by way of the first portion.

In a 7th Example, the gastrointestinal administration device of Example 1 or any of the preceding Examples, further comprising a cap configured to be coupled with the port to impede fluid communication between the lumen and the mouth in use.

In an 8th Example, the gastrointestinal administration device of Example 1 or any of the preceding Examples, further comprising a cap with an outer periphery that extends beyond an outer periphery of the port.

In a 9th Example, the gastrointestinal administration device of Example 8, wherein the outer periphery of the cap comprises gripping features.

In a 10th Example, the gastrointestinal administration device of Example 1 or any of the preceding Examples, wherein at least one of the collar and the anchor comprises a hook configured to retain an elastic to couple the collar and the anchor together.

In an 11th Example, the gastrointestinal administration device of Example 1 or any of the preceding Examples, wherein at least a portion of the collar disposed on the conduit is configured to be disposed through the anchor and between the conduit and the anchor.

In a 12th Example, the gastrointestinal administration device of Example 1 or any of the preceding Examples, wherein the anchor comprises the docking feature.

In a 13th Example, the gastrointestinal administration device of Example 12, wherein one of the docking feature and the port comprise male splines and the other of the docking feature and the port comprise female splines, and wherein the male splines are configured to be inserted into the female splines to facilitate the anchor holding the port in the mouth of the user.

In a 14th Example, the gastrointestinal administration device of Example 13, wherein the female splines are disposed in arms configured to flex to permit relative rotation between the male splines and females splines.

In a 15th Example, the gastrointestinal administration device of Example 14, wherein the arms comprise different lengths.

In a 16th Example, the gastrointestinal administration device of Example 15, wherein one of the arms concavely curves and another of the arms convexly curves.

In a 17th Example, the gastrointestinal administration device of Example 14, wherein a gap separates the arms to facilitate flexing.

In an 18th Example, the gastrointestinal administration device of Example 1 or any of the preceding Examples, wherein the collar comprises curved tube to redirect the conduit disposed therethrough.

In a 19th Example, the gastrointestinal administration device of Example 1 or any of the preceding Examples, wherein the collar comprises a lateral extension comprising the docking feature, wherein the docking feature is configured to at least partially receive the port.

In a 20th Example, the gastrointestinal administration device of Example 19, wherein the docking feature comprises a pocket configured to at least partially receive the port.

In a 21st Example, the gastrointestinal administration device of Example 20, wherein the pocket comprises an annular structure with an annular gap.

In a 22nd Example, the gastrointestinal administration device of Example 1 or any of the preceding Examples, wherein one of the collar and the anchor comprises a locking tab that is biased to releasably couple the collar and the anchor together.

In a 23rd Example, the gastrointestinal administration device of Example 22, wherein the other of the collar and the anchor comprises a channel to receive the locking tab to restrict relative rotation between the collar and anchor.

In a 24th Example, the gastrointestinal administration device of Example 22, wherein the other of the collar and the anchor comprises a guide to position a tool at the locking tab to deflect the locking tab to decouple the collar and the anchor from each other.

In a 25th Example, the gastrointestinal administration device of Example 24, wherein the guide comprises a channel.

In a 26th Example, the gastrointestinal administration device of Example 1 or any of the preceding Examples, wherein the port comprises a threaded portion for coupling with another device and a pocket to receive an end of the first portion of the conduit, the pocket comprising at least a portion disposed radially inward of the threaded portion of the port.

In a 27th Example, the gastrointestinal administration device of Example 1 or any of the preceding Examples, wherein the anchor is coupled with or is configured to be coupled with a band disposed around a tooth of the user.

In a 28th Example, the gastrointestinal administration device of Example 1 or any of the preceding Examples, wherein the anchor is configured to be bonded to a tooth of the user.

In a 29th Example, the gastrointestinal administration device of Example 1 or any of the preceding Examples, wherein the anchor is coupled with or is configured to be coupled with an appliance extending around at least a portion of a maxillary or mandibular arch of the user.

In a 30th Example, the gastrointestinal administration device of Example 1 or any of the preceding Examples, wherein the anchor is configured to be coupled with a jawbone of a patient.

In a 31st Example, the gastrointestinal administration device of Example 1 or any of the preceding Examples, wherein the anchor is configured to be retained in a vestibule of the mouth.

In a 32nd Example, the gastrointestinal administration device of Example 1 or any of the preceding Examples, wherein the port is configured to be disposed generally at an occlusal plane of the user.

In a 33rd Example, the gastrointestinal administration device of Example 1 or any of the preceding Examples, wherein an entirety of the gastrointestinal administration device is configured to be disposed distal of an incisor of the user with the anchor coupled to a molar of the user.

In a 34th Example, the gastrointestinal administration device of Example 1 or any of the preceding Examples, wherein the first portion of the conduit comprises a memorized shape.

In a 35th Example, the gastrointestinal administration device of Example 34, wherein the first portion of the conduit between the port and the collar is configured to not extend more gingivally, occlusally, and labially than the collar with the port held by the docking feature and the anchor coupled to a tooth of the user.

In a 36th Example, the gastrointestinal administration device of Example 34, wherein the first portion of the conduit between the port and the collar is configured to be disposed in a vestibule of the mouth of the user between a distal-most molar and a premolar with the port held by the docking feature and the anchor coupled to a molar.

In a 37th Example, the gastrointestinal administration device of Example 1 or any of the preceding Examples, wherein a central longitudinal axis of the port is configured to be disposed between upper and lower gingiva of the user with the anchor coupled to a molar and the port held by the docking feature.

In a 38th Example, the gastrointestinal administration device of Example 1 or any of the preceding Examples, wherein the anchor is configured to be coupled to a molar of the user, and wherein the anchor comprises an elongate body configured to position the docking feature mesial or distal of the molar.

In a 39th Example, the gastrointestinal administration device of Example 1 or any of the preceding Examples, wherein the port comprises a valve.

In a 40th Example, the gastrointestinal administration device of Example 1 or any of the preceding Examples, further comprising a cap configured to be coupled to the port, the cap comprising a detent that is separated from the port by a space with the cap coupled to the port, and wherein the anchor comprises a protrusion that is configured to be disposed in the space between the detent and the port with the docking feature holding the port to secure the port to the docking feature.

In a 41st Example, the gastrointestinal administration device of Example 1 or any of the preceding Examples, wherein the collar and the anchor are configured to be coupled together with a positive lock.

In a 42nd Example, the gastrointestinal administration device of Example 1 or any of the preceding Examples, wherein the collar comprises a biased mating feature with one or more retention features and the anchor comprises one or more pockets, and wherein the one or more retention features are configured to be disposed in the one or more pockets by distally advancing the biased mating feature through the anchor, rotating the biased mating feature to align the one or more retention features with the one or more pockets, and releasing the biased mating feature to proximally retract to position the one or more retention features in the one or more pockets.

In a 43rd Example, the gastrointestinal administration device of Example 42, wherein the biased mating feature comprises a cylindrical body and the one or more retention features comprise one or more protrusions.

In a 44th Example, the gastrointestinal administration device of Example 1 or any of the preceding Examples, wherein the collar comprises an indexing feature and the anchor comprises one or more recesses configured to receive the indexing feature to impede relative rotation between the collar and the anchor.

In a 45th Example, the gastrointestinal administration device of Example 1 or any of the preceding Examples, wherein the collar comprises a locking feature and the anchor comprise a channel configured to receive the locking feature to impede relative movement between the collar and the anchor in a distal-proximal direction.

In a 46th Example, the gastrointestinal administration device of Example 45, wherein the locking feature is biased to spring into the channel when positioned at the channel.

In a 47th Example, the gastrointestinal administration device of Example 1 or any of the preceding Examples, wherein the collar comprises a first mating feature and the anchor comprises an attachment feature configured to be bonded to a tooth, a second mating feature configured to couple with the first mating feature, and a connector spacing the second mating feature away from the attachment feature.

In a 48th Example, a gastrointestinal administration device comprising: a conduit comprising a first portion, a second portion, and a lumen fluidically coupling the first portion and the second portion, the first portion configured to be retained in a mouth of a user and the second portion configured to be disposed at a gastrointestinal tract site of the user to deliver a substance; a port disposed at an end of the first portion of the conduit, the port configured to receive and direct the substance into the lumen of the conduit; and a collar disposed on the conduit between the port and the second portion of the conduit, the collar configured to be coupled with an anchor disposed inside the mouth of the user to impede movement of the conduit relative to the anchor.

In a 49th Example, the gastrointestinal administration device of Example 48, further comprising the anchor, wherein the collar comprises a distal-facing surface configured to contact a proximal-facing surface of the anchor to impede distal movement of the conduit relative to the anchor.

In a 50th Example, the gastrointestinal administration device of Example 49, wherein a portion of the collar disposed over the conduit is configured to be disposed through the anchor and between the conduit and the anchor.

In a 51st Example, the gastrointestinal administration device of Example 50, wherein the portion of the collar comprises one of a tongue or groove feature and the anchor comprises the other of the tongue and groove feature.

In a 52nd Example, the gastrointestinal administration device of Example 48 or any of Examples 49-51, wherein the collar comprises a docking feature configured to couple the collar with the port.

In a 53rd Example, the gastrointestinal administration device of Example 52, wherein the docking feature comprises a pocket configured to at least partially receive the port therein.

In a 54th Example, the gastrointestinal administration device of Example 49, wherein the collar comprises a locking tab that is biased to releasably lock the collar and the anchor together when coupled.

In a 55th Example, the gastrointestinal administration device of Example 49, wherein the collar and the anchor comprise hooks configured to retain an elastic to couple the collar and the anchor.

In a 56th Example, the gastrointestinal administration device of Example 48 or any of Examples 49-51, wherein the port comprises a threaded portion for coupling with another device and a pocket to receive the end of the first portion of the conduit, the pocket comprising a portion disposed radially inward of the threaded portion.

In a 57th Example, the gastrointestinal administration device of Example 56, wherein the pocket extends more than half of a longitudinal length of the port.

In a 58th Example, the gastrointestinal administration device of Example 56, wherein the pocket extends more than two-thirds of a longitudinal length of the port.

In a 59th Example, the gastrointestinal administration device of any of the Examples 56-58, wherein the port comprises an inner protrusion with a portion disposed radially inward of the threaded portion, and wherein the portion of the pocket disposed radially inward of the threaded portion of the port extends into the inner protrusion.

In a 60th Example, the gastrointestinal administration device of Example 59, wherein the inner protrusion is tapered.

In a 61st Example, the gastrointestinal administration device of any Examples 59 and 60, wherein the inner protrusion comprises a tapered lumen fluidically coupled with the pocket, the tapered lumen configured to direct the substance to inside the end of the first portion disposed in the pocket.

In a 62nd Example, the gastrointestinal administration device of Example 48 or any of Examples 49-51, wherein the port comprises a threaded portion for coupling with another device and a pocket to receive the end of the first portion of the conduit, the pocket comprising an inner portion disposed radially inward of the threaded portion of the port and an outer portion not radially inward of the threaded portion.

In a 63rd Example, the gastrointestinal administration device of Example 48 or any of Examples 49-62, wherein the port comprises a coupling feature configured to interface with a corresponding feature of the anchor to couple the port and the anchor.

In a 64th Example, the gastrointestinal administration device of Example 48 or any of Examples 49-63, further comprising a cap configured to be coupled with the port to impede access into the lumen by way of the first portion or fluid communication between the lumen and the mouth in use.

In a 65th Example, a port configured to be coupled with a conduit of a gastrointestinal administration device, the port comprising: a threaded portion configured to facilitate coupling to another device to introduce a substance into the port for delivery to a gastrointestinal tract site by way of the conduit; and a pocket configured to receive an end of the conduit, the pocket comprising a portion disposed radially inward of and axially overlapping with the threaded portion.

In a 66th Example, the port of Example 65, wherein the port is configured to be coupled with an anchor disposed inside of a mouth of a user.

In a 67th Example, the port of Example 66, further comprising a coupling feature configured to flex to facilitate rotational movement of the port relative to the anchor.

In a 68th Example, the port of Example 67, wherein the coupling feature comprises female splines and the anchor comprises male splines configured to be received by the female splines of the coupling feature.

In a 69th Example, the port of Example 68, wherein the female splines are configured to receive the male splines of the anchor with a push fit.

In a 70th Example, the port of Example 68 or 69, wherein the female splines are disposed in an annular structure of the coupling feature, the annular structure comprising a gap configured to permit the annular structure to flex and allow rotation of the male splines within the female splines.

In a 71st Example, the port of Example 65 or any of Examples 66-70, wherein the pocket extends more than half of a longitudinal length of the port.

In a 72nd Example, the port of Example 65 or any of Examples 66-70, wherein the pocket extends more than two-thirds of a longitudinal length of the port.

In a 73rd Example, the port of Example 61 or any of Examples 66-72, further comprising an inner protrusion disposed radially inward of the threaded portion, and wherein the portion of the pocket disposed radially inward of and axially overlapping with the threaded portion of the port extends into the inner protrusion.

In a 74th Example, the port of Example 73, wherein the inner protrusion comprises a tapered portion.

In a 75th Example, the port of Example 73 or 74, wherein the inner protrusion comprises a tapered lumen fluidically coupled with the pocket, the tapered lumen configured to direct the substance inside the end of the conduit disposed in the pocket.

In a 76th Example, the port of Example 65 or any of Examples 66-75, wherein the pocket comprises an outer portion not radially inward of the threaded portion.

In a 77th Example, a method for a gastrointestinal administration device, the method comprising: distally advancing a conduit through an anchor secured to an anatomical feature within a mouth of a user and down an esophagus of the user; rotating a collar fixed to the conduit to align an indexing feature of the collar with a corresponding channel of the anchor; and distally advancing the collar through the anchor with the indexing feature disposed within the corresponding channel of the anchor until a distal-facing surface of the collar contacts a proximal-facing surface of the anchor to impede distal advancement of the conduit and the collar.

In a 78th Example, the method of Example 77, further comprising coupling the collar and the anchor together.

In a 79th Example, the method of Example 78, wherein coupling the collar and the anchor together comprises placing an elastic around portions of the collar and the anchor.

In an 80th Example, the method of Example 78 or 79, further comprising uncoupling the collar and the anchor.

In an 81st Example, the method of Example 80, wherein uncoupling the collar and the anchor comprises distally advancing a tool along a channel of the anchor to apply a force to the indexing feature to disengage the indexing feature from the anchor.

In an 82nd Example, the method of Example 77 or any of Examples 78-81, further comprising securing the anchor to the anatomical feature inside the mouth of the user.

In an 83rd Example, the method of Example 82, wherein securing the anchor to the anatomical feature inside the mouth of the user comprises bonding the anchor to a tooth of the user.

In an 84th Example, the method of Example 82, wherein securing the anchor to the anatomical feature inside the mouth of the user comprises disposing a band around a tooth of the user.

In an 85th Example, the method of Example 82, wherein securing the anchor to the anatomical feature inside the mouth of the user comprises coupling the anchor to a bone of the user.

In an 86th Example, the method of Example 77 or any of Examples 78-85, further comprising cutting the conduit to a length to position a portion of the conduit at a target gastrointestinal tract site of the user.

In an 87th Example, the method of Example 86, further comprising measuring anatomical features of the user to determine the length.

In an 88th Example, a gastrointestinal administration device comprising: a conduit comprising a first portion, a second portion, and a lumen fluidically coupling the first portion and the second portion; and a port disposed at an end of the first portion, the port configured to be stowed in a mouth of a user and deployed outside of the mouth of the user to couple to a substance supply device to receive and direct substance into the lumen of the conduit to exit out the second portion at a gastrointestinal tract site of the user.

In an 89th Example, the gastrointestinal administration device of Example 88, further comprising an anchor configured to be coupled with an anatomical feature inside the mouth of the user, wherein the port is configured to couple with the anchor.

In an 90th Example, the gastrointestinal administration device of Example 89, wherein the anchor comprises a docking feature configured to receive the port.

In an 91st Example, the gastrointestinal administration device of Example 90, wherein the docking feature comprises an annular structure.

In a 92nd Example, the gastrointestinal administration device of any of Examples 89-91, wherein the anchor comprises an attachment feature configured to be secured to a tooth of the user.

In a 93rd Example, the gastrointestinal administration device of Example 92, wherein the anchor comprises a connector configured to space the port away from the attachment feature.

In an 94th Example, the gastrointestinal administration device of any of Examples 89-93, wherein the anchor is configured to receive the conduit therethrough.

In a 95th Example, the gastrointestinal administration device of Example 94, wherein the conduit comprises a distal stop configured to impede proximal retraction of the conduit through the anchor past the distal stop.

In a 96th Example, the gastrointestinal administration device of Example 95, wherein the distal stop comprises a tapered shape.

In a 97th Example, the gastrointestinal administration device of any of Examples 95 and 96, wherein the distal stop is configured to collapse in a first direction but not a second opposite direction.

In an 98th Example, the gastrointestinal administration device of any of Examples 89-97, wherein the anchor comprise a gap to permit flexing of the anchor when the port is received.

In a 99th Example, the gastrointestinal administration device Example 98, wherein the gap extends in a longitudinal direction of the port.

In a 100th Example, the gastrointestinal administration device of any of Examples 98 and 99, wherein the gap extends to a hole of the anchor through which the conduit is routed.

In a 101st Example, the gastrointestinal administration device of any of Examples 98 and 99, wherein the gap does not extend to a hole of the anchor through which the conduit is routed.

In a 102nd Example, the gastrointestinal administration device of any of Examples 88-101, further comprising a cap configured to cover a proximal opening of the port.

In a 103rd Example, the gastrointestinal administration device of Example 102, wherein the cap comprises a tether configured to secure the cap to the port or conduit.

In an 104th Example, the gastrointestinal administration device of any of Examples 88-103, wherein the port comprises threads that are internal.

In an 105th Example, the gastrointestinal administration device of any of Examples 88-103, wherein the port comprises threads that are external.

In an 106th Example, the gastrointestinal administration device of any of Examples 90-105, wherein the port comprises a first mating feature that protrudes proximally and is disposed on the conduit, the first mating feature configured to be disposed through a hole of the docking feature of the anchor.

In a 107th Example, the gastrointestinal administration device of Example 106, wherein the first mating feature comprises a tubular structure.

In a 108th Example, the gastrointestinal administration device of Example 107, wherein an outer periphery of the tubular structure is tapered.

In a 109th Example, the gastrointestinal administration device of any of Examples 98-100, wherein the port comprises a flange that extends radially outward that is configured to be received by the gap of the anchor.

In a 110th Example, the gastrointestinal administration device of Example 109, wherein the flange comprises a tapered profile, the flange extending radially outward a first distance at a distal portion and a second distance greater than the first distance at a proximal portion.

In a 111th Example, the gastrointestinal administration device of any of Examples 88-110, wherein the second portion of the conduit comprises a distal cap with an atraumatic distal end.

In a 112th Example, the gastrointestinal administration device of any of Examples 88-111, wherein the conduit comprises a shape set portion to direct the conduit down a throat of the user.

In a 113th Example, the gastrointestinal administration device of Example 112, wherein the shape set portion comprises a first curve and a second curve, wherein the first curve directs the conduit to an opening of the throat of the user and the second curve directs the conduit down through the opening of the throat of the user.

In a 114th Example, the gastrointestinal administration device of any of Examples 89-113, wherein the conduit comprises a proximal stop configured to be disposed proximal of the anchor and to prevent distal advancement of the conduit through the anchor past the proximal stop.

In a 115th Example, a port configured to be coupled with a conduit of a gastrointestinal administration device, the port comprising: a main body with external threads for coupling to another device to introduce a substance into the port for delivery to a gastrointestinal tract site by way of the conduit; and a tubular structure protruding distally from the main body, the tubular structure configured to receive the conduit therein, wherein the tubular structure comprises an outer diameter that is smaller than that of the main body.

In a 116th Example, the port of Example 115, further comprising a flange extending radially outward from the tubular structure, the flange distally spaced from the main body.

In a 117th Example, the port of Example 116, wherein the flange is tapered to extend more radially outward at a proximal portion compared to a distal portion.

In a 118th Example, the port of any of Examples 115-117, further comprising a cap with a tether, wherein the cap is configured to cover a proximal opening of the main body and the tether is configured to be disposed around the tubular structure between the flange and the main body.

In a 119th Example, a method for a gastrointestinal administration device, the method comprising: distally advancing a conduit through an anchor secured to an anatomical feature within a mouth of a user and down an esophagus of the user; and distally advancing a port coupled to a proximal portion of the conduit into the anchor for a push fit.

In a 120th Example, the port of Example 119, wherein distally advancing the conduit through the anchor comprises distally advancing a distal stop disposed on the conduit through the anchor, the distal stop collapsing within a region of the anchor and expanding distal of the region to impede proximal retraction of the distal stop back through the anchor.

In a 121st Example, an adapter configured to couple a gastrointestinal administration device to a substance supply device, the adapter comprising a first port with internal threads, a second port with internal threads, and a conduit connecting the first port and the second port, the conduit comprising an internal lumen to facilitate flow between the first port and the second port, wherein the first port is configured to couple to the gastrointestinal administration device and the second port is configured to couple to the substance supply device.

M. Certain Terminology

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Terms of orientation used herein, such as "top," "bottom," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures but can encompass structures that are reasonably close approximations.

The terms "approximately," "about," and "substantially" as used herein represent an amount close to the stated amount that still performs a desired function or achieves a desired result. For example, in some embodiments, as the context may permit, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may permit, the term "generally parallel" can refer to something that departs from exactly parallel by less than or equal to 20 degrees and the term "generally perpendicular" can refer to something that departs from exactly perpendicular by less than or equal to 20 degrees.

N. Summary

The intraoral gastrointestinal access devices disclosed herein can also be referred to as an intraoral gastrointestinal access tube, intraorally-anchored gastrointestinal access device, and/or intraorally-anchored gastrointestinal access tube. The components of the intraoral gastrointestinal access device disclosed herein can be made of a variety of biocompatible materials such as metals, metal alloys, polymers (e.g., plastic), ceramic, and/or others. For example, the anchors and/or other components described herein can at least be made of a metal, such as stainless steel or titanium. The conduits described herein can at least be made of a flexible polymer, such as silicone or polyurethane. The components of the intraoral gastrointestinal access devices disclosed herein can be manufactured using a variety of techniques, such as additive manufacturing (e.g., 3D printing), machining, injection molding, casting, etc. The components of the intraoral gastrointestinal access devices disclosed herein can be customized for a particular patient. For example, the anchor can be sized and/or configured based on the unique anatomical features of the patient. Band kits can be used to quickly customize the intraoral gastrointestinal access devices to different users. The band kits can include tooth bands attached to anchors to facilitate quick installation within the mouth of the user. The band kits can include tooth bands of varying sizes to accommodate for tooth size variations across users.

The intraoral gastrointestinal access devices described herein, can include a valve (e.g., one-way valve) such as a needleless access connector (e.g., NAC) type valve. The valve can impede leakage from the from the port and/or conduit into the mouth of the patient and/or impede flow into the port and/or conduit from the mouth of the patient. In some variants, the valve can be coupled to the port. In some variants, the port can incorporate the valve. In some variants, the port can be a valve. In some variants, the valve can replace the caps described herein. The valve can impede a flow of fluid unless coupled to the port. In some variants, the delivery device can include a valve that opens when coupled with the port.

The components of the intraoral gastrointestinal access devices described herein can be coupled and uncoupled (e.g., docked and undocked) to each other. For example, the ports can be docked to and undocked from the anchors and/or collars. The collars can be coupled to and uncoupled from the anchors. The components of the intraoral gastrointestinal access devices can be coupled and/or uncoupled by hand and/or with the assistance of a tool. For example, the components of the intraoral gastrointestinal access devices can include biased features (e.g., spring features, spring locking tabs and/or biased hooks) to facilitate coupling and/or decoupling. A tool can be navigated to the biased features to apply a force to couple and/or uncouple components of the intraoral gastrointestinal access devices.

The intraoral gastrointestinal access devices described herein can include a track, such as a string, in addition to or in place of the conduit. A first portion of the track can be coupled, which can include directly or indirectly, to an anchor secured within the mouth of the user and a second portion of the track can be disposed at the gastrointestinal tract site. The track can be used to deliver a medicament (e.g., tablet such as a slow-release tablet) to a gastrointestinal tract site of the patient. The medicament can be coupled to the second portion of the track such that the medicament releases at the gastrointestinal tract site. In some variants, an observation device, such as a camera capsule, can be coupled to the second portion of the track to position the observation device at the gastrointestinal tract site for monitoring. In some variants, an electrode can be coupled to the second portion of the track to position the electrode at the gastrointestinal tract site to apply electrical energy. In some variants, the intraoral gastrointestinal access devices can include a mechanism, such as a spool, to facilitate unraveling and/or winding up of the track. In some variants, a mechanical pressure device (e.g., expandable stent, balloon) can be coupled to the second portion of the track to apply mechanical pressure at the gastrointestinal tract site. In some variants, a conduit can include the foregoing features and/or be used to perform the foregoing.

In some variants, one or more components of the intraoral gastrointestinal access devices described herein can include one or more suction devices (e.g., suction cups) to secure the intraoral gastrointestinal access devices to an anatomical feature in the mouth of the user. For example, the anchors described herein can include one or more suction devices to secure the anchor to an anatomical feature (e.g., tooth surface, gingiva) in the mouth of the user.

In some variants, one or more components of the intraoral gastrointestinal access devices described herein can be biodegradable. For example, an adhesive used to secure a component of the intraoral gastrointestinal access devices to the user can be biodegradable. In some variants, the conduit or a portion thereof (e.g., second portion) can be biodegradable. In some variants, the track (e.g., string) or a portion thereof (second portion) can be biodegradable.

Although the intraoral gastrointestinal access devices, systems, and methods have been disclosed in the context of certain embodiments and examples, the scope of this disclosure extends beyond the specifically disclosed embodiments to other alternative embodiments and/or uses of the embodiments and certain modifications and equivalents thereof. Various features and aspects of the disclosed embodiments can be combined with or substituted for one another in order to form varying modes of the intraoral gastrointestinal access devices. The scope of this disclosure should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations. The described components and systems can generally be integrated together in a single product or packaged into multiple products. Additionally, other implementations are within the scope of this disclosure.

Some embodiments have been described in connection with the accompanying drawings. The figures are drawn to scale where appropriate, but such scale should not be interpreted as limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples of intraoral gastrointestinal access devices, systems, and methods have been disclosed. This disclosure expressly contemplates that various features and aspects of the disclosed embodiments can be combined with, or substituted for, one another. Accordingly, the scope of this disclosure should not be limited by the particular disclosed embodiments and examples described above, but should be determined only by a fair reading of the claims that follow.

What is claimed is:

1. A gastrointestinal administration device comprising:

a conduit comprising a first portion, a second portion, a lumen fluidically coupling the first portion and the second portion, and a distal stop;

a port disposed at an end of the first portion, the port configured to be stowed in a mouth of a user and deployed outside of the mouth of the user to couple to a substance supply device to receive and direct substance into the lumen of the conduit to exit out the second portion at a gastrointestinal tract site of the user; and an anchor configured to be coupled with an anatomical feature inside the mouth of the user, wherein the port is configured to couple with the anchor;

wherein the anchor is configured to receive the conduit therethrough; and wherein the distal stop is configured to impede proximal retraction of the conduit through the anchor past the distal stop to impede removal of the conduit from the user's body.

2. The gastrointestinal administration device of claim 1, wherein the anchor comprises an annular docking feature configured to receive the port.

3. The gastrointestinal administration device of claim 1, wherein the anchor comprises an attachment feature and a connector, the attachment feature configured to be secured to a tooth of the user, and the connector configured to space the port away from the attachment feature.

4. The gastrointestinal administration device of claim 1, wherein the distal stop is configured to collapse in a first direction but not a second opposite direction.

5. The gastrointestinal administration device of claim 1, wherein the anchor comprises a longitudinal gap.

6. The gastrointestinal administration device of claim 2, wherein the port comprises a first mating feature that protrudes proximally and is disposed on the conduit, the first mating feature configured to be disposed through a hole of the docking feature of the anchor.

7. The gastrointestinal administration device of claim 6, wherein the first mating feature comprises a tubular structure.

8. The gastrointestinal administration device of claim 5, wherein the port comprises a flange that extends radially outward that is configured to be received by the longitudinal gap of the anchor to impede rotation of the port relative to the anchor.

9. The gastrointestinal administration device of claim 1, wherein the second portion of the conduit comprises a distal cap with an atraumatic distal end.

10. The gastrointestinal administration device of claim 1, wherein the conduit comprises a shape set portion to direct the conduit down a throat of the user, the shape set portion comprising a first curve and a second curve, the first curve directing the conduit to an opening of the throat of the user and the second curve directing the conduit down through the opening of the throat of the user.

11. The gastrointestinal administration device of claim 1, further comprising a proximal stop configured to contact the anchor to impede distal advancement of the conduit and the port through the anchor to prevent ingestion of the conduit and the port.

12. The gastrointestinal administration device of claim 11, wherein the port and conduit are movable between a stowed position and a deployed position, wherein the distal stop is configured to contact the anchor to inhibit proximal retraction of the port and the conduit beyond the deployed position to impede removal of the conduit from the user's body, and wherein the proximal stop is configured to contact the anchor to inhibit distal advancement of the port and the conduit beyond the stowed position to prevent ingestion of the conduit and the port.

13. The gastrointestinal administration device of claim 4, wherein the distal stop is configured to collapse during distal advancement of the conduit through the anchor to permit distal advancement of the conduit through the port, and wherein the distal stop is configured to contact the port and resist collapse during proximal retraction of the conduit through the anchor to impede removal of the conduit from the user's body.

14. A gastrointestinal administration device comprising:

a conduit comprising a first portion, a second portion, and a lumen fluidically coupling the first portion and the second portion;

a port disposed at an end of the first portion, the port comprising a flange extending radially outward therefrom, the port configured to be stowed in a mouth of a user and deployed outside of the mouth of the user to couple to a substance supply device to receive and direct substance into the lumen of the conduit to exit out the second portion at a gastrointestinal tract site of the user; and an anchor configured to be coupled with an anatomical feature inside the mouth of the user and the anchor, the anchor comprising a longitudinal gap configured to receive the flange of the port when the port is coupled to the anchor to impede rotation of the port relative to the anchor.

15. The gastrointestinal administration device of claim 14, wherein the longitudinal gap extends through an annular docking feature of the anchor, and wherein the flange is configured to extend through the longitudinal gap beyond an outer periphery of the annular docking feature.

16. The gastrointestinal administration device of claim 14, wherein the anchor comprises an attachment feature and a connector, the attachment feature configured to be secured to a tooth of the user, and the connector configured to space the port away from the attachment feature.

17. The gastrointestinal administration device of claim 14, wherein the anchor is configured to receive the conduit therethrough.

18. The gastrointestinal administration device of claim 14, further comprising a distal stop configured to impede proximal retraction of the conduit through the anchor past the distal stop to impede removal of the conduit from the user's body.

19. The gastrointestinal administration device of claim 18, wherein the distal stop is configured to collapse in a first direction but not a second opposite direction.

20. The gastrointestinal administration device of claim 14, wherein the port comprises a first mating feature that protrudes proximally and is disposed on the conduit, the first mating feature configured to be disposed through a hole of the anchor.

* * * * *